(12) United States Patent
Ahmed

(10) Patent No.: US 10,333,696 B2
(45) Date of Patent: Jun. 25, 2019

(54) SYSTEMS AND METHODS FOR IMPLEMENTING AN EFFICIENT, SCALABLE HOMOMORPHIC TRANSFORMATION OF ENCRYPTED DATA WITH MINIMAL DATA EXPANSION AND IMPROVED PROCESSING EFFICIENCY

(71) Applicant: Sherjil Ahmed, Irvine, CA (US)

(72) Inventor: Sherjil Ahmed, Irvine, CA (US)

(73) Assignee: X-Prime, Inc., Irvine, CA (US)

( * ) Notice: Subject to any disclaimer, the term of this patent is extended or adjusted under 35 U.S.C. 154(b) by 0 days.

(21) Appl. No.: 15/805,916

(22) Filed: Nov. 7, 2017

(65) Prior Publication Data

US 2019/0036678 A1 Jan. 31, 2019

Related U.S. Application Data

(63) Continuation-in-part of application No. 15/782,109, filed on Oct. 12, 2017, and a continuation-in-part of application No. 14/994,035, filed on Jan. 12, 2016.

(Continued)

(51) Int. Cl.
*H04L 9/00* (2006.01)
*H04L 9/06* (2006.01)
(Continued)

(52) U.S. Cl.
CPC ............ *H04L 9/008* (2013.01); *H04L 9/0631* (2013.01); *H04L 9/14* (2013.01); *H04L 9/302* (2013.01); *H04L 9/3013* (2013.01)

(58) Field of Classification Search
CPC ....... H04L 9/006; H04L 9/008; H04L 9/3006; H04L 9/3013; H04L 9/302; H04L 9/0631; H04L 9/14; G06F 21/60; G06F 21/602; G06F 21/62; G06F 21/6218; G06F 21/6245; G06F 21/6254; G06F 21/70; G06F 21/71

See application file for complete search history.

(56) References Cited

U.S. PATENT DOCUMENTS 2,006,024 A 6/1935 Lockwood
3,201,701 A 8/1965 Maitra
(Continued)

OTHER PUBLICATIONS

Liam Morris, Analysis of Partially and Fully Homomorphic Encryption, 2013, Rochester Institute of Technology, pp. 2-4.*
(Continued)

*Primary Examiner* — Jung W Kim
*Assistant Examiner* — Adrian Stoica
(74) *Attorney, Agent, or Firm* — Novel IP

(57) ABSTRACT

Partially homomorphic encryption systems may be transformed into fully homomorphic encryption systems. Input plaintext data are transformed into modified plaintext data using a prime number operation and the modified plaintext data is then encrypted using any number of conventional encryption schemes. Desired computations on the encrypted data are transformed into homomorphic operations, based on the nature of the encryption format, and the homomorphic operations are applied to yield manipulated encrypted data. The manipulated encrypted data may be decrypted and the decrypted plaintext data may be modified into final, output plaintext data using a similar prime number operation as applied during encryption.

25 Claims, 39 Drawing Sheets

Related U.S. Application Data

(60) Provisional application No. 62/418,395, filed on Nov. 7, 2016, provisional application No. 62/407,122, filed on Oct. 12, 2016, provisional application No. 62/244,078, filed on Oct. 20, 2015, provisional application No. 62/126,187, filed on Feb. 27, 2015, provisional application No. 62/102,496, filed on Jan. 12, 2015.

(51) Int. Cl.
*H04L 9/14* (2006.01)
*H04L 9/30* (2006.01)

(56) References Cited

U.S. PATENT DOCUMENTS

| | | |
|---|---|---|
| 3,614,406 A | 10/1971 | Brown |
| 3,685,020 A | 8/1972 | Meade |
| 3,704,345 A | 11/1972 | Coker |
| 3,886,522 A | 5/1975 | Barton |
| 3,978,452 A | 8/1976 | Barton |
| 4,001,951 A | 1/1977 | Fasse |
| 4,134,218 A | 1/1979 | Adams |
| 4,156,903 A | 5/1979 | Barton |
| 4,156,908 A | 5/1979 | Missios |
| 4,156,909 A | 5/1979 | Barton |
| 4,156,910 A | 5/1979 | Barton |
| 4,296,928 A | 10/1981 | Nick |
| 4,299,580 A | 11/1981 | Fields |
| 4,308,561 A | 12/1981 | Onodera |
| 4,309,569 A | 1/1982 | Merkle |
| 4,352,166 A | 9/1982 | Schoonover |
| 4,362,392 A | 12/1982 | Kumata |
| 4,376,977 A | 3/1983 | Bruinshorst |
| 4,377,287 A | 3/1983 | Erwin |
| 4,380,130 A | 4/1983 | Bachmann |
| 4,385,352 A | 5/1983 | Bienvenu |
| 4,398,249 A | 8/1983 | Pardo |
| 4,405,829 A | 9/1983 | Rivest |
| 4,414,768 A | 11/1983 | Bachmann |
| 4,417,305 A | 11/1983 | Berstis |
| 4,439,162 A | 3/1984 | Blaine |
| 4,448,421 A | 5/1984 | Zaruba |
| 4,456,983 A | 6/1984 | Schoonover |
| 4,470,042 A | 9/1984 | Barnich |
| 4,471,428 A | 9/1984 | Dshkhunian |
| 4,496,945 A | 1/1985 | Stadjuhar |
| 4,496,974 A | 1/1985 | Heitmann |
| 4,548,603 A | 10/1985 | Ichijo |
| 4,551,935 A | 11/1985 | Bachmann |
| 4,554,419 A | 11/1985 | King |
| 4,578,811 A | 3/1986 | Inagaki |
| 4,624,010 A | 11/1986 | Takebayashi |
| 4,677,550 A | 6/1987 | Ferguson |
| 4,692,896 A | 9/1987 | Sakoda et al. |
| 4,737,109 A | 4/1988 | Abramson |
| 4,745,561 A | 5/1988 | Hirosawa |
| 4,748,668 A | 5/1988 | Shamir |
| 4,751,684 A | 6/1988 | Holt |
| 4,780,713 A | 10/1988 | Lundstrom |
| 4,783,752 A | 11/1988 | Kaplan |
| 4,803,641 A | 2/1989 | Hardy |
| 4,809,347 A | 2/1989 | Nash |
| 4,811,400 A | 3/1989 | Fisher |
| 4,831,525 A | 5/1989 | Saito |
| 4,834,527 A | 5/1989 | Kobayashi |
| 4,842,370 A | 6/1989 | Brenner |
| 4,867,686 A | 9/1989 | Goldstein |
| 4,872,006 A | 10/1989 | Takao |
| 4,891,782 A | 1/1990 | Johnson |
| 4,905,138 A | 2/1990 | Bourne |
| 4,914,698 A | 4/1990 | Chaum |
| 4,916,610 A | 4/1990 | Bapat |
| 4,925,221 A | 5/1990 | Carmody |
| 4,931,928 A | 6/1990 | Greenfeld |
| 4,949,388 A | 8/1990 | Bhaskaran |
| 4,953,871 A | 9/1990 | Antwi |
| 4,965,739 A | 10/1990 | Ng |
| 4,979,233 A | 12/1990 | Kawahata |
| 4,987,434 A | 1/1991 | Soshi |
| 4,989,132 A | 1/1991 | Mellender |
| 4,991,087 A | 2/1991 | Burkowski |
| 5,006,930 A | 4/1991 | Stroppiana |
| 5,008,816 A | 4/1991 | Fogg |
| 5,016,274 A | 5/1991 | Micali |
| 5,021,943 A | 6/1991 | Grimes |
| 5,021,992 A | 6/1991 | Kondo |
| 5,050,071 A | 9/1991 | Harris et al. |
| 5,067,095 A | 11/1991 | Peterson |
| 5,129,081 A | 7/1992 | Kobayashi |
| 5,140,634 A | 8/1992 | Guillou |
| 5,191,522 A | 3/1993 | Bosco |
| 5,201,056 A | 4/1993 | Daniel |
| 5,235,701 A | 8/1993 | Ohler |
| 5,241,599 A | 8/1993 | Bellovin |
| 5,265,245 A | 11/1993 | Nordstrom |
| 5,274,821 A | 12/1993 | Rouquie |
| 5,295,261 A | 3/1994 | Simonetti |
| 5,311,593 A | 5/1994 | Carmi |
| 5,335,320 A | 8/1994 | Iwata |
| 5,335,345 A | 8/1994 | Frieder |
| 5,347,614 A | 9/1994 | Yamada |
| 5,355,469 A | 10/1994 | Sparks et al. |
| 5,355,496 A | 10/1994 | Fant |
| 5,373,558 A | 12/1994 | Chaum |
| 5,389,924 A | 2/1995 | Ogawa |
| 5,402,335 A | 3/1995 | O'Brien |
| 5,432,852 A | 7/1995 | Leighton |
| 5,432,942 A | 7/1995 | Trainer |
| 5,440,635 A | 8/1995 | Bellovin |
| 5,463,777 A | 10/1995 | Bialkowski |
| 5,490,258 A | 2/1996 | Fenner |
| 5,493,504 A | 2/1996 | Minato |
| 5,493,614 A | 2/1996 | Chaum |
| 5,495,488 A | 2/1996 | Nakamura |
| 5,495,532 A | 2/1996 | Kilian |
| 5,497,500 A | 3/1996 | Rogers |
| 5,503,482 A | 4/1996 | Kawakami |
| 5,509,088 A | 4/1996 | Robson |
| 5,519,627 A | 5/1996 | Mahmood |
| 5,521,980 A | 5/1996 | Brands |
| 5,522,068 A | 5/1996 | Berkowitz |
| 5,572,732 A | 11/1996 | Fant |
| 5,577,253 A | 11/1996 | Blickstein |
| 5,590,197 A | 12/1996 | Chen |
| 5,592,552 A | 1/1997 | Fiat |
| 5,598,350 A | 1/1997 | Kawanishi |
| 5,606,669 A | 2/1997 | Bertin |
| 5,636,155 A | 6/1997 | Kabuo |
| 5,638,447 A | 6/1997 | Micali |
| 5,666,416 A | 9/1997 | Micali |
| 5,668,877 A | 9/1997 | Aziz |
| 5,673,263 A | 9/1997 | Basso |
| 5,687,235 A | 11/1997 | Perlman |
| 5,687,362 A | 11/1997 | Bhargava et al. |
| 5,699,431 A | 12/1997 | Van Oorschot |
| 5,706,406 A | 1/1998 | Pollock |
| 5,708,432 A | 1/1998 | Reynolds |
| 5,708,714 A | 1/1998 | Lopez |
| 5,717,757 A | 2/1998 | Micali |
| 5,717,758 A | 2/1998 | Micali |
| 5,724,512 A | 3/1998 | Winterbottom |
| 5,724,576 A | 3/1998 | Letourneau |
| 5,732,350 A | 3/1998 | Marko |
| 5,737,009 A | 4/1998 | Payton |
| 5,748,486 A | 5/1998 | Ashar |
| 5,748,975 A | 5/1998 | Van De Vanter |
| 5,754,938 A | 5/1998 | Herz |
| 5,758,152 A | 5/1998 | Letourneau |
| 5,764,772 A | 6/1998 | Kaufman et al. |
| 5,774,552 A | 6/1998 | Grimmer |
| 5,778,371 A | 7/1998 | Fujihara |
| 5,781,906 A | 7/1998 | Aggarwal |
| 5,787,415 A | 7/1998 | Jacobson |

(56) References Cited

U.S. PATENT DOCUMENTS

| | | |
|---|---|---|
| 5,787,432 A | 7/1998 | Letourneau |
| 5,793,868 A | 8/1998 | Micali |
| 5,796,356 A | 8/1998 | Okada |
| 5,802,370 A | 9/1998 | Sitbon et al. |
| 5,822,593 A | 10/1998 | Lamping et al. |
| 5,825,880 A | 10/1998 | Sudia |
| 5,848,159 A | 12/1998 | Collins |
| 5,867,578 A | 2/1999 | Brickell |
| 5,884,014 A | 3/1999 | Huttenlocher |
| 5,903,651 A | 5/1999 | Kocher |
| 5,905,138 A | 5/1999 | Van Broekhoven |
| 5,930,805 A | 7/1999 | Marquis |
| 5,937,162 A | 8/1999 | Funk |
| 5,937,181 A | 8/1999 | Godefroid |
| 5,960,083 A | 9/1999 | Micali |
| 5,966,445 A | 10/1999 | Park et al. |
| 5,970,490 A | 10/1999 | Morgenstern |
| 5,978,789 A | 11/1999 | Griffin |
| 5,978,790 A | 11/1999 | Buneman |
| 5,982,892 A | 11/1999 | Hicks et al. |
| 5,987,790 A | 11/1999 | Sullivan |
| 5,999,926 A | 12/1999 | Suciu |
| 6,002,879 A | 12/1999 | Radigan |
| 6,003,033 A | 12/1999 | Amano |
| 6,011,905 A | 1/2000 | Huttenlocher |
| 6,022,879 A | 2/2000 | Crow |
| 6,028,987 A | 2/2000 | Hirairi |
| 6,035,041 A | 3/2000 | Frankel |
| 6,044,462 A | 3/2000 | Zubeldia |
| 6,055,236 A | 4/2000 | Nessett |
| 6,055,537 A | 4/2000 | Letourneau |
| 6,058,188 A | 5/2000 | Chandersekaran |
| 6,065,008 A | 5/2000 | Simon |
| 6,067,620 A | 5/2000 | Holden |
| 6,076,087 A | 6/2000 | Suciu |
| 6,088,691 A | 7/2000 | Bhargava et al. |
| 6,088,798 A | 7/2000 | Shimbo |
| 6,097,811 A | 8/2000 | Micali |
| 6,108,783 A | 8/2000 | Krawczyk |
| 6,128,740 A | 10/2000 | Curry |
| 6,141,347 A | 10/2000 | Shaughnessy |
| 6,141,420 A | 10/2000 | Vanstone |
| 6,141,655 A | 10/2000 | Johnson |
| 6,144,953 A | 11/2000 | Sorrells |
| 6,161,180 A | 12/2000 | Matyas |
| 6,167,392 A | 12/2000 | Ostrovsky |
| 6,168,783 B1 | 1/2001 | Grabstein |
| 6,188,766 B1 | 2/2001 | Kocher |
| 6,199,103 B1 | 3/2001 | Sakaguchi |
| 6,209,120 B1 | 3/2001 | Kurshan |
| 6,212,637 B1 | 4/2001 | Ohta et al. |
| 6,226,383 B1 | 5/2001 | Jablon |
| 6,226,743 B1 | 5/2001 | Naor |
| 6,226,751 B1 | 5/2001 | Arrow |
| 6,236,410 B1 | 5/2001 | Politis |
| 6,243,859 B1 | 6/2001 | Chen-Kuang |
| 6,266,704 B1 | 7/2001 | Reed |
| 6,266,707 B1 | 7/2001 | Boden |
| 6,289,354 B1 | 9/2001 | Aggarwal |
| 6,292,893 B1 | 9/2001 | Micali |
| 6,292,897 B1 | 9/2001 | Gennaro et al. |
| 6,292,938 B1 | 9/2001 | Sarkar et al. |
| 6,298,153 B1 | 10/2001 | Oishi |
| 6,301,659 B1 | 10/2001 | Micali |
| 6,314,520 B1 | 11/2001 | Schell |
| 6,314,559 B1 | 11/2001 | Sollich |
| 6,317,236 B1 | 11/2001 | Saunders |
| 6,336,188 B2 | 1/2002 | Blake-Wilson et al. |
| 6,336,812 B1 | 1/2002 | Cooper et al. |
| 6,339,765 B1 | 1/2002 | Maher |
| 6,341,372 B1 | 1/2002 | Datig |
| 6,381,695 B2 | 4/2002 | Kudo |
| 6,381,696 B1 | 4/2002 | Doyle |
| 6,385,608 B1 | 5/2002 | Mitsuishi et al. |
| 6,397,329 B1 | 5/2002 | Aiello |
| 6,411,715 B1 | 6/2002 | Liskov |
| 6,411,716 B1 | 6/2002 | Brickell |
| 6,438,554 B1 | 8/2002 | Di-Crescenzo |
| 6,442,584 B1 | 8/2002 | Kolli |
| 6,442,689 B1 | 8/2002 | Kocher |
| 6,446,256 B1 | 9/2002 | Hyman et al. |
| 6,463,533 B1 | 10/2002 | Calamera |
| 6,466,240 B1 | 10/2002 | Maslov |
| 6,487,658 B1 | 11/2002 | Micali |
| 6,490,627 B1 | 12/2002 | Kalra |
| 6,505,205 B1 | 1/2003 | Kothuri et al. |
| 6,530,020 B1 | 3/2003 | Aoki |
| 6,532,540 B1 | 3/2003 | Kocher |
| 6,539,043 B1 | 3/2003 | Shinozaki et al. |
| 6,542,899 B1 | 4/2003 | Saulpaugh |
| 6,550,024 B1 | 4/2003 | Pagurek |
| 6,556,983 B1 | 4/2003 | Altschuler et al. |
| 6,584,507 B1 | 6/2003 | Bradley |
| 6,591,291 B1 | 7/2003 | Gabber |
| 6,594,763 B1 | 7/2003 | Madoukh |
| 6,598,052 B1 | 7/2003 | Saulpaugh |
| 6,606,632 B1 | 8/2003 | Saulpaugh |
| 6,606,741 B2 | 8/2003 | Kojima |
| 6,609,130 B1 | 8/2003 | Saulpaugh |
| 6,611,844 B1 | 8/2003 | Saulpaugh |
| 6,618,483 B1 | 9/2003 | Vanstone |
| 6,658,649 B1 | 12/2003 | Bates et al. |
| 6,714,939 B2 | 3/2004 | Saldanha |
| 6,717,949 B1 | 4/2004 | Boden |
| 6,745,384 B1 | 6/2004 | Biggerstaff |
| 6,748,378 B1 | 6/2004 | Lavender et al. |
| 6,748,530 B1 | 6/2004 | Aoki |
| 6,757,825 B1 | 6/2004 | Mackenzie |
| 6,760,441 B1 | 7/2004 | Ellison |
| 6,763,515 B1 | 7/2004 | Vazquez |
| 6,766,450 B2 | 7/2004 | Micali |
| 6,778,666 B1 | 8/2004 | Kuzmich |
| 6,785,673 B1 | 8/2004 | Fernandez |
| 6,792,533 B2 | 9/2004 | Jablon |
| 6,817,865 B2 | 9/2004 | Charbonneau |
| 6,826,684 B1 | 11/2004 | Fink |
| 6,826,687 B1 | 11/2004 | Rohatgi |
| 6,826,690 B1 | 11/2004 | Hind |
| 6,829,695 B1 | 12/2004 | Ross |
| 6,847,979 B2 | 1/2005 | Allemang et al. |
| 6,854,976 B1 | 2/2005 | Suhr |
| 6,868,160 B1 | 3/2005 | Raji |
| 6,874,005 B2 | 3/2005 | Fortenberry et al. |
| 6,879,690 B2 | 4/2005 | Faccin |
| 6,886,098 B1 | 4/2005 | Benaloh |
| 6,886,296 B1 | 5/2005 | John |
| 6,912,659 B2 | 6/2005 | Labaton |
| 6,952,769 B1 | 10/2005 | Dubey |
| 6,952,771 B1 | 10/2005 | Zuccherato |
| 6,959,384 B1 | 10/2005 | Serret-Avila |
| 6,965,990 B2 | 11/2005 | Barsness et al. |
| 6,968,330 B2 | 11/2005 | Edwards |
| 6,970,602 B1 | 11/2005 | Smith |
| 6,978,271 B1 | 12/2005 | Hoffman et al. |
| 6,988,198 B1 | 1/2006 | Zuccherato |
| 6,996,839 B1 | 2/2006 | Edwards |
| 7,007,164 B1 | 2/2006 | Euchner |
| 7,010,604 B1 | 3/2006 | Munger |
| 7,039,803 B2 | 5/2006 | Lotspiech |
| 7,043,024 B1 | 5/2006 | Dinsmore |
| 7,043,555 B1 | 5/2006 | McClain et al. |
| 7,043,720 B2 | 5/2006 | Kuzmin |
| 7,051,033 B2 | 5/2006 | Agarwal |
| 7,054,444 B1 | 5/2006 | Paillier |
| 7,068,787 B1 | 6/2006 | Ta |
| 7,072,904 B2 | 7/2006 | Najork |
| 7,073,068 B2 | 7/2006 | Jakobsson |
| 7,076,656 B2 | 7/2006 | MacKenzie |
| 7,088,822 B2 | 8/2006 | Asano |
| 7,089,276 B2 | 8/2006 | Miller |
| 7,103,838 B1 | 9/2006 | Krishnamurthy |
| 7,107,265 B1 | 9/2006 | Calvignac et al. |
| 7,113,594 B2 | 9/2006 | Boneh |
| 7,117,196 B2 | 10/2006 | Gaur et al. |

(56) References Cited

U.S. PATENT DOCUMENTS

| | | |
|---|---|---|
| 7,117,479 B2 | 10/2006 | Van De Vanter |
| 7,127,704 B2 | 10/2006 | Van De Vanter et al. |
| 7,134,019 B2 | 11/2006 | Shelest |
| 7,134,075 B2 | 11/2006 | Hind et al. |
| 7,140,006 B2 | 11/2006 | Harrison, III et al. |
| 7,149,311 B2 | 12/2006 | MacKenzie |
| 7,162,485 B2 | 1/2007 | Gottlob |
| 7,178,025 B2 | 2/2007 | Scheidt |
| 7,178,029 B2 | 2/2007 | Ansper |
| 7,191,182 B2 | 3/2007 | Anonsen |
| 7,191,333 B1 | 3/2007 | Maddury |
| 7,203,680 B2 | 4/2007 | Parida |
| 7,203,774 B1 | 4/2007 | Zhou |
| 7,203,837 B2 | 4/2007 | O'Shea |
| 7,216,230 B2 | 5/2007 | Suzuki |
| 7,221,762 B2 | 5/2007 | Gentry |
| 7,224,804 B2 | 5/2007 | Ishiguro |
| 7,225,339 B2 | 5/2007 | Asano |
| 7,246,231 B2 | 7/2007 | Tariq |
| 7,260,552 B2 | 8/2007 | Riera Jorba |
| 7,260,572 B2 | 8/2007 | Min et al. |
| 7,266,692 B2 | 9/2007 | Ramzan |
| 7,287,026 B2 | 10/2007 | Oommen |
| 7,313,563 B2 | 12/2007 | Bordawekar |
| 7,315,941 B2 | 1/2008 | Ramzan |
| 7,318,215 B1 | 1/2008 | Krishnan et al. |
| 7,337,315 B2 | 2/2008 | Micali |
| 7,337,322 B2 | 2/2008 | Gentry |
| 7,349,538 B2 | 3/2008 | Gentry |
| 7,353,395 B2 | 4/2008 | Gentry |
| 7,356,802 B2 | 4/2008 | De Sutter |
| 7,359,507 B2 | 4/2008 | Kaliski |
| 7,360,202 B1 | 4/2008 | Seshadri et al. |
| 7,363,496 B2 | 4/2008 | Gentry |
| 7,401,216 B2 | 7/2008 | Arkko |
| 7,409,673 B2 | 8/2008 | Kuo |
| 7,419,376 B2 | 9/2008 | Sarvazyan et al. |
| 7,430,670 B1 | 9/2008 | Horning |
| 7,437,666 B2 | 10/2008 | Ramarao |
| 7,443,980 B2 | 10/2008 | Gentry |
| 7,460,670 B1 | 12/2008 | Elliott |
| 7,475,070 B2 | 1/2009 | Fan et al. |
| 7,493,488 B2 | 2/2009 | Lewis |
| 7,493,652 B2 | 2/2009 | Aura |
| 7,496,892 B2 | 2/2009 | Nuss |
| 7,500,111 B2 | 3/2009 | Hacigumus |
| 7,512,932 B2 | 3/2009 | Davidov |
| 7,522,723 B1 | 4/2009 | Shaik |
| 7,523,304 B2 | 4/2009 | Gentry |
| 7,533,270 B2 | 5/2009 | Gentry |
| 7,535,870 B2 | 5/2009 | Nikander |
| 7,536,675 B2 | 5/2009 | Gallagher |
| 7,536,676 B2 | 5/2009 | Baker |
| 7,544,062 B1 | 6/2009 | Hauschild |
| 7,561,927 B2 | 7/2009 | Oyama |
| 7,571,156 B1 | 8/2009 | Gupta |
| 7,571,169 B2 | 8/2009 | Jones |
| 7,574,692 B2 | 8/2009 | Herscu |
| 7,575,434 B2 | 8/2009 | Palakodeti |
| 7,577,250 B2 | 8/2009 | Damgaard |
| 7,580,988 B2 | 8/2009 | Rudd |
| 7,590,854 B2 | 9/2009 | Gentry |
| 7,596,552 B2 | 9/2009 | Levy et al. |
| 7,620,606 B2 | 11/2009 | Gentry |
| 7,620,625 B2 | 11/2009 | Ramzan |
| 7,620,632 B2 | 11/2009 | Andrews |
| 7,620,978 B1 | 11/2009 | Reddy |
| 7,624,385 B2 | 11/2009 | Waddington |
| 7,627,591 B2 | 12/2009 | Letourneau |
| 7,630,995 B2 | 12/2009 | Letourneau |
| 7,636,727 B2 | 12/2009 | Schiffmann |
| 7,640,432 B2 | 12/2009 | Gennaro |
| 7,650,592 B2 | 1/2010 | Eckels |
| 7,653,817 B2 | 1/2010 | Gentry |
| 7,657,748 B2 | 2/2010 | Gentry |
| 7,661,096 B2 | 2/2010 | Meijer et al. |
| 7,664,855 B1 | 2/2010 | Freed |
| 7,664,957 B2 | 2/2010 | Gentry |
| 7,669,183 B2 | 2/2010 | Bowman |
| 7,681,177 B2 | 3/2010 | Letourneau |
| 7,720,807 B1 | 5/2010 | Letourneau |
| 7,721,089 B2 | 5/2010 | Gentry |
| 7,729,495 B2 | 6/2010 | Lee |
| 7,730,319 B2 | 6/2010 | Ramzan |
| 7,743,252 B2 | 6/2010 | Ramzan |
| 7,747,857 B2 | 6/2010 | Ramzan |
| 7,751,558 B2 | 7/2010 | Gentry |
| 7,761,847 B2 | 7/2010 | Kornerup et al. |
| 7,761,858 B2 | 7/2010 | Chang |
| 7,765,183 B2 | 7/2010 | Williams, Jr. |
| 7,779,396 B2 | 8/2010 | Meijer et al. |
| 7,783,579 B2 | 8/2010 | Gentry |
| 7,796,751 B2 | 9/2010 | Gentry |
| 7,801,923 B2 | 9/2010 | Letourneau |
| 7,814,314 B2 | 10/2010 | Gentry |
| 7,814,320 B2 | 10/2010 | Mackenzie |
| 7,814,326 B2 | 10/2010 | Gentry |
| 7,818,570 B2 | 10/2010 | Gentry |
| 7,831,998 B2 | 11/2010 | Mackenzie |
| 7,840,994 B2 | 11/2010 | Gentry |
| 7,853,016 B2 | 12/2010 | Gentry |
| 7,856,100 B2 | 12/2010 | Wang |
| 7,869,598 B2 | 1/2011 | Kerschbaum |
| 7,877,410 B2 | 1/2011 | Staddon |
| 7,882,147 B2 | 2/2011 | Letourneau |
| 7,890,928 B2 | 2/2011 | Patrudu |
| 7,899,821 B1 | 3/2011 | Schiffmann |
| 7,925,027 B2 | 4/2011 | Kempf |
| 7,941,422 B2 | 5/2011 | Ramzan |
| 7,957,525 B2 | 6/2011 | Gentry |
| 7,987,201 B2 | 7/2011 | Ramzan |
| 8,006,086 B2 | 8/2011 | Gentry |
| 8,024,562 B2 | 9/2011 | Gentry |
| 8,032,860 B2 | 10/2011 | Piehler et al. |
| 8,037,102 B2 | 10/2011 | Letourneau |
| 8,060,868 B2 | 11/2011 | Meijer |
| 8,065,332 B2 | 11/2011 | Ramzan |
| 8,074,073 B2 | 12/2011 | Gentry |
| 8,098,823 B2 | 1/2012 | Kempf |
| 8,112,740 B2 | 2/2012 | Meijer |
| 8,132,006 B2 | 3/2012 | Ramzan |
| 8,151,244 B2 | 4/2012 | Hsu |
| 8,151,276 B2 | 4/2012 | Grechanik et al. |
| 8,156,327 B2 | 4/2012 | Gentry |
| 8,171,306 B2 | 5/2012 | Venkatesan |
| 8,180,049 B2 | 5/2012 | Gentry |
| 8,181,155 B2 | 5/2012 | Pinto et al. |
| 8,209,531 B2 | 6/2012 | Gentry |
| 8,230,526 B2 | 7/2012 | Holland et al. |
| 8,249,250 B2 | 8/2012 | Rane |
| 8,249,260 B2 | 8/2012 | Tian |
| 8,250,526 B2 | 8/2012 | Anderson et al. |
| 8,256,015 B2 | 8/2012 | Gentry |
| 8,311,213 B2 | 11/2012 | Rane |
| 8,312,518 B1 | 11/2012 | Ezell |
| 8,316,059 B1 | 11/2012 | Schiffmann |
| 8,321,664 B2 | 11/2012 | Gentry |
| 8,347,398 B1 | 1/2013 | Weber |
| 8,356,040 B2 | 1/2013 | Letourneau |
| 8,365,137 B2 | 1/2013 | Fant |
| 8,375,050 B1 | 2/2013 | Letourneau |
| 8,433,065 B2 | 4/2013 | Gentry |
| 8,438,534 B2 | 5/2013 | Thomson |
| 8,443,339 B2 | 5/2013 | Letourneau |
| 8,515,058 B1 * | 8/2013 | Gentry .................. H04L 9/008 380/28 |
| 8,532,289 B2 | 9/2013 | Gentry |
| 8,565,435 B2 | 10/2013 | Gentry |
| 8,601,262 B2 | 12/2013 | Tariq |
| 8,612,461 B2 | 12/2013 | Schiffmann |
| 8,615,530 B1 | 12/2013 | Letourneau |
| 8,626,777 B2 | 1/2014 | Letourneau |
| 8,627,107 B1 | 1/2014 | Kennedy |
| 8,630,422 B2 | 1/2014 | Gentry |

(56) References Cited

U.S. PATENT DOCUMENTS

| | | |
|---|---|---|
| 8,650,201 B2 | 2/2014 | Letourneau |
| 8,656,482 B1 | 2/2014 | Tosa |
| 8,681,973 B2 | 3/2014 | Weinman |
| 8,683,431 B2 | 3/2014 | Thomson |
| 8,700,915 B2 | 4/2014 | Michiels |
| 8,762,736 B1 | 6/2014 | Goldwasser |
| 8,762,942 B2 | 6/2014 | Langworthy et al. |
| 8,762,964 B2 | 6/2014 | Turner |
| 8,861,716 B2 | 10/2014 | Halevi |
| 8,862,895 B2 | 10/2014 | Rieffel |
| 8,903,083 B2 | 12/2014 | Gentry |
| 8,909,967 B1 | 12/2014 | Van Dijk |
| 8,958,555 B2 | 2/2015 | Gentry |
| 8,990,769 B2 | 3/2015 | Letourneau |
| 9,002,862 B2 | 4/2015 | Schiffmann |
| 9,015,202 B2 | 4/2015 | Letourneau |
| 9,020,961 B2 | 4/2015 | Letourneau |
| 9,043,347 B2 | 5/2015 | Letourneau |
| 9,071,598 B2 | 6/2015 | Ramzan |
| 9,077,515 B2 | 7/2015 | Letourneau |
| 9,083,526 B2 | 7/2015 | Gentry |
| 9,094,378 B1 | 7/2015 | Yung |
| 9,124,650 B2 | 9/2015 | Maharajh |
| 9,177,003 B2 | 11/2015 | Letourneau |
| 9,245,050 B2 | 1/2016 | Schiffmann |
| 9,252,954 B2 | 2/2016 | Halevi |
| 9,281,941 B2 | 3/2016 | Gentry |
| 9,330,128 B2 | 5/2016 | Schiffmann |
| 9,331,851 B2 | 5/2016 | Youn |
| 9,338,000 B2 | 5/2016 | Naccache |
| 9,380,037 B2 | 6/2016 | Parann-Nissany |
| 9,411,841 B2 | 8/2016 | Schiffmann |
| 9,424,421 B2 | 8/2016 | Aissi |
| 9,425,951 B2 | 8/2016 | Letourneau |
| 9,430,512 B2 | 8/2016 | Letourneau |
| 9,477,845 B2 | 10/2016 | Boivie |
| 9,521,126 B2 | 12/2016 | Yarvis |
| 9,563,653 B2 | 2/2017 | Letourneau |
| 9,584,517 B1 | 2/2017 | Roth |
| 9,608,817 B2 | 3/2017 | Gentry |
| 9,621,346 B2 | 4/2017 | Gentry |
| 9,646,034 B2 | 5/2017 | Schiffmann |
| 9,646,107 B2 | 5/2017 | Letourneau |
| 9,716,590 B2 | 7/2017 | Gentry |
| 9,742,566 B2 | 8/2017 | Gentry |
| 2001/0003211 A1 | 6/2001 | Bera |
| 2001/0016909 A1 | 8/2001 | Gehrmann |
| 2001/0026619 A1 | 10/2001 | Howard |
| 2001/0034833 A1 | 10/2001 | Yagasaki |
| 2001/0034839 A1 | 10/2001 | Karjoth |
| 2001/0037250 A1 | 11/2001 | Lefkowitz |
| 2002/0007457 A1 | 1/2002 | Neff |
| 2002/0018569 A1 | 2/2002 | Panjwani |
| 2002/0025034 A1 | 2/2002 | Solinas |
| 2002/0025475 A1 | 2/2002 | Matsumoto |
| 2002/0040292 A1 | 4/2002 | Marcu |
| 2002/0041682 A1 | 4/2002 | Lambert |
| 2002/0046337 A1 | 4/2002 | Micali |
| 2002/0046339 A1 | 4/2002 | Bellare |
| 2002/0059281 A1 | 5/2002 | Watanabe et al. |
| 2002/0062259 A1 | 5/2002 | Katz |
| 2002/0067832 A1 | 6/2002 | Jablon |
| 2002/0083060 A1 | 6/2002 | Wang |
| 2002/0103999 A1 | 8/2002 | Camnisch et al. |
| 2002/0107860 A1 | 8/2002 | Gobeille et al. |
| 2002/0120844 A1 | 8/2002 | Faccin et al. |
| 2002/0129129 A1 | 9/2002 | Bloch et al. |
| 2002/0130796 A1 | 9/2002 | Tsuchido et al. |
| 2002/0133497 A1 | 9/2002 | Draper |
| 2002/0133607 A1 | 9/2002 | Nikander |
| 2002/0136401 A1 | 9/2002 | Hoffstein |
| 2002/0147906 A1 | 10/2002 | Lotspiech |
| 2002/0149604 A1 | 10/2002 | Wilkinson |
| 2002/0152380 A1 | 10/2002 | O'Shea |
| 2002/0152384 A1 | 10/2002 | Shelest et al. |
| 2002/0154782 A1 | 10/2002 | Chow et al. |
| 2002/0164035 A1 | 11/2002 | Yokota et al. |
| 2002/0165824 A1 | 11/2002 | Micali |
| 2002/0169563 A1 | 11/2002 | De Carvalho Ferreira |
| 2002/0184504 A1 | 12/2002 | Hughes |
| 2002/0188850 A1 | 12/2002 | Naccache et al. |
| 2003/0041088 A1 | 2/2003 | Wilson |
| 2003/0056118 A1 | 3/2003 | Troyansky |
| 2003/0058118 A1 | 3/2003 | Wilson |
| 2003/0061170 A1 | 3/2003 | Uzo |
| 2003/0065659 A1 | 4/2003 | Agarwal et al. |
| 2003/0079124 A1 | 4/2003 | Serebrennikov |
| 2003/0081785 A1 | 5/2003 | Boneh |
| 2003/0084293 A1 | 5/2003 | Arkko |
| 2003/0095665 A1 | 5/2003 | Wheeler |
| 2003/0097562 A1 | 5/2003 | Wheeler |
| 2003/0097569 A1 | 5/2003 | Wheeler et al. |
| 2003/0115559 A1 | 6/2003 | Sawada |
| 2003/0120931 A1 | 6/2003 | Hopkins et al. |
| 2003/0123546 A1 | 7/2003 | Falik |
| 2003/0126400 A1 | 7/2003 | Debiez |
| 2003/0130977 A1 | 7/2003 | Oommen |
| 2003/0161474 A1 | 8/2003 | Matsuzaki |
| 2003/0167445 A1 | 9/2003 | Su |
| 2003/0172262 A1 | 9/2003 | Curry |
| 2003/0177352 A1 | 9/2003 | Camenisch |
| 2003/0179885 A1 | 9/2003 | Gentry |
| 2003/0182554 A1 | 9/2003 | Gentry et al. |
| 2003/0195885 A1 | 10/2003 | Emmick |
| 2003/0195890 A1 | 10/2003 | Oommen |
| 2003/0200441 A1 | 10/2003 | Jeffries |
| 2003/0211842 A1 | 11/2003 | Kempf |
| 2003/0217265 A1 | 11/2003 | Nakano |
| 2003/0221101 A1 | 11/2003 | Micali |
| 2003/0221102 A1 | 11/2003 | Jakobsson |
| 2003/0229788 A1 | 12/2003 | Jakobsson |
| 2003/0236794 A1 | 12/2003 | Hostetter et al. |
| 2003/0236976 A1 | 12/2003 | Wheeler |
| 2004/0008845 A1 | 1/2004 | Le |
| 2004/0010752 A1 | 1/2004 | Chan et al. |
| 2004/0024790 A1 | 2/2004 | Everett |
| 2004/0030932 A1 | 2/2004 | Juels |
| 2004/0044659 A1 | 3/2004 | Judd |
| 2004/0049675 A1 | 3/2004 | Micali |
| 2004/0054692 A1 | 3/2004 | Seyrat et al. |
| 2004/0060006 A1 | 3/2004 | Lindblad |
| 2004/0060007 A1 | 3/2004 | Gottlob et al. |
| 2004/0064691 A1 | 4/2004 | Lu |
| 2004/0068498 A1 | 4/2004 | Patchet |
| 2004/0068647 A1 | 4/2004 | Hariharan |
| 2004/0078536 A1 | 4/2004 | Chen |
| 2004/0103105 A1 | 5/2004 | Lindblad |
| 2004/0122844 A1 | 6/2004 | Malloy |
| 2004/0128504 A1 | 7/2004 | Kivinen |
| 2004/0148505 A1 | 7/2004 | Qiu |
| 2004/0148592 A1 | 7/2004 | Vion-Dury |
| 2004/0151309 A1 | 8/2004 | Gentry |
| 2004/0153652 A1 | 8/2004 | Suga |
| 2004/0196972 A1 | 10/2004 | Zhu |
| 2004/0205047 A1 | 10/2004 | Carpenter |
| 2004/0215642 A1 | 10/2004 | Cameron |
| 2004/0215661 A1 | 10/2004 | Zhang et al. |
| 2004/0234074 A1 | 11/2004 | Sprunk |
| 2004/0236939 A1 | 11/2004 | Watanabe |
| 2004/0239674 A1 | 12/2004 | Ewald |
| 2004/0250100 A1 | 12/2004 | Agrawal |
| 2004/0254909 A1 | 12/2004 | Testa |
| 2004/0260683 A1 | 12/2004 | Chan et al. |
| 2004/0260684 A1 | 12/2004 | Agrawal |
| 2004/0260926 A1 | 12/2004 | Arditti Modiano |
| 2004/0268236 A1 | 12/2004 | Chidlovskii et al. |
| 2005/0005126 A1 | 1/2005 | Zhang |
| 2005/0010581 A1 | 1/2005 | Doan |
| 2005/0021548 A1 | 1/2005 | Bohannon et al. |
| 2005/0022102 A1 | 1/2005 | Gentry |
| 2005/0023524 A1 | 2/2005 | Beatty |
| 2005/0027743 A1 | 2/2005 | O'Neil et al. |
| 2005/0028009 A1 | 2/2005 | Neff |
| 2005/0028091 A1 | 2/2005 | Bordawekar |

(56) References Cited

U.S. PATENT DOCUMENTS

| | | |
|---|---|---|
| 2005/0044365 A1 | 2/2005 | Haukka |
| 2005/0050016 A1 | 3/2005 | Stanoi et al. |
| 2005/0050066 A1 | 3/2005 | Hughes |
| 2005/0053045 A1 | 3/2005 | Chmora |
| 2005/0055548 A1 | 3/2005 | Micali |
| 2005/0058976 A1 | 3/2005 | Vernon |
| 2005/0060332 A1 | 3/2005 | Bernstein |
| 2005/0065964 A1 | 3/2005 | Ziemann |
| 2005/0071627 A1 | 3/2005 | Montenegro |
| 2005/0081037 A1 | 4/2005 | Kumagai |
| 2005/0097063 A1 | 5/2005 | Benaloh |
| 2005/0097316 A1 | 5/2005 | Kim |
| 2005/0120233 A1 | 6/2005 | Halcrow |
| 2005/0125432 A1 | 6/2005 | Lin et al. |
| 2005/0138073 A1 | 6/2005 | Zhou et al. |
| 2005/0154265 A1 | 7/2005 | Miro et al. |
| 2005/0154979 A1 | 7/2005 | Chidlovskii |
| 2005/0156761 A1 | 7/2005 | Oh |
| 2005/0165732 A1 | 7/2005 | Burges |
| 2005/0169464 A1 | 8/2005 | Sannino et al. |
| 2005/0187900 A1 | 8/2005 | LeTourneau |
| 2005/0193048 A1 | 9/2005 | Vaudenay |
| 2005/0214727 A1 | 9/2005 | Stoianovici et al. |
| 2005/0216445 A1 | 9/2005 | Rao |
| 2005/0246533 A1 | 11/2005 | Gentry |
| 2005/0267908 A1 | 12/2005 | Letourneau |
| 2005/0278534 A1 | 12/2005 | Nadalin |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | Letourneau |
| 2006/0015946 A1 | 1/2006 | Yagawa |
| 2006/0041759 A1 | 2/2006 | Kaliski, Jr. |
| 2006/0053122 A1 | 3/2006 | Korn |
| 2006/0074838 A1 | 4/2006 | Srivastava |
| 2006/0083377 A1 | 4/2006 | Ptasinski |
| 2006/0085651 A1 | 4/2006 | Staddon et al. |
| 2006/0095442 A1 | 5/2006 | LeTourneau |
| 2006/0095455 A1 | 5/2006 | LeTourneau |
| 2006/0095769 A1 | 5/2006 | Zuccherato et al. |
| 2006/0123029 A1 | 6/2006 | Letourneau |
| 2006/0126832 A1 | 6/2006 | Takahashi |
| 2006/0129582 A1 | 6/2006 | Schiffmann |
| 2006/0129803 A1 | 6/2006 | Gentry |
| 2006/0136728 A1 | 6/2006 | Gentry |
| 2006/0209351 A1 | 9/2006 | Saito |
| 2006/0259533 A1 | 11/2006 | Letourneau |
| 2006/0262933 A1 | 11/2006 | Furukawa |
| 2006/0271573 A1 | 11/2006 | Letourneau |
| 2007/0003917 A1 | 1/2007 | Kitching et al. |
| 2007/0005594 A1 | 1/2007 | Pinkas |
| 2007/0016769 A1 | 1/2007 | Gentry et al. |
| 2007/0050629 A1 | 3/2007 | Gentry et al. |
| 2007/0113075 A1 | 5/2007 | Jo |
| 2007/0116283 A1 | 5/2007 | Tuyls |
| 2007/0118283 A1 | 5/2007 | Jendbro |
| 2007/0118746 A1 | 5/2007 | Lauter |
| 2007/0140479 A1 | 6/2007 | Wang |
| 2007/0156586 A1 | 7/2007 | Kerschbaum |
| 2007/0189539 A1 | 8/2007 | Kim |
| 2007/0192864 A1 | 8/2007 | Bryant |
| 2007/0198538 A1 | 8/2007 | Palacios |
| 2007/0289006 A1 | 12/2007 | Ramachandran |
| 2008/0010467 A1 | 1/2008 | Kerschbaum |
| 2008/0037774 A1 | 2/2008 | Slavin |
| 2008/0059787 A1 | 3/2008 | Hohenberger et al. |
| 2008/0133926 A1 | 6/2008 | Gentry |
| 2008/0152130 A1 | 6/2008 | Teranishi |
| 2008/0162927 A1 | 7/2008 | Wang et al. |
| 2008/0178005 A1 | 7/2008 | Gentry |
| 2008/0212780 A1 | 9/2008 | Lemma et al. |
| 2008/0226066 A1 | 9/2008 | Yi et al. |
| 2008/0250239 A1 | 10/2008 | Risan et al. |
| 2008/0294909 A1 | 11/2008 | Ostrovsky |
| 2008/0304657 A1 | 12/2008 | Tuyls |
| 2008/0313465 A1 | 12/2008 | Gentry |
| 2009/0006855 A1 | 1/2009 | Tuyls |
| 2009/0024852 A1 | 1/2009 | Yonezawa et al. |
| 2009/0034739 A1 | 2/2009 | Teranishi |
| 2009/0034740 A1 | 2/2009 | Gentry |
| 2009/0041233 A1 | 2/2009 | Gentry |
| 2009/0062942 A1 | 3/2009 | Smaragdis |
| 2009/0103721 A1 | 4/2009 | Sada |
| 2009/0138459 A1 | 5/2009 | Walter |
| 2009/0157735 A1 | 6/2009 | Gentry |
| 2009/0175448 A1 | 7/2009 | Watanabe |
| 2009/0175449 A1 | 7/2009 | Watanabe |
| 2009/0175454 A1 | 7/2009 | Watanabe |
| 2009/0193033 A1 | 7/2009 | Ramzan |
| 2009/0193260 A1 | 7/2009 | Gentry |
| 2009/0208013 A1 | 8/2009 | Watanabe |
| 2009/0268908 A1 | 10/2009 | Bikel |
| 2009/0327748 A1 | 12/2009 | Agrawal |
| 2010/0005310 A1 | 1/2010 | Gentry |
| 2010/0094885 A1 | 4/2010 | Andrews |
| 2010/0094908 A1 | 4/2010 | Letourneau |
| 2010/0114969 A1 | 5/2010 | Letourneau |
| 2010/0153714 A1 | 6/2010 | Ramzan |
| 2010/0174904 A1 | 7/2010 | Ramzan |
| 2010/0191775 A1 | 7/2010 | Schiffmann |
| 2010/0205581 A1 | 8/2010 | LeTourneau |
| 2010/0246812 A1 | 9/2010 | Rane |
| 2010/0287370 A1 | 11/2010 | Gentry |
| 2010/0318521 A1 | 12/2010 | Letourneau |
| 2010/0329448 A1 | 12/2010 | Rane |
| 2011/0099385 A1 | 4/2011 | Takahashi |
| 2011/0110525 A1* | 5/2011 | Gentry .................. H04L 9/0822 380/285 |
| 2011/0131259 A1 | 6/2011 | Letourneau |
| 2011/0238542 A1 | 9/2011 | Gentry |
| 2011/0243320 A1* | 10/2011 | Halevi ..................... H04L 9/008 380/30 |
| 2011/0283099 A1 | 11/2011 | Nath |
| 2012/0039463 A1* | 2/2012 | Gentry .................... H04L 9/008 380/28 |
| 2012/0039465 A1 | 2/2012 | Gentry |
| 2012/0039473 A1 | 2/2012 | Gentry |
| 2012/0066510 A1 | 3/2012 | Weinman |
| 2012/0144388 A1 | 6/2012 | Kurian |
| 2012/0151205 A1 | 6/2012 | Raykova |
| 2013/0170640 A1 | 7/2013 | Gentry |
| 2013/0216044 A1 | 8/2013 | Gentry |
| 2013/0329883 A1 | 12/2013 | Tamayo-Rios |
| 2014/0140514 A1 | 5/2014 | Gentry |
| 2014/0177828 A1 | 6/2014 | Loftus |
| 2015/0033018 A1 | 1/2015 | Tateishi |
| 2015/0124962 A1 | 5/2015 | Gentry |
| 2015/0172258 A1 | 6/2015 | Komano |
| 2015/0193517 A1 | 7/2015 | Letourneau |
| 2015/0310048 A1 | 10/2015 | Letourneau |
| 2015/0356281 A1* | 12/2015 | Van Deventer ......... H04L 9/008 713/176 |
| 2016/0117353 A1 | 4/2016 | Schiffmann |
| 2016/0132692 A1* | 5/2016 | Kerschbaum ....... G06F 21/6227 713/189 |
| 2016/0162528 A1 | 6/2016 | Letourneau |
| 2016/0328431 A1 | 11/2016 | Schiffmann |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0164973 A1 | 6/2017 | Lesko |
| 2017/0255660 A1 | 9/2017 | Schiffmann |

OTHER PUBLICATIONS

Aggarwal et al., Fully Homomorphic Symmetric Scheme Without Bootstrapping, 2014, IEEE, International Conference on Cloud Computing and Internet of Things (CCIOT 2014), pp. 14-17.*

LeTourneau, J.J., The Elementary Theory of Finite Multisets; Prime Arithmetics, Inc.; UCB, Logic Colloquium, (Feb. 21, 1992).

Immerman, Neil, "P versus NP: Approaches, Rebuttals, an Does It Matter?", www.cs.umass.edu/~immerman. (Aug. 2010).

(56) References Cited

OTHER PUBLICATIONS

D. Richard, 1985, "All arithmetical sets of powers of primes are first-order definable in terms of the successor function and the co-primeness predicate." Discrete Math 53 (1985)): pp. 221-247.
Robinson, Julia. Definability and Decision Problems in Arithmetic. J. Symbolic Logic 14 (1949), No. 2, 98--114.https://projecteuclid.org/euclid.jsl/1183730618.
Sam Buss (with Mia Minnes). Probabilistic Algorithmic Randomness. Journal of Symbolic Logic 78, 2 (2013) 579-601.
Samuel R. Buss. Bounded Arithmetic. Ph.D. thesis, Department of Mathematics, Princeton University, 1985. 188+v pages.

\* cited by examiner

FIG 1A: Canonical $A_1$ Enumerations

| "CARDINAL" | "ORDINAL" |
|---|---|
| dots first | box first |

| | | |
|---|---|---|
| 0. | 0 | 0 |
| 1. | 1 | 1 |
| 2. | $C_1(1)$ | $B(1)$ |
| 3. | $B(1)$ | $C_1(1)$ |
| 4. | $C_1(C_1(1))$ | $B(1)+B(1)$. |
| 5. | $B(C_1(1))$ | $B(B(1))$. |
| 6. | $C_1(B(1))$ | $C_1(B(1))$. |
| 7. | $B(B(1))$ | $B(C_1(1))$. |
| 8. | $C_1(C_1(C_1(1)))$ | $B(1)+(B(1))+B(1)$. |
| 9. | $B(1)+B(1)$ | $C_1(C_1(1))$ |
| 10. | $C_1(B(C_1(1)))$ | $B(1)+B(B(1))$ |
| 11. | $B(C_1(C_1(1)))$ | $B(B(1)+B(1))$ |
| 12. | $C_1(C_1(B(1)))$ | $C_1(B(1)+B(1))$ |
| 13. | $B(B(C_1(1)))$ | $B(B(B(1)))$ |
| 14. | $C_1(B(B(1)))$ | $B(1)+B(C_1(1))$ |
| 15. | $B(1)+B(C_1(1))$ | $C_1(B(B(1)))$ |
| 16. | $C_1(C_1(C_1(C_1(1))))$ | $B(1)+(B(1)+(B(1)+B(1)))$ |
| 17. | $B(C_1(B(1)))$ | $B(C_1(B(1)))$ |
| 18. | $C_1(B(1)+B(1))$ | $B(1)+C_1(C_1(1))$ |
| 19. | $B(B(B(1)))$ | $B(B(C_1(1)))$ |
| 20. | $C1(C_1(B(C_1(1))))$ | $B(1)+(B(1)+B(B(1)))$ |
| 21. | $B(1)+B(B(1))$ | $C_1(B(C_1(1))$ |
| 22. | $C_1(B(C_1(C_1(1))))$ | $B(1)+B(B(1)+B(1))$ |
| 23. | $B(C_1(C_1(C_1(1))))$ | $B(B(1)+(B(1)+B(1))$ |
| 24. | $C_1(C_1(C_1(B(1))))$ | $C_1(B(1)+(B(1)+B(1))$ |
| 25. | $B(C_1(1))+B(C_1(1))$ | $B(B(1))+B(B(1))$ |

FIG 1B: Canonical $A_2$ Enumerations

| # | "CARDINAL" Dots First | "ORDINAL" Box First |
|---|---|---|
| 0. | 0 | 0 |
| 1. | 1 | 1 |
| 2. | $C_1(1)$ | $B(1)$ |
| 3. | $C_2(1)$ | $C_1(1)$ |
| 4. | $C_1(C_1(1))$ | $B(1)+B(1)$ |
| 5. | $B(1)$ | $C_2(1)$ |
| 6. | $C_1(C_2(1))$ | $B(1)+C_2(1)$ |
| 7. | $B(C_1(1))$ | $B(B(1))$ |
| 8. | $C_1(C_1(C_1(1)))$ | $B(1)+(B(1)+B(1))$ |
| 9. | $C_2(C_2(1))$ | $C_1(C_1(1))$ |
| 10. | $C_1(B(1))$ | $C_2(B(1))$ |
| 11. | $B(C_2(1))$ | $B(C_1(1))$ |
| 12. | $C_1(C_1(C_2(1)))$ | $C_1(B(1)+B(1))$ |
| 13. | $B(C_1(C_1(1)))$ | $B(B(1)+B(1))$ |
| 14. | $C_1(B(C_1(1)))$ | $B(1)+B(B(1))$ |
| 15. | $C_2(B(1))$ | $C_1(C_2(1))$ |
| 16. | $C_1(C_1(C_1(C_1(1))))$ | $B(1)(B(1)+(B(1)+B(1)))$ |
| 17. | $B(B(1))$ | $B(C_2(1))$ |
| 18. | $C_1(C_2(C_2(1)))$ | $B(1)+(C_1(C_1(1)))$ |
| 19. | $B(C_1(C_2(1)))$ | $B(B(1)+C_2(1))$ |
| 20. | $C_1(C1(B(1)))$ | $C_2((B(1)+B(1)))$ |
| 21. | $C_2(B(C_1(1)))$ | $C_1(C_3(1))$ |
| 22. | $C_1(B(C_2(1)))$ | $B(1)+(B(C_1(1)))$ |
| 23. | $B(B(C_1(1)))$ | $B(B(B(1)))$ |
| 24. | $C_1(C_1(C_1(C_2(1))))$ | $C_1(B(1)+(B(1)+B(1)))$ |
| 25. | $B(1)+B(1)$ | $C_2(1)+C_2(1)$ |

FIG 1C: Canonical $A_3$ Enumerations

| "CARDINAL" Dots First | "ORDINAL" Box First |
|---|---|
| 0.  0 | 0 |
| 1.  1 | 1 |
| 2.  $C_1(1)$ | $B(1)$ |
| 3.  $C_2(1)$ | $C_1(1)$ |
| 4.  $C_1(C_1(1))$ | $B(1)+B(1)$ |
| 5.  $C_3(1)$ | $C_2(1)$ |
| 6.  $C_1(C_2(1))$ | $C_1(B(1))$ |
| 7.  $B(1)$ | $C_3(1)$ |
| 8.  $C_1(C_1(C_1(1)))$ | $B(1)+(B(1)+B(1))$ |
| 9.  $C_2(C_2(1))$ | $C_1(C_1(1))$ |
| 10. $C_1(C_3(1))$ | $B(1)+C_2(1)$ |
| 11. $B(C_1(1))$ | $B(B1)$ |
| 12. $C_1(C_1(C_2(1)))$ | $C_1(B(1)+B(1))$ |
| 13. $B(C_2(1))$ | $B(C_1(1))$ |
| 14. $C_1(B(1))$ | $B(1)+$ |
| 15. $C_2(C_3(1))$ | $C_1(C_2(1))$ |
| 16. $C_1(C_1(C_1(C_1(1))))$ | $B(1)+(B(1)+(B(1)+B(1)))$ |
| 17. $B(4)$ | $B(B(1)+B(1))$ |
| 18. $C_1(C_2(C_2(1)))$ | $B(1)+C_1(C_1(1))$ |
| 19. $B(5)$ | $B(C_2(1))$ |
| 20. $C_1(C_1(C_3(1)))$ | $B(1)+B(1)+C_2(1)$ |
| 21. $C_2(B(1))$ | $C_1(C_3(1))$ |
| 22. $C_1(B(C_1(1)))$ | $B(1)+B(B1)$ |
| 23. $B(6)$ | $B(C_1(B(1)))$ |
| 24. $C_1(C_1(C_1(C_2(1))))$ | $C_1(B(1)+(B(1)+B(1)))$ |
| 25. $C_3(C_3(1))$ | $C_2(C_2(1))$ |

SHE

| Name space (bits) | Key Gen (sec) | Encrypt (sec) | Mult/ decode (sec) |
|---|---|---|---|
| 11 (2048) | 1.25 | 0.06 | 0.023 |
| 13 (8096) | 10 | 0.7 | 0.12 |
| 16 (32768) | 95 | 5.3 | 0.6 |

- Can only be used for niche applications

FHE

| Name Space (bits) | Key Gen | Encrypt | Recrypt | PK Size (MB) |
|---|---|---|---|---|
| 11 (2048) | 40 sec | 31 sec | 31 sec | 70 |
| 13 (8096) | 8 min | 3 min | 3 min | 285 |
| 16 (32768) | 2 hrs | 30 min | 30 min | 2300 |

- Encrypting one bit takes ~19 seconds
- It takes 99 minutes to encrypt this sentence

UHE

| Name space (bits) | Key Gen | Encrypt | Mult/ Addition | PK Size (MB) |
|---|---|---|---|---|
| | | microseconds (µs) | | |
| 8 (256) | <1 | <1 | <1 | <1 |
| 16 (32768) | <1 | <1 | <1 | <1 |
| 32 (4.2×10⁹) | <1 | <1 | <1 | <1 |

- The above is Un-optimized UHE Performance
- There is virtually no data expansion
- Both processing speed and data size are independent of the namespace size
- requires further optimization

FIG. 2

| 2100 | | | |
|---|---|---|---|
| 2105 | 2110 | | 2115 |
| 0 | 1=p(0) | < | 10 > |
| 1 | 2=p(1) | < | 110 > |
| 2 | 3=p(2) | < | 1110 > |
| 3 | 5=p(3) | < | 11110 > |
| 4 | 7=p(4) | < | 10110110 > |
| 5 | 11=p(5) | < | 111110 > |
| 6 | 13=p(6) | < | 10110110 > |
| 7 | 17=p(7) | < | 110110110 > |
| 8 | 19=p(8) | < | 101101110 > |
| 9 | 23=p(9) | < | 101110110 > |
| 10 | 29=p(10) | < | 10[2]p[5]p > |
| 11 | 31=p(11) | < | 1[11]p > |
| 12 | 37=p(12) | < | 10[2]p[2]p[3]p > |

FIG. 21

Algorithm 1. Montgomery Multiplication

Input: $x = (x_{n-1} \ldots x_1 x_0)_b, y = (y_{n-1} \ldots y_1 y_0)_b, m = (m_{n-1} \ldots m_1 m_0)_b$ with $0 \leq x, y < m, R = b^n$ with $\gcd(m, b) = 1$, and $m' = -m^{-1} \bmod b$
// $m^{-1}$ is the inverse modular of $b$

Output: $A = xyR^{-1} \bmod m$ or $\text{Mont}(x, y)$
// $R^{-1}$ is the inverse modular of $m$ 1. begin
2.    $A = 0$;
3.    for $i = 0$ to $n - 1$ do
5.    begin
6.      $u_i = (a_0 + x_i y_0) m' \bmod b$;
7.      $A = (A + x_i y + u_i m)/b$;
8.    end;
9.    if $A \geq m$ then $A = A - m$;     // $A = (a_n a_{n-1} \ldots a_1 a_0)_b$
10.    Return($A$);
11. end.

FIG. 22A

Algorithm 2. Binary Montgomery Exponentiation

Pre-compute: $\tilde{x} = \text{Mont}(x, R^2 \bmod m), A = R \bmod m$
// $x, m,$ and $R$ are the inputs of Algorithm 1

Input: $\tilde{x}, m,$ and $e = (e_t \ldots e_1 e_0)_2$ with $e_t = 1$
// $(e_t \ldots e_1 e_0)_2$ is the binary representation of $e$ Output: $x^e \bmod m$ 1. begin
2.   for $i = t$ to $0$ do      // Scan exponent bits from
3.   begin      // right to left
4.     $A = \text{Mont}(A, A)$;      // Squaring
5.     if $e_i = 1$ then $A = \text{Mont}(A, \tilde{x})$;      // Multiplication
6.   end;
7.   $A = \text{Mont}(A, 1)$;
8.   Return($A$);
9. end.

Algorithm 3. Signed Digit Recoding

Input: $E = (r_{m-1}r_{m-2}\ldots r_0)_2$ where $r_i$ is the binary representation of $E$ Output: $E_{SD} = (e_n e_{n-1} \ldots e_0)_{SD}$ 1. *begin*
2.     $c_0 = 0; r_{m+1} = 0; r_m = 0;$
3.     *for $i = 0$ to $m$ do*
4.         *begin*
5.             $c_{i+1} = \lfloor (c_i + r_i + r_{(i+1)})/2 \rfloor;$   // $\lfloor x \rfloor$ : *the largest integer $\leq x$*
6.             $e_i = c_i + r_i - 2(c_{i+1});$
7.         *end;*
8. *end.*

FIG. 22C

Algorithm 4. CMM-SDR Montgomery Algorithm

Input: $M, N, E_{SD}, R$ where $M$ is the message, $N$ is the modular and $E_{SD}$ is the exponent in signed digit form
// $R$ is the input of Algorithm 1 and $E_{SD}$ is the output of Algorithm 3
Output: $C \equiv M^{E_{SD}} \bmod N$ 1. begin
2.    $S \equiv MR \bmod N$, $C \equiv R \bmod N$, $D \equiv R \bmod N$
3.    for $i = 0$ to $m$ do
4.      begin
5.        if ($e_i = 1$) then $C = \text{Mont}(S, C)$;  // Multiplication
6.        if ($e_i = -1$) then $D = \text{Mont}(S, D)$;  // Multiplication
7.        $S = \text{Mont}(S, S)$;  // Squaring
8.      end;
9.    $C = \text{Mont}(C, 1)$; $D = \text{Mont}(D, 1)$;
10.   $C \equiv C \times D^{-1} \bmod N$  // $C \equiv M^{E_{SD}} \bmod N$
11. end.

SYSTEMS AND METHODS FOR IMPLEMENTING AN EFFICIENT, SCALABLE HOMOMORPHIC TRANSFORMATION OF ENCRYPTED DATA WITH MINIMAL DATA EXPANSION AND IMPROVED PROCESSING EFFICIENCY

CROSS-REFERENCE

The present application relies on U.S. Patent Provisional Application No. 62/418,395 entitled "Systems and Methods for Implementing an Efficient, Scalable Homomorphic Encryption with Minimal Data Expansion and Improved Processing Efficiency", and filed on Nov. 7, 2016, for priority.

The present application is also a continuation-in-part application of U.S. patent application Ser. No. 15/782,109, entitled "Systems and Methods for Implementing an Efficient, Scalable Homomorphic Encryption with Minimal Data Expansion and Improved Processing Efficiency" and filed on Oct. 12, 2017, which relies on the following applications for priority:

U.S. Patent Provisional Application No. 62/418,395 entitled "Systems and Methods for Implementing an Efficient, Scalable Homomorphic Encryption with Minimal Data Expansion and Improved Processing Efficiency", and filed on Nov. 7, 2016; and U.S. Patent Provisional Application No. 62/407,122, entitled "Systems and Methods for Implementing an Efficient, Scalable Homomorphic Encryption with Minimal Data Expansion and Improved Processing Efficiency", and filed on Oct. 12, 2016.

U.S. patent application Ser. No. 15/782,109 is also a continuation-in-part application of U.S. patent application Ser. No. 14/994,035, entitled "Systems and Methods for Implementing an Efficient, Scalable, Homomorphic Encryption with Minimal Data Expansion and Improved Processing Efficiency", and filed on Jan. 12, 2016. Further, the '035 application relies on the following applications for priority:

U.S. Patent Provisional Application No. 62/102,496, entitled "Systems and Methods for Implementing Homomorphic Encryption", and filed on Jan. 12, 2015;

U.S. Patent Provisional Application No. 62/126,187, entitled "Systems and Methods for Implementing Homomorphic Encryption", and filed on Feb. 27, 2015; and U.S. Patent Provisional Application No. 62/244,078, entitled "Systems and Methods for Implementing Homomorphic Encryption", and filed on Oct. 20, 2015, for priority.

All of the aforementioned applications are incorporated herein by reference in their entirety.

FIELD

The present specification generally relates to the field of encryption, and more specifically to a fully homomorphic encryption (FHE) system that can homomorphically transform encrypted data in a manner that is scalable, rapid, inexpensive, difficult to invert or break, enables various types of public and/or private key generation protocols and is semantically secure. It is equally important for FHE system to be able to process encrypted data efficiently without requiring excessive amounts of computing power or memory relative to the processing of the underlying encrypted data.

BACKGROUND

The demand for privacy of digital data and algorithms for handling more and more complex structures has increased dramatically over the last decade. This demand goes hand in hand with the growth in communication capacity and its diverse applications. For securely storing and accessing both data and networks current technology offers several alternatives, such as encrypting data or data communication pathways. However critical problems arise when one needs to perform operations on the encrypted data or to enable the modification and/or the branching of various algorithms depending on the outcome of certain computations. In such cases, the encrypted data needs to be decrypted, processed as needed, and then re-encrypted, thereby exposing the encrypted data to potential misappropriation and theft.

For example, data storage and computing services such as cloud services provide a low cost solution to users to use their large shared resources for data storage and management. Cloud computing provides almost unlimited computing power to its users. It also provides other potential benefits to users in terms of instant availability, scalability and resource sharing. Cloud service provides offer the following cloud services to users which includes online file storage (for example, Dropbox), social networking sites (for example, Facebook), webmail (for example, Gmail), and online business application (for example, Brokerage). Although cloud computing has become a mature service model, the adoption of its services by customers (businesses, consumers) is limited by concerns about a loss of privacy of their private data.

Encryption of data could solve this issue, but if the clients want to manipulate their encrypted data in the cloud, they have to share the secret key with cloud provider to decrypt it before executing the required operations. In another approach of processing encrypted data, the encrypted data is transmitted back from the cloud to a client side, decrypted at the client side to process the resulting unencrypted data. This approach leads to several security issues as the cipher text is continuously exposed. Furthermore, if the computations are performed at the client side, the main objective of using the cloud computing is not achieved.

Homomorphic encryption is an appropriate solution to solve security issues, such as those related to cloud computing, since its schemes enable the performing of computations on encrypted data without sharing the secret key needed to decrypt the data. Specifically, in a homomorphic encryption system, if one encrypts plaintext data ($P_1$) to yield encrypted data ($E_1$), and then applies the same function to encrypt $P_2$ to get $E_2$ it follows that if $E_3$ is computed through a specific polynomial function of $E_1$ and $E_2$, and, when decrypted, yields $P_3$, then the same polynomial function applied to $P_1$ and $P_2$, would result in $P_3$.

Homomorphic encryption can be categorized under three types of schemes with respect to the number of allowed operations on the encrypted data as follows: 1) Partially Homomorphic Encryption (PHE) allows only one type of operation with an unlimited number of times (that is, no bound on the number of usages); 2) Somewhat Homomorphic Encryption (SHE) allows a restricted set of operations a limited number of times, and 3) Fully Homomorphic Encryption (FHE) allows unlimited number of operations with unlimited number of times.

U.S. Pat. No. 8,565,435, issued on Oct. 22, 2013 to International Business Machines Corporation, discloses a partial homomorphic encryption and decryption method. However, the disclosed partial homomorphic system has numerous disadvantages that prevent it from being practically useful. For example, the partial homomorphic system is not homomorphic for operations other than multiplication and addition. Additionally, for the number of multiplication operations or the number of addition operations it is capable of doing, it is highly limited, resulting in only a SHE system.

Second, the disclosed partial homomorphic system attempts to mimic a fully homomorphic encryption system by using a technique called bootstrapping. In bootstrapping, a user homomorphically encrypts the key along with the message and when the ciphertext degrades as a result of too many addition or multiplication operations, the ciphertext is decrypted and then re-encrypted to remove the degradation. This dramatically increases the amount of memory, time, and processing needed to use the encrypted data.

Third, prior art attempts at homomorphic systems are not capable of operating rapidly enough to be commercially useful. For example, to encrypt 2 bytes (16 bits) of plaintext data and process it in its encrypted form can take up to 30 minutes of processing time on a multi-GHz CPU using prior art homomorphic approaches. Key generation can take even longer time and require multiple gigabytes of storage for only a 16-bit word encryption. Almost all servers, PCs and even smart phones now are built using either 64-bit or 32-bit CPUs. Going from 16-bit processing to 32-bit processing would require exponentially greater time and memory. Clearly, this performance metric effectively negates any practical application of existing homomorphic systems.

Also, a bottoms-up approach to developing an FHE scheme involves: choosing a well-defined and intensively researched hard mathematical problem. Based on this difficult mathematical problem, the following components need to be developed: Designing and Analysis of Key Generation Function, Designing and Analysis of Encryption Function, Designing and Analysis of Decryption Function, and Designing and Analysis of Evaluation Functions on encrypted data. This approach also requires addressing the following issues: development of security proof of the FHE scheme, and implementation of the FHE scheme on different hardware platforms with timing benchmarks. This approach for the designing of the FHE scheme requires considerable time and effort. Also, a challenge is for the security of the FHE scheme to stand a test of time. The cryptographic community spends years with a new cryptosystem before the community and the industry accepts the system as secure.

Accordingly, there is a need for a homomorphic encryption method that is scalable, can be used to rapidly and efficiently encrypt and decrypt, can also be used to rapidly and efficiently process encrypted data and can also operate over more than multiplication and addition, while at the same time being conservative with its need for computational space and processing power. The encryption function also needs to be very difficult to invert or break, while also allowing for various types of public and/or private key generation protocols to be supported without undermining homomorphism, speed, memory use, complexity or semantic security.

Additionally, there is also a need to take an existing conventional third-party cryptosystem that is already in use and considered to be secure by the cryptographic community and the industry in general and convert that into a highly efficient fully homomorphic solution. Stated differently, there is a need to enable homomorphic transformations of encrypted data, which is plaintext data encrypted with a conventional cryptographic scheme, such that operations can be performed on the encrypted data without first decrypting the data and yield the same result as if the operations were performed on the underlying plaintext data.

SUMMARY

The following embodiments and aspects thereof are described and illustrated in conjunction with systems and methods, which are meant to be exemplary and illustrative, not limiting in scope.

The present specification discloses a method of transforming plaintext, having a plurality of elements, into ciphertext, wherein the ciphertext is homomorphically encrypted with respect to certain functions, particularly multiplication and addition operations, the method being performed on a processor executing a plurality of instructions.

In some embodiments, the present specification discloses an encryption system comprising a computing device, wherein said computing device comprises at least one processor coupled to a memory and wherein said memory comprises instructions executable by the at least one processor to: receive a first plaintext data; modify the first plaintext data to yield second plaintext data; encrypt the second plaintext data in a first encryption format to generate a first encrypted data; receive a request to perform a computation; transform the computation into a homomorphic operation based on the first encryption format, wherein said homomorphic operation is different from the computation; apply the homomorphic operation to the first encrypted data to generate a second encrypted data; decrypt the second encrypted data using a first decryption format corresponding to the first encryption format to yield a third plaintext data; and modify the third plaintext data to generate fourth plaintext data, wherein said fourth plaintext data is equivalent to plaintext data generated by applying said computation to the first plaintext data.

Optionally, the second encrypted data does not occupy more than 4 times n log(n) of said memory relative to the first encrypted data and wherein n is equal to the number of said plurality of bits.

Optionally, the first encryption format is at least one of RSA, Goldwasser-Micali, El-Gamal, Benaloh, and Paillier.

Optionally, the computation is at least one of a multiplication operation, subtraction, division and addition operation. Optionally, transforming the computation to yield a homomorphic operation comprises redefining an addition operation as at least one multiplication operation. Optionally, the homomorphic operation requires no more than 10 times more processing cycles, executed by said processor, than the computation applied to the first plaintext data. Optionally, transforming the computation to yield a homomorphic operation comprises redefining a multiplication operation as at least one exponentiation operation. Optionally, transforming the computation to yield a homomorphic operation comprises redefining a subtraction operation as at least one division operation. Optionally, transforming the computation to yield a homomorphic operation comprises redefining a division operation as at least one root operation.

Optionally, the first plaintext data is modified by identifying a prime number that is less than an integer representative of the first plaintext data and that is on a predefined list of prime numbers, subtracting the prime number from the integer to yield a remainder, and repeating with said remainder to yield a plurality of prime numbers. Optionally, the second plaintext data is generated by multiplying said plurality of prime numbers together.

Optionally, the third plaintext data is modified by identifying a prime number that is less than an integer representative of the third plaintext data and that is on a predefined list of prime numbers, dividing the integer using the prime number to yield a remainder, and repeating with said remainder to yield a plurality of prime numbers. Optionally, the fourth plaintext data is generated by adding said plurality of prime numbers together.

Optionally, the first plaintext data is at least one of voice, face and fingerprint data of individuals.

Optionally, the first plaintext data is data collected by IoT (Internet of Things) devices in a decentralized system.

Optionally, first plaintext data comprises private blockchain data.

In some embodiments, the present specification discloses a method of homomorphically manipulating encrypted data in a computer having at least one processor coupled to a memory, wherein said memory comprises instructions executable by the at least one processor, the method comprising: in said computer, receiving a first encrypted data, wherein said first encrypted data is generated by applying a first encryption format to a first plaintext data; in said computer, receiving a request for a computation to be performed on the first encrypted data; in said computer, transforming said computation into a homomorphic operation based on the first encryption format, wherein said homomorphic operation is different from the computation; and in said computer, applying the homomorphic operation to the first encrypted data to yield second encrypted data, wherein the second encrypted data does not occupy more than 4 times n log(n) of said memory relative to the first encrypted data and wherein n is equal to the number of said plurality of bits.

Optionally, the first encryption format is at least one of RSA, Goldwasser-Micali, El-Gamal, Benaloh, and Paillier.

Optionally, transforming the computation to yield a homomorphic operation comprises redefining an addition operation as at least one multiplication operation.

Optionally, the homomorphic operation requires no more than 10 times more processing cycles, executed by the processor, than the computation applied to the first plaintext data.

Optionally, transforming the computation to yield a homomorphic operation comprises redefining a multiplication operation as at least one exponentiation operation.

Optionally, transforming the computation to yield a homomorphic operation comprises redefining a subtraction operation as at least one division operation.

Optionally, transforming said computation to yield a homomorphic operation comprises redefining a division operation as at least one root operation.

Optionally, the method further comprises receiving a plaintext data and generating first plaintext data from the plaintext data by identifying a prime number that is less than an integer representative of the plaintext data and that is on a predefined list of prime numbers, subtracting the prime number from the integer to yield a remainder, repeating with said remainder to yield a plurality of prime numbers, and multiplying said plurality of prime numbers together. Optionally, the method further comprises decrypting the second encrypted data using a first decryption format corresponding to the first encryption format to yield a third plaintext data. Optionally, the method also comprises modifying the third plaintext data to generate fourth plaintext data, wherein said fourth plaintext data is equivalent to output plaintext data that would have been generated by directly applying said computation to the plaintext data. Optionally, the method further comprises modifying the third plaintext data to generate fourth plaintext data by identifying a prime number that is less than an integer representative of the third plaintext data and that is on a predefined list of prime numbers, dividing the integer using the prime number to yield a remainder, repeating with said remainder to yield a plurality of prime numbers, and adding said plurality of prime numbers together.

Optionally, the first plaintext data is at least one of voice, face and fingerprint data of individuals.

Optionally, the first plaintext data is data collected by IoT (Internet of Things) devices in a decentralized system.

Optionally, first plaintext data comprises private blockchain data.

In another embodiment, the present application discloses an encryption method executed in a computing device, wherein said computing device comprises at least one processor coupled to a memory and wherein said memory comprises instructions executable by the at least one processor, said encryption method comprising: 1) receiving a first plaintext data; 2) modifying the first plaintext data to yield second plaintext data, wherein the first plaintext data is modified by identifying a prime number that is less than an integer representative of the first plaintext data and that is on a predefined list of prime numbers, subtracting the prime number from the integer to yield a remainder, repeating with said remainder to yield a plurality of prime numbers, identifying an additional unused prime number not included within the plurality of prime numbers, and multiplying said plurality of prime numbers together; 3) encrypting the second plaintext data in a first encryption format to generate a first encrypted data; 4) receiving a request to perform a computation, wherein said computation is at least one of a multiplication operation, subtraction operation, division operation and addition operation; 5) transforming the computation into a homomorphic operation based on the first encryption format, wherein transforming said computation to yield a homomorphic operation comprises at least one of redefining an addition operation as at least one multiplication operation, redefining a multiplication operation as at least one exponentiation operation, redefining a subtraction operation as at least one division operation, and redefining a division operation as at least one root operation; 6) applying the homomorphic operation to the first encrypted data to generate a second encrypted data; 7) decrypting the second encrypted data using a first decryption format corresponding to the first encryption format to yield a third plaintext data; and 8) modifying the third plaintext data to generate fourth plaintext data, wherein said fourth plaintext data is equivalent to plaintext data generated by applying said computation to the first plaintext data, wherein the third plaintext data is modified by identifying a prime number that is less than an integer representative of the third plaintext data and that is on a predefined list of prime numbers, dividing the integer using the prime number to yield a remainder, repeating with said remainder to yield a plurality of prime numbers, and generating the fourth plaintext data by adding said plurality of prime numbers together. The second encrypted data does not occupy more than 4 times n log(n) of said memory relative to the first encrypted data and wherein n is equal to the number of said plurality of bits. Optionally, the additional unused prime number not included within the plurality of prime numbers is used to decrypt second encrypted data, wherein said second encrypted data has been subject to an exponentiation operation.

In other embodiments, the present application discloses homomorphic encryption systems, HE systems, as a parameterized family of homomorphic encryption operations with each individual encryption operation defined on a set of natural numbers and returning natural numbers. The parameter scheme is defined by pairs of natural numbers, K and L, and that 0<K=L. For the purpose of illustration and explanation, the natural number K is set as 3 and the natural number L is set as 3.

The HE key structure is directly related to the parameter structure itself and for the case of two natural numbers, K and L as described above, the set □(K, L), or just key, is the set of all pairs of monadic operation, (i, j), where i is defined as a permutation of the set {1, 2, 3, . . . , K} and j is defined as the permutation of the set {1, 2, 3, . . . , L}. Without any loss of generality, we assume that K=L. Since i and j are permutations over {1, 2, 3, . . . , K}, the can be enumerated in a standard Boolean way. Assume that the set of all left hand components of the elements of key □(K, L) are enumerated in a standard way and that the set of all right hand components of the elements of key □(K, L) are also enumerated in a standard way. We will use the natural numbers i and j to name the $i^{th}$ and $j^{th}$ elements in these enumerations. Hence, the key has the specific form □(K.i, L.j).

HE operates by first choosing natural number parameters K, L and appropriate natural number parameters i and j and constructing a key, □(K.i, L.j), containing the fixed numbers K, L, i and j and in a readable fashion. For each natural number input x, HE first finds the $Alpha_K$ term that names x in the canonical cardinal ordering of the $Alpha_K$ terms and then finds the position of this same term in $i^{th}$ enumeration of the K! different possible enumerations, $Alpha_{K,i}(x)$. Since K=L, the specific term $Alpha_{K,i}(x)$ exists in the canonical ordinal enumerations, $Alpha_L$. Second, for that particular $Alpha_{K,i}(x)$ term, find the corresponding position $Alpha_{K,i}(x)$ term in $j^{th}$ enumeration of the L! different possible canonical ordinal enumerations $Alpha_L$. We name this positional number using the symbols "x^" for any input value x. x^ is assumed to be random compared to x since cardinal and ordinal enumerations are based on K different prime successor functions and each prime successor mapping is assumed to be pseudo random and no similarity exists between the symbolic representations of x and x^ in any enumerations. x', the UHE encrypted value of x for the key ✍ (K.i, L.j) is then the symbolic description of the term $Alpha_{K,i}(x^{\wedge})$. It should be appreciated that the word "prime" shall be interchangeably used with the term "quasi-prime". A natural number x is quasi-prime if and only if whenever x is represented as a natural number product, y*z, then y=1 or z=1.

Each of these HE encrypted terms, x' and y', is described by two finite sets of prime natural numbers: the additive view of x', AV(x'), the multiplicative view of x', MV(x'), the additive view of y', AV(y'), and the multiplicative view of y', MV(y').

The AV(x') primes add or sum together to x and the MV(x') primes multiply together to x' and the AV(y') primes add or sum together to y and the MV(y') primes multiply together to y'. In certain implementations the primes selected can be replaced by the natural numbers that are the indexes of the primes chosen.

HE then expresses each prime natural number in any of the sets AV(x), MV(x), AV(y) or MV(y) as a term in the first-order applied language $Alpha_K$ where terms in $Alpha_K$ are understood to name or describe elements in the algebraic structure $A_K$ where, $$A_K = <N, 0, p(x+K), p(1)*x, p(2)*x, \ldots, p(K)*x \ldots x*y>,$$

and where N is the set of all natural number, 0 is the natural number zero, 1 is the natural number one, p(x+K) is a family of monadic operations where for each natural number K the monadic operation p(x+K) is defined on the natural numbers such that for any natural number K, p(0+K) is the natural number and for all positive natural numbers, K and x, p(x+K) is the $(x+K)^{th}$ prime natural number, and x*y is the ordinary binary operation of multiplication. For each natural number K the language $Alpha_K$ is seen as the applied first-order language with equality that describes the arithmetic structure $A_K$. In this environment two syntactic $Alpha_K$ terms are seen as equal if and only if they name the same natural number in the structure $A_K$.

HE(x, □(K.i, L.j)) is then defined to be the product of the primes that arise from the evaluation in $A_K$ of the numbers that that were in the multiplicative view (if the operation called for was multiplication) or in the additive view (if the operation called for was addition) of the x' and y' positional numbers. HE(y, □(K.i, L.j)) is defined in a similar way.

The recursion used to enumerate the $Alpha_K$ terms is important because it is this construction that canonically positions each of the terms with its arithmetic value. The initial terms in the cardinal and the ordinal enumeration of $Alpha_1$, $Alpha_2$ and $Alpha_3$ are shown in FIGS. 1A, 1B and 1C. The core canonical cardinal recursion is shown below. The canonical ordinal recursion is similar but assumes that the value of B(1) is 2 with the other C-Symbols symbols naming the first K odd prime natural numbers:

Position (0, K)=0;
Position(1, K)=1;
Position($C_1$(x, K))=p(1)*Position(x; K);
Position($C_2$(x, K))=p(2)*Position(x; K);
Position($C_3$(x, K))=p(3)*Position(x; K);
.
.
.
Position($C_K$(x, K))=p(K)*Position(x; K);
Position(B((x), K)))=p(x+K)*Position(x, K);
Position(x*y; K)=Position(x; K)*UHE(y; K).

It should be clear that 0<i<=K! Using the method defined above, several other HE encryptions can be defined, but, in our opinion, the above definitions are sufficient to handle any homomorphic encryption application.

Throughout this specification, we will use K=L, without any loss of generality since it is easy to see that L can be different than K for differently defined UHE. However, we will continue to use the terms K, L, $Alpha_K$ and $Alpha_L$ to differentiate between the K dimension and the L dimension or differentiate between the canonical cardinal and the canonical ordinal enumerations we are referring to.

Finally, it should also be noted that although $Alpha_K$ and $Alpha_L$ can be any family of enumerations, the encryption complexity is higher if $Alpha_K$ and $Alpha_L$ are different types of enumerations. In this patent, we will continue to assume $Alpha_K$ to be cardinal and $Alpha_L$ to be ordinal enumerations and K=L.

It should be noted that although the families of enumerations constructed from prime-based node labeled trees can all be defined using the first-order $Alpha_K$ language of dimension K. However, in this document, K is used for the canonical cardinal enumerations of dimension K, while L in $Alpha_L$ is used for the canonical ordinal enumerations of dimension L—in other words, K is used specifically to distinguish the canonical cardinal enumerations and while L is used specifically to distinguish the canonical ordinal enumerations besides denoting the dimension.

Many enumerations of the set of $Alpha_K$ terms are possible, one for each permutation of the first K prime natural numbers. The two most natural of these enumerations are the cardinal enumeration and the ordinal enumeration that defines B(1) as 2 and $C_1(1), C_2(1), \ldots C_K(1)$ as the first K odd primes.

In some embodiments, the present specification discloses a secure data sharing system for sharing data among clients comprising: a plurality of client devices in data communication with a server; said server comprising at least one processor coupled to at least one memory device and said memory device comprising instructions executable by the at least one processor to implement the steps of: receiving plaintext data; homomorphically encrypting said plaintext data and storing the homomorphically encrypted data on said memory device; receiving a request from a client device; based upon said request, performing a computation on the homomorphically encrypted data stored in said memory device; decrypting an output of said computation; and providing the decrypted output data to said client device.

In some embodiments, the present specification discloses a secure data sharing system for sharing data among clients comprising: a plurality of client devices in data communication with a server; said server comprising at least one processor coupled to at least one memory device and said memory device comprising instructions executable by the at least one processor to implement the steps of: receiving a first encrypted data in a first encryption format; homomorphically encrypting said first encrypted data to yield a second encrypted data in a homomorphic encryption format and storing the second encrypted data on said memory device; receiving a request from a client device; based upon said request, performing a computation on the second encrypted data stored in said memory device; decrypting an output of said computation to yield a third encrypted data, wherein said third encrypted data is in the first encryption format and is not in a homomorphic encryption format; and, providing the second encrypted data to said client device.

Optionally, said server is located at a remote location.

Optionally, only authorized client devices are allowed to send request for performing computations on the data stored on the server device.

Optionally, only a specific set of predefined computations are allowed to be performed on the homomorphically encrypted data stored on the memory device.

Optionally, said plaintext data is homomorphically encrypted using a universal homomorphical encryption format.

Optionally, the steps of homomorphically encrypting said plaintext data comprises: receiving, in the memory of the server, plaintext data, said plaintext data comprising a plurality of bits; deriving from the plaintext data a first input integer and a second input integer; accessing a first table stored in the memory of the server, said first table associating a plurality of integers with a plurality of first-order symbolic representations; identifying, in said first table, a first first-order symbolic representation of the first input integer and a second first-order symbolic representation of the second input integer; obtaining from said first table the first first-order symbolic representation and the second first-order symbolic representation; accessing a second table stored in the memory of the server, said second table associating a plurality of integers with a plurality of first-order symbolic representations; identifying, in said second table, a third integer associated with the first first-order symbolic representation and a fourth integer associated with the second first-order symbolic representation; obtaining, from said second table, the third integer and fourth integer; accessing said first table to identify a third first-order symbolic representation of the third integer and a fourth first-order symbolic representation of the fourth integer; obtaining the third first-order symbolic representation and the fourth first-order symbolic representation, wherein said third first-order symbolic representation and fourth first-order symbolic representation are encrypted forms of the first input integer and second input integer; and, repeating said deriving, accessing, identifying, and obtaining steps for each bit of said plurality of bits of plaintext data to yield an encrypted form of the plaintext data, wherein the encrypted form of the plaintext data does not occupy more than 4 times n log(n) of the memory and wherein n is equal to the number of said plurality of bits.

Optionally, the homomorphically encrypted form of the plaintext data comprises a string of symbols wherein each of said symbols is a node labeled tree representation of an input integer.

Optionally, the homomorphically encrypted form of the plaintext data comprises a plurality of node labeled tree representations and wherein each node label tree representation corresponds to an input integer.

Optionally, the first table or the second table is computed and stored in memory prior to initiating the encryption method.

Optionally, the first table or the second table is computed in real time during an execution of said homomorphic encryption method.

Optionally, the data sharing system further comprises performing homomorphic addition by generating a look-up table for a given key, wherein said table comprises data indicative of all possible combinations of the first input integer and second input integer and wherein said data is homomorphically encrypted.

Optionally the data sharing system further comprises performing homomorphic addition by generating a look-up table for a given key, wherein said table comprises a 1-bit value denoting whether the first input integer is less than the second input integer.

Optionally, the data sharing system is used to implement a secure backend system for an organization.

Optionally, the data sharing system is used to implement a data marketplace comprising confidential data such that the subscribers to that database can only run computations on that data without accessing the original raw data.

Optionally, the data sharing system is used to implement a multi factor authentication system for people such that the authentication data such as voice, face and fingerprint data of people is stored in an encrypted format on said system.

Optionally, the data sharing system is used to implement a blind e-voting system for voters such that the data related to individual votes is stored in an encrypted format on said data storage system.

Optionally, the data sharing system is used to store, manage and use data collected by IoT (Internet of Things) devices in a decentralized system.

Optionally, the data sharing system is used to provide distributed personal data stores wherein data is stored in a homomorphically encrypted format.

Optionally, the data sharing system is used to implement a private blockchain such that the sensitive data within said blockchain is stored in a homomorphically encrypted format.

In some embodiments, the present specification discloses a method for providing a secured data sharing system comprising: receiving plaintext data; homomorphically encrypting said plaintext data and storing the homomorphically encrypted data on a memory device; receiving a request from an authorized user requiring performing a computation on the homomorphically encrypted data stored in said memory device; performing said computation on said homomorphically encrypted data and decrypting the output of said computation; and providing the decrypted output data to said authorized user.

In some embodiments, the present specification discloses a method for providing a secured data sharing system comprising: receiving first encrypted data in a first encryption format; homomorphically encrypting said first encrypted data to yield second encrypted data in a homomorphic encryption format and storing the second encrypted data on a memory device; receiving a request from an authorized user requiring performing a computation on the second encrypted data stored in said memory device; performing said computation on said second encrypted data and decrypting the output of said computation to yield third encrypted data in a first encryption format and not in a homomorphic encryption format; and providing the third encryption data to said authorized user.

In some embodiments, the present specification discloses a secure data sharing system for sharing data among clients comprising: a plurality of client devices in data communication with a server; said server comprising at least one processor coupled to at least one memory device and said memory device comprising instructions executable by the at least one processor to implement the steps of: receiving homomorphically encrypted data from at least one client device and storing the homomorphically encrypted data on said memory device; receiving a request from a client device requiring performing a computation on the homomorphically encrypted data stored in said memory device; performing said computation on said homomorphically encrypted data to generate encrypted output data; and, providing the homomorphically encrypted output data to said client device.

Optionally, a client device is configured to homomorphically encrypt the plaintext data through a private key before uploading the same on the data sharing system.

Optionally, the homomorphically encrypted output data is decrypted by the client device through a public key.

Optionally, said server is located at a remote location.

Optionally, only authorized client devices are allowed to send request for performing computations on the data stored on the server device.

Optionally, only a specific set of predefined computations are allowed to be performed on the homomorphically encrypted data stored on the memory device.

Optionally, said plaintext data is encrypted using a universal homomorphic encryption format.

Optionally, the steps of homomorphically encrypting said plaintext data comprises: receiving, in the memory of the client device, plaintext data, said plaintext data comprising a plurality of bits; deriving from the plaintext data a first input integer and a second input integer; accessing a first table stored in the memory of the client device, said first table associating a plurality of integers with a plurality of first-order symbolic representations; identifying, in said first table, a first first-order symbolic representation of the first input integer and a second first-order symbolic representation of the second input integer; obtaining from said first table the first first-order symbolic representation and the second first-order symbolic representation; accessing a second table stored in the memory of the client device, said second table associating a plurality of integers with a plurality of first-order symbolic representations; identifying, in said second table, a third integer associated with the first first-order symbolic representation and a fourth integer associated with the second first-order symbolic representation; obtaining, from said second table, the third integer and fourth integer; accessing said first table to identify a third first-order symbolic representation of the third integer and a fourth first-order symbolic representation of the fourth integer; obtaining the third first-order symbolic representation and the fourth first-order symbolic representation, wherein said third first-order symbolic representation and fourth first-order symbolic representation are encrypted forms of the first input integer and second input integer; and repeating said deriving, accessing, identifying, and obtaining steps for each bit of said plurality of bits of plaintext data to yield an encrypted form of the plaintext data, wherein the encrypted form of the plaintext data does not occupy more than 4 times n log(n) of the memory and wherein n is equal to the number of said plurality of bits.

Optionally, the homomorphically encrypted form of the plaintext data comprises a string of symbols wherein each of said symbols is a node labeled tree representation of an input integer.

Optionally, the homomorphically encrypted form of the plaintext data comprises a plurality of node labeled tree representations and wherein each node label tree representation corresponds to an input integer.

Optionally, the first table or the second table is computed and stored in memory prior to initiating the homomorphic encryption method.

Optionally, the first table or the second table is computed in real time during an execution of said homomorphic encryption method.

Optionally, the data sharing system further comprises performing homomorphic addition by generating a look-up table for a given key, wherein said table comprises data indicative of all possible combinations of the first input integer and second input integer and wherein said data is encrypted.

Optionally, the data sharing system further comprises performing homomorphic addition by generating a look-up table for a given key, wherein said table comprises a 1-bit value denoting whether the first input integer is less than the second input integer.

Optionally, the data sharing system is used to implement a secure backend system for an organization.

Optionally, the data sharing system is used to implement a multi factor authentication system for people such that the authentication data such as voice, face and fingerprint data of people is stored in an encrypted format on said system.

Optionally, the data sharing system is used to implement a blind e-voting system for voters such that the data related to individual votes is stored in an encrypted format on said data storage system.

Optionally the data sharing system is used to store, manage and use data collected by IoT (Internet of Things) devices in a decentralized system.

Optionally, the data sharing system is used to implement a private blockchain such that the sensitive data within said blockchain is stored in a homomorphically encrypted format.

In some embodiments, the present specification discloses a method for providing a secured data sharing system comprising: receiving homomorphically encrypted data; storing said homomorphically encrypted data on a memory device; receiving a request from an authorized user requiring performing computation on the homomorphically encrypted data stored in said memory device; performing computations on said homomorphically encrypted data to generate homomorphically encrypted output data; and, providing the homomorphically encrypted output data to said authorized user.

Optionally, the data is homomorphically encrypted by an authorized user before sending it to the data sharing system.

Optionally, the output data is decrypted by an authorized user after receiving it from the data sharing system.

In some embodiments, the present specification discloses a method for encrypting plaintext data in a computing device having a processor and memory, said method comprising: receiving, in the memory of the computing device, plaintext data, said plaintext data comprising a plurality of bits; deriving from the plaintext data a first input integer and a second input integer; accessing a first table stored in the memory of the computing device, said first table associating a plurality of integers with a plurality of first-order symbolic representations; identifying, in said first table, a first first-order symbolic representation of the first input integer and a second first-order symbolic representation of the second input integer; obtaining from said first table the first first-order symbolic representation and the second first-order symbolic representation; accessing a second table stored in the memory of the computing device, said second table associating a plurality of integers with a plurality of first-order symbolic representations; identifying, in said second table, a third integer associated with the first first-order symbolic representation and a fourth integer associated with the second first-order symbolic representation; obtaining, from said second table, the third integer and fourth integer; accessing said first table to identify a third first-order symbolic representation of the third integer and a fourth first-order symbolic representation of the fourth integer; obtaining the third first-order symbolic representation and the fourth first-order symbolic representation, wherein said third first-order symbolic representation and fourth first-order symbolic representation are encrypted forms of the first input integer and second input integer; and repeating said deriving, accessing, identifying, and obtaining steps for each bit of said plurality of bits of plaintext data to yield an encrypted form of the plaintext data, wherein the encrypted form of the plaintext data does not occupy more than 4 times n log(n) of the memory and wherein n is equal to the number of said plurality of bits.

Optionally, the first table is partially representative of a key and is one of a first plurality of tables and wherein each entry in each of said first plurality of tables relates an integer to a first-order symbolic representation.

Optionally, a first-order symbolic representation of an integer in one of said first plurality of tables may differ from a first-order symbolic representation of said integer in any other of the first plurality of tables.

Optionally, said first plurality of tables defines a cardinal enumeration of dimension K where K is a positive natural number.

Optionally, the second table is partially representative of a key and is one of a second plurality of tables and wherein each entry in each of said second plurality of tables relates an integer to a first-order symbolic representation. Optionally, the first-order symbolic representation of an integer in one of said second plurality of tables differs from a first-order symbolic representation of said integer in any other of the second plurality of tables. Optionally, said second plurality of tables defines an ordinal enumeration of dimension L where L is a positive natural number.

Optionally, said second plurality of tables defines an ordinal enumeration of dimension L for encrypting natural numbers in a computing device having a processor and memory, said method comprising: deriving from the first input integer two finite sets of prime natural numbers, a sum of a first of the finite sets being an absolute value of the first input integer and a product of the a second of the finite sets being an absolute value of the first input integer; deriving from the second input integer two finite sets of prime natural numbers, a sum of a first of the finite sets being an absolute value of the second input integer and a product of a second of the finite sets being an absolute value of the second input integer; accessing the second table; obtaining for the two finite sets of prime natural numbers associated with the first input two sets of first-order symbolic representations with the first-order symbolic representations being derived from the finite sets of prime natural numbers; obtaining, for the two sets of first-order symbolic representations, two sets of first-order symbolic representations derived by replacing any indexed symbolic monadic operation in a first expression with a symbolic monadic operation resulting from applying a permutation named in a key that associated with the second table; obtaining for the two finite sets of prime natural numbers associated with the second input two sets of first-order symbolic representations with the first-order symbolic representations being derived from the finite sets of prime natural numbers; obtaining, for the two sets of first-order symbolic representations associated with the second input, a second two sets of first-order symbolic representations derived by replacing any indexed symbolic monadic operation in a first expression with a symbolic monadic operation resulting from applying a permutation named in a key that associated with the second table; obtaining for the two finite sets of first-order symbolic representations associated with the first input a simple set theoretic-like construction of union and single operation obtaining a single symbolic form which is then associated with a numeric value; and obtaining for the two finite sets of first-order symbolic representations associated with the second input a simple set theoretic-like construction of union and single operation obtaining a single symbolic form which is then associated with a numeric value.

Optionally, the encrypted form of the plaintext data comprises a string of symbols wherein each of said symbols is a node labeled tree representation of an input integer.

Optionally, the encrypted form of the plaintext data comprises a plurality of node labeled tree representations and wherein each node label tree representation corresponds to an input integer.

Optionally, the first table or the second table may be computed and stored in memory prior to initiating the encryption method. Optionally, the first table or the second table may be computed in real time during an execution of said encryption method.

Optionally, the method may further comprise performing homomorphic addition by generating a look-up table for a given key, wherein said table comprises data indicative of all possible combinations of the first input integer and second input integer and wherein said data is encrypted.

Optionally, the method may further comprise performing homomorphic addition by generating a look-up table for a given key, wherein said table comprises a 1-bit value denoting whether the first input integer is less than the second input integer.

In some embodiments, the present specification discloses a method for encrypting plaintext data in a computing device having a processor and memory, said method comprising: receiving, in the memory of the computing device, plaintext data, said plaintext data comprising a plurality of bits; deriving from the plaintext data a first input integer and a second input integer; adding a first random number to the first input integer to yield a modified first input integer and adding a second random number to the second input integer to yield a modified second input integer; accessing a first table stored in the memory of the computing device, said first table associating a plurality of integers with a plurality of first-order symbolic representations; identifying, in said first table, a first first-order symbolic representation of the modified first input integer and a second first-order symbolic representation of the modified second input integer; obtaining from said first table the first first-order symbolic representation and the second first-order symbolic representation; accessing a second table stored in the memory of the computing device, said second table associating a plurality of integers with a plurality of first-order symbolic representations; identifying, in said second table, a third integer associated with the first symbolic representation and a fourth integer associated with the second symbolic representation; obtaining, from said second table, the third integer and fourth integer; accessing said first table to identify a third first-order symbolic representation of the third integer and a fourth first-order symbolic representation of the fourth integer; obtaining the third first-order symbolic representation and the fourth first-order symbolic representation, wherein said third first-order symbolic representation and fourth first-order symbolic representation are encrypted forms of the first input integer and second input integer; and repeating said deriving, accessing, identifying, and obtaining steps for each bit of said plurality of bits of plaintext data to yield an encrypted form of the plaintext data, wherein the encrypted form of the plaintext data does not occupy more than 4 times n log(n) of the memory and wherein n is equal to the number of said plurality of bits.

In some embodiments, the present specification discloses a method for encrypting plaintext data in a computing device having a processor and memory, said method comprising: receiving, in the memory of the computing device, plaintext data, said plaintext data comprising a plurality of bits; deriving from the plaintext data a first input integer and a second input integer; accessing a first table stored in the memory of the computing device, said first table associating a plurality of integers with a plurality of first-order symbolic representations, to identify a first first-order symbolic representation of the first input integer and a second first-order symbolic representation of the second input integer; obtaining the first first-order symbolic representation and the second first-order symbolic representation, wherein said first first-order symbolic representation and said second first-order symbolic representation are encrypted forms of the first input integer and second input integer; repeating said deriving, accessing, and obtaining steps for each bit of said plurality of bits of plaintext data to yield an encrypted form of the plaintext data, wherein the encrypted form of the plaintext data does not occupy more than 4 times n log(n) of memory and wherein n is equal to the number of said plurality of bits.

Optionally, the first table is partially representative of a key and is one of a first plurality of tables and wherein each entry in each of said first plurality of tables relates an integer to a first-order symbolic representation.

Optionally, a symbolic representation of an integer in one of said first plurality of tables may differ from a first-order symbolic representation of said integer in any other of the first plurality of tables.

Optionally, said first plurality of tables defines a cardinal enumeration of dimension K where K is a positive natural number.

Optionally, the encrypted form of the plaintext data comprises a plurality of first-order symbolic representations and wherein said plurality of first-order symbolic representations comprises Boolean strings.

Optionally, the encrypted form of the plaintext data may comprise a string of symbols wherein each of said symbols is a node labeled tree representation of an input integer.

Optionally, the first table may be computed and stored in memory prior to initiating the encryption method. Optionally, the first table may be computed in real time during an execution of said encryption method.

Optionally, the method may further comprise performing homomorphic addition by generating a look-up table for a given key, wherein said table comprises data indicative of all possible combinations of the first input integer and second input integer and wherein said data is encrypted.

Optionally, the method may further comprise performing homomorphic addition by generating a look-up table for a given key, wherein said table comprises a 1-bit value denoting whether the first input integer is less than the second input integer.

In some embodiments, the present specification discloses a method for encrypting plaintext data in a computing device having a processor and memory, said method comprising: receiving, in the memory of the computing device, plaintext data, said plaintext data comprising a plurality of bits; deriving from the plaintext data a first input integer and a second input integer; adding a first random number to the first input integer to yield a modified first input integer and adding a second random number to the second input integer to yield a modified second input integer; accessing a first table stored in the memory of the computing device, said first table associating a plurality of integers with a plurality of first-order symbolic representations, to identify a first first-order symbolic representation of the modified first input integer and a second first-order symbolic representation of the modified second input integer; obtaining the first first-order symbolic representation and the second first-order symbolic representation, wherein said first first-order symbolic representation and said second first-order symbolic representation are encrypted forms of the first input integer and second input integer; and repeating said deriving, accessing, and obtaining steps for each bit of said plurality of bits of plaintext data to yield an encrypted form of the plaintext data, wherein the encrypted form of the plaintext data does not occupy more than 4 times n*log(n) of memory and wherein n is equal to the number of said plurality of bits.

In some embodiments, the present specification discloses a method of programming a credit card using a computing device having a memory, comprising: receiving, in the memory of the computing device, plaintext data, said plaintext data comprising a plurality of bits representing a name, a credit card, and a security code; deriving from the plaintext data a first input integer and a second input integer; accessing a first table stored in the memory of the computing device, said first table associating a plurality of integers with a plurality of first-order symbolic representations, to identify a first first-order symbolic representation of the first input integer and a second first-order symbolic representation of the second input integer; obtaining the first first-order symbolic representation and the second first-order symbolic representation, wherein said first first-order symbolic representation and said second first-order symbolic representation are encrypted forms of the first input integer and second input integer; repeating said deriving, accessing, and obtaining steps for each bit of said plurality of bits of plaintext data to yield an encrypted form of the plaintext data; obtaining a credit card, wherein said credit card comprises a substrate and a memory embedded therein; and storing said encrypted form of the plaintext data in the memory of the credit card.

Optionally, the encrypted form of the plaintext data does not occupy more than 4 times n*log(n) of the memory of the credit card and wherein n is equal to the number of said plurality of bits.

In some embodiments, the present specification discloses a method of processing encrypted data, said encrypted data being an encrypted form of plaintext data, in a computing device having a processor and memory, said method comprising: receiving, in the memory of the computing device, the encrypted data, wherein said encrypted data comprises a string of symbols, wherein each of said symbols is a node labeled tree representation of an integer; applying at least one string concatenation operation on at least a portion of the encrypted data to yield modified encrypted data, wherein applying the at least one string concatenation operation to the at least a portion of the encrypted data is adapted to be mathematically equivalent to applying an addition and/or multiplication operation on at least a portion of the plaintext data, and wherein applying the at least one string concatenation operation to the at least a portion of the encrypted data requires no more than 10 times more processing cycles, executed by said processor, than said mathematically equivalent addition and/or multiplication operation applied on said portion of the plaintext data; outputting said modified encrypted data; and decrypting said modified encrypted data to yield modified plaintext data, wherein the modified plaintext data is equal to an output of said mathematically equivalent addition and/or multiplication operation applied to the plaintext data.

Optionally, the method may further comprise performing homomorphic addition by generating a look-up table for a given key, wherein said table comprises data indicative of all possible combinations of a first input integer and a second input integer and wherein said data is encrypted.

Optionally, the method may further comprise performing homomorphic addition by generating a look-up table for a given key, wherein said table comprises a 1-bit value denoting whether a first input integer is less than a second input integer.

Optionally, the method may further comprise performing an operation on said encrypted data that is mathematically equivalent to performing addition on said plaintext data, wherein said operation is a multiplicative operation.

Optionally, the method may further comprise performing an operation on said encrypted data that is mathematically equivalent to performing multiplication on said plaintext data, wherein said operation is an additive operation.

In some embodiments of the method of processing encrypted data, the decrypting may comprise: deriving from the modified encrypted data plaintext data a first first-order symbolic representation; accessing a first table stored in the memory of the computing device, said first table associating a plurality of integers with a plurality of first-order symbolic representations, to identify a first output integer associated with the first first-order symbolic representation; obtaining the first output integer, wherein said first output integer is a portion of said modified plaintext data; and repeating said deriving, accessing, and obtaining steps for a remainder of said modified encrypted data to yield the modified plaintext data.

In some embodiments of the method of processing encrypted data, the decrypting may comprise: deriving from the modified encrypted data plaintext data a first first-order symbolic representation; accessing a first table stored in the memory of the computing device, said first table associating a plurality of integers with a plurality of first-order symbolic representations, to identify a first output integer associated with the first first-order symbolic representation; obtaining the first output integer; applying a function using a random number associated with the first output integer and the first output integer to yield a modified first output integer, wherein said modified first output integer is a portion of said modified plaintext data; and repeating said deriving, accessing, obtaining, and applying steps for a remainder of said modified encrypted data to yield the modified plaintext data.

In some embodiments of the method of processing encrypted data, the decrypting may comprise: deriving from the modified encrypted data plaintext data a first first-order symbolic representation; accessing a first table stored in the memory of the computing device, said first table associating a first plurality of integers with a first plurality of first-order symbolic representations, to identify a first output integer associated with the first first-order symbolic representation; obtaining the first output integer; accessing a second table stored in the memory of the computing device, said second table associating a second plurality of integers with a second plurality of first-order symbolic representations, to identify a second first-order symbolic representation associated with the first output integer; accessing the first table to identify a second output integer associated with the second first-order symbolic representation; obtaining the second output integer, wherein said second output integer is a portion of said modified plaintext data; and repeating said deriving, accessing, and obtaining steps for a remainder of said modified encrypted data to yield the modified plaintext data.

In some embodiments of the method of processing encrypted data, the decrypting may comprise: deriving from the modified encrypted data plaintext data a first first-order symbolic representation; accessing a first table stored in the memory of the computing device, said first table associating a first plurality of integers with a first plurality of first-order symbolic representations, to identify a first output integer associated with the first first-order symbolic representation; obtaining the first output integer; accessing a second table stored in the memory of the computing device, said second table associating a second plurality of integers with a second plurality of first-order symbolic representations, to identify a second first-order symbolic representation associated with the first output integer; accessing the first table to identify a second output integer associated with the second first-order symbolic representation; applying a function using the second output integer and a random number associated with the second output integer to yield a modified second output integer, wherein said modified second output integer is a portion of said modified plaintext data; obtaining the modified second output integer, wherein said modified second output integer is a portion of said modified plaintext data; and repeating said deriving, accessing, applying and obtaining steps for a remainder of said modified encrypted data to yield the modified plaintext data.

In some embodiments, the present specification discloses a method of processing plaintext, having a plurality of elements, in a computing device having a processor and memory, comprising: receiving said plaintext data; and homomorphically encrypting said plaintext data, said homomorphism being with respect to multiplication and addition operations, wherein the encrypted form of the plaintext data does not occupy more than 4 times n*log(n) of the memory of the computing device and wherein n is equal to the number of said plurality of bits.

In some embodiments, the present specification discloses a method of processing plaintext, having a plurality of elements, in a computing device having a processor and memory, comprising: receiving said plaintext data; and homomorphically encrypting said plaintext data, said homomorphism being with respect to multiplication operations, addition operations, set function operations, Boolean operations, and logical operations, wherein the encrypted form of the plaintext data does not occupy more than 4 times n*log(n) of the memory of the computing device and wherein n is equal to the number of said plurality of bits.

In some embodiments, the present specification discloses a method of transforming plaintext, having a plurality of elements, into ciphertext, said method being performed on a processor executing a plurality of instructions and wherein, when said plurality of instructions are executed, the process: generates a first set and a second set of node labeled trees, wherein each node in each set of node labeled trees is associated with a prime number; introduces an additional dimension, having a plurality of additional elements, into each of said first set and second set of node labeled trees; associates each node within said first set and second set of node labeled trees with at least one of said additional elements; transforms a first element of said plurality of elements into a first node labeled tree, having an additional element associated therewith, from the first set of node labeled trees; and based upon the first node labeled tree, with said additional element, from the first set of node labeled trees, determines a second node labeled tree, with an associated additional element, from the second set of node labeled trees, wherein said generate, introduces, transform, and determine steps results in transforming said plaintext into said ciphertext such that it is homomorphically encrypted with respect to multiplication and addition operations.

Optionally, the additional dimension comprises a plurality of color-based elements.

Optionally, the additional dimension comprises a plurality of wave forms, textures, patterns, or symbols.

In some embodiments, the present specification discloses a method of generating a plurality of keys for transforming plaintext, having a plurality of elements, into ciphertext, wherein said ciphertext is homomorphically encrypted with respect to multiplication and addition operations, said method being performed on a processor executing a plurality of instructions and wherein, when said plurality of instructions are executed, the process: generates a first set and a second set of node labeled trees, wherein each node in each set of node labeled trees is associated with a prime number; introduces an additional dimension, having a plurality of additional elements, into each of said first set and second set of node labeled trees and associating each node within said first set and second set of node labeled trees with at least one of said additional elements; transforms a first element of said plurality of elements into a first node labeled tree, having an additional element associated therewith, from the first set of node labeled trees; and based upon the first node labeled tree, with said additional element, from the first set of node labeled trees, determines a second node labeled tree, with an associated additional element, from the second set of node labeled trees, wherein said generate, introduces, transform, and determine steps results in transforming said plaintext into said ciphertext such that it is homomorphically encrypted with respect to multiplication and addition operations.

In some embodiments, the present specification discloses a system for generating and manipulating a plurality of keys for transforming plaintext, having a plurality of elements, into ciphertext, wherein said ciphertext is homomorphically encrypted with respect to a plurality of operations, said system comprising a processor for executing a plurality of instructions and a non-transitory computer readable medium having stored therein a plurality of instructions, where, when the processor executes the plurality of instructions, the system: defines two different natural number algebraic structures (out of many possible), $\alpha_k$ (canonical cardinal enumeration) and $\beta_k$ (canonical ordinal enumeration), for each natural number k larger than 1; and applies a plurality of restrictions to $\alpha_k$ and $\beta_k$ to thereby define a prime successor operation.

In some embodiments, the present specification discloses a system of transforming plaintext, having a plurality of elements, into ciphertext, wherein said ciphertext is homomorphically encrypted with respect to multiplication and addition operations, said system comprising a processor for executing a plurality of instructions and a non-transitory computer readable medium having stored therein a plurality of instructions, where, when the processor executes the plurality of instructions, the system: generates a first set of node labeled trees, wherein the first set of node labeled trees satisfy a first set of equations; generates a second set of node labeled trees, wherein the second set of node labeled trees satisfy a second set of equations and wherein both the first sets of equations and second set of equations are subsets of a set of parameterized equations; transforms a first element of said plurality of elements into a first node labeled tree from the first set of node labeled trees; and based upon the first node labeled tree from the first set of node labeled trees, determines a second node labeled tree from the second set of node labeled trees, wherein said generating, transforming, and determining steps results in transforming said plaintext into said ciphertext such that it is homomorphically encrypted with respect to multiplication and addition operations and wherein the ciphertext does not occupy more than 4 times n*log(n) of the memory of the computing device and wherein n is equal to the number of said plurality of bits.

Optionally, the system further comprises using the set of parameterized equations to identify a first model and a second model and determining an intersection of the first model and second model to determine a core model.

Optionally, the system further comprises defining $\text{Mod}_M$ wherein, for every positive natural number, $\text{Mod}_M$ is defined as an algebraic structure based on a plurality of natural numbers. Optionally, for any positive natural number M, an arithmetic structure $\text{Mod}_M$ is isomorphic to the core model.

Optionally, the first set of node labeled trees is determined by choosing a positive natural number K and wherein the second set of node labeled trees is determined by choosing a second positive natural number L, where the number K is less than the number L and where both the first set and second set of node labeled trees are defined as Herbrand models of the parameterized equations.

In some embodiments, the present specification discloses method of transforming plaintext, having a plurality of elements, into ciphertext, wherein said ciphertext is homomorphically encrypted with respect to the multiplication and addition operations, said method being performed on a processor executing a plurality of instructions and wherein, when said plurality of instructions are executed, the processor: generates a first set of node labeled trees, wherein the first set of node labeled trees satisfy a first set of equations; and generates a second set of node labeled trees, wherein the second set of node labeled trees satisfy a second set of equations and wherein both the first sets of equations and second set of equations are subsets of a set of parameterized equations; transforms a first element of said plurality of elements into a first node labeled tree from the first set of node labeled trees; and based upon the first node labeled tree from the first set of node labeled trees, determines a second node labeled tree from the second set of node labeled trees, wherein said generating, transforming, and determining steps results in transforming said plaintext into said ciphertext such that it is homomorphically encrypted with respect to the multiplication and addition operations.

Optionally, the method further comprises using the set of parameterized equations to identify a first model and a second model and determining an intersection of the first model and second model to determine a core model.

Still optionally, the method further comprises defining $Mod_M$ wherein, for every positive natural number M, $Mod_M$ is defined as an algebraic structure based on a plurality of natural numbers.

Still optionally, for any positive natural number M, an arithmetic structure $Mod_M$ is uniquely isomorphic to the core model.

Optionally, the first set of node labeled trees is determined by choosing a positive natural number K and wherein the second set of node labeled trees is determined by choosing a second positive natural number L, where the number K is less than or equal the number L and where both the first set and second set of node labeled trees are defined as core or Herbrand models of the parameterized equations.

In some embodiments, the present specification discloses a method of transforming plaintext, having a plurality of elements, into ciphertext, wherein said ciphertext is homomorphically encrypted with respect to multiplication and addition operations, said method being performed on a processor executing a plurality of instructions and wherein, when said plurality of instructions are executed, the processor: generates a first set of node labeled trees and a second set of node labeled trees, wherein each of the first and second set of node labeled trees is associated with a prime natural number defined by a value of symbols in a set of parameterized equations.

In some embodiments, the present specification discloses a method of transforming plaintext, having a plurality of elements, into ciphertext, wherein said ciphertext is homomorphically encrypted with respect to the multiplication and addition operations, said method being performed on a processor executing a plurality of instructions and wherein, when said plurality of instructions are executed, the processor: generates a first set of node labeled trees, wherein said first set of node labeled trees satisfy a first set of initial conditions; generates a second set of node labeled trees, wherein said second set of node labeled trees satisfy a second set of initial conditions; transforms a first element of said plurality of elements into a first node labeled tree from the first set of node labeled trees; and based upon the first node labeled tree from the first set of node labeled trees, determines a second node labeled tree from the second set of node labeled trees, wherein said generating, transforming, and determining steps results in transforming said plaintext into said ciphertext such that it is homomorphically encrypted with respect to multiplication and addition operations.

Optionally, the first set of node labeled trees is formed by applying a first monadic operation on a plurality of original natural numbers to enumerate a plurality of prime natural numbers. Still optionally, the first set of node labeled trees is formed by generating a plurality of ordered pairs, wherein each of said ordered pairs consists of a single natural number, k, and a finite multiset of odd primes that divide one of said plurality of original natural numbers.

Optionally, the second set of node labeled trees is formed by applying a second monadic operation on a plurality of original natural numbers to enumerate a plurality of prime natural numbers.

Optionally, k is the number of times that the number 2 divides the one of said plurality of original natural numbers.

Optionally, each of the plurality of ordered pairs operates as a first layer of a finite natural number node labeled tree.

Optionally, one coordinate in each of said plurality of ordered pairs defines a root of the finite natural number node labeled tree.

Optionally, said determine a second node step is performed by seeking a position of a form in the second set of node labeled trees which is equivalent to a form of the first node labeled tree in the first set of node labeled trees.

Optionally, the first set of node labeled trees represents a cardinal enumeration of a set of node labeled trees and the second set of node labeled trees represents an ordinal enumeration of a set of node labeled trees.

In some embodiments, the present specification discloses a method of transforming plaintext, having a plurality of elements, into ciphertext, wherein said ciphertext is homomorphically encrypted with respect to multiplication and addition operations, said method being performed on a processor executing a plurality of instructions and wherein, when said plurality of instructions are executed, the process: generates a first set and a second set of node labeled trees, wherein each node in each set of node labeled trees is associated with a prime number; transforms a first element of said plurality of elements into a first node labeled tree from the first set of node labeled trees; and based upon the first node labeled tree from the first set of node labeled trees, determines a second node labeled tree from the second set of node labeled trees, wherein said generate, transform, and determine steps results in transforming said plaintext into said ciphertext such that it is homomorphically encrypted with respect to multiplication and addition operations.

In some embodiments, the present specification discloses a system for generating and manipulating a plurality of keys for transforming plaintext, having a plurality of elements, into ciphertext, wherein said ciphertext is homomorphically encrypted with respect to a plurality of operations, said system comprising a processor for executing a plurality of instructions and a non-transitory computer readable medium having stored therein a plurality of instructions, where, when the processor executes the plurality of instructions, the system: uniquely defines a monadic operation defined on the natural numbers such that for any natural number x, a message, $UHE(x, k(i_j, m_n))$ is computed by a) representing x using a language of structure $\beta_m$ with term u, b) transforming term u into term v using $p(m_n)$ to permute indexes of term u, c) transforming term v into term w using $p(i_j)$ to permute indexes of term v, and outputs a natural number in $\alpha_i$ that corresponds to term w.

Optionally, x is any natural number, k is a keying function and i, j, m, and n are natural numbers such that: $j<i!$, $n<m!$ and $m<i+1$.

Optionally, a set of k! permutations of the sequence $<1, 2, 3, \ldots, k>$ can be alphabetically ordered from 0 to $k!-1$ with $<1, 2, 3, \ldots, k>$ being given position 0, wherein $p(i_j)$ is a $j^{th}$ permutation of the sequence <1, 2, 3, . . . , i> and wherein $p(m_n)$ is a nth permutation of the sequence <1, 2, 3, . . . , m>.

Optionally, the system defines (m!*i!) keys.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 1A shows the first few $A_1$ terms in both their cardinal and ordinal orderings using a standard subscript notation for the C-Symbols;

FIG. 1B shows the first few $A_2$ terms in both their cardinal and ordinal orderings using a standard subscript notation for the C-Symbols;

FIG. 1C shows the first few $A_3$ terms in both their cardinal and ordinal orderings using a standard subscript notation for the C-Symbols;

FIG. 2 illustrates a table comparing performance and operational metrics with reference to a typical SHE (Somewhat Homomorphic Encryption), FHE (Fully Homomorphic Encryption) and the UHE (Universal Homomorphic Encryption) system of the present specification;

FIG. 21 illustrates a mapping of numbers to primes, in accordance with an embodiment of the present specification;

FIG. 22A illustrates a plurality of programmatic instructions for executing Montgomery multiplication, in accordance with an embodiment of the present specification;

FIG. 22B illustrates a plurality of programmatic instructions to implement a binary method, in accordance with an embodiment of the present specification;

FIG. 22C illustrates a plurality of programmatic instructions to implement signed-digit recoding method, in accordance with an embodiment of the present specification;

FIG. 22D illustrates a plurality of programmatic instructions to implement a CMM-SDR method, in accordance with an embodiment of the present specification;

DETAILED DESCRIPTION

Figure 3:
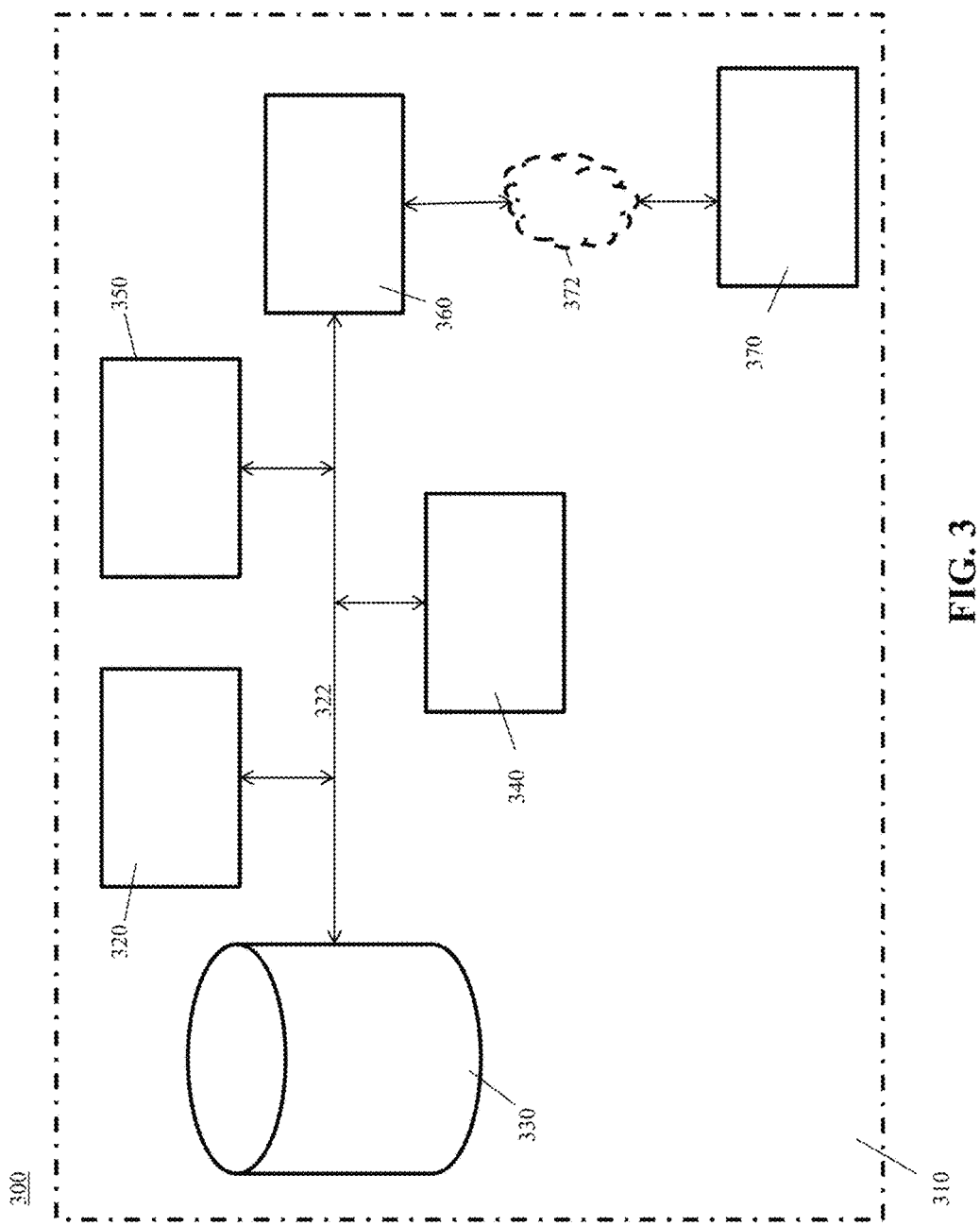
FIG. 3 illustrates a computing system environment for implementing the FHE/UHE processes, in accordance with embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

In an embodiment, the present specification is directed to an encryption system that applies a Universal Homomorphic Encryption (UHE) format or data transformation to plaintext data. A UHE system, as disclosed herein, is defined as a system which can encrypt plaintext data ($P_1$) to yield encrypted data ($E_1$), apply a plurality of different functions to $P_1$ and $E_1$ to yield $P_2$ and $E_2$ respectively, and then decrypt $E_2$ to yield $P_3$, where $P_2$ is equal to $P_3$ and where the plurality of functions include addition operations, multiplication operations, and other additional functions, such as set function operations (union, intersection, merge and push), Boolean operations (AND, OR, XOR), and logical operations such as greater (>), lesser (<), equal (=), greater than or equal (≥), less than or equal (≤), and not equal (≠). Compared to a SHE system, a UHE system can use more functions and is not limited with respect to the number and/or order of multiplication and addition operations.

In an embodiment, the present specification is directed to an encryption system that applies a Fully Homomorphic Encryption (FHE) format or data transformation to plaintext data. A FHE system is defined as a system which can encrypt plaintext data ($P_1$) to yield encrypted data ($E_1$), apply a multiplication or addition function to $P_1$ and $E_1$ to yield $P_2$ and $E_2$ respectively, and then decrypt $E_2$ to yield $P_3$, where $P_2$ is equal to $P_3$. Unlike a UHE system, a FHE system is not adapted to work with other functions, such as set function operations (union, intersection, merge and push), Boolean operations (AND, OR, XOR), and logical operations such as greater (>), lesser (<), equal (=), greater than or equal (≥), less than or equal (≤), and not equal (≠). Compared to a SHE system, however, a FHE system is not limited with respect to the number and/or order of multiplication and addition operations.

The present specification discloses several inventions, some of which are defined as ordered combinations, directed toward the Internet-centric challenge of keeping data secure and private. This is achieved, at least in part, by providing a FHE or UHE system, embodied by a plurality of programmatic instructions stored in a memory and executed on a processor, that is configured to receive a first set of plaintext data, encrypt that first set of plaintext data into ciphertext data, perform operations on that ciphertext data to output modified ciphertext data, and decrypt that modified ciphertext data to yield a second set of plaintext data, wherein the second set of plaintext data is the same plaintext data that would have been yielded had those operations been performed directly on the first set of plaintext data without first encrypting it. The result of this data transformation, using the specific methods and systems disclosed herein, has several tangible, concrete benefits.

First, encrypted data can now be processed without having to know the content of the plaintext data, without having to know or have access to the encryption key, or without having to first decrypt the encrypted data. It should be appreciated that this feature is achieved by each combination or embodiment disclosed herein, including where the input data is ciphertext.

Second, this completely secure processing method is achieved with high levels of processing efficiency. Specifically, the FHE or UHE system applies string concatenation operations on encrypted data. The string concatenation operations, as applied to the FHE or UHE formatted data, are mathematically equivalent to multiplication and/or addition operations applied to plaintext. From a processing efficiency standpoint, where processing efficiency is a defining parameter of a processor in combination with the executing software and defined as the number of processing cycles per operation, the FHE or UHE system is designed to perform a string concatenation operation that is equivalent to addition with a processing efficiency that is no greater than 10 times the processing efficiency of the addition operation assuming the same type of processor. For example, if a given processor requires 100 cycles to add 2 32 bit numbers in plaintext, the FHE system would require no more than 1000 cycles to perform a string concatenation operation, which is mathematically equivalent to addition, on the encrypted version of the 2 32 bit numbers. Similarly, the FHE or UHE system is designed to perform a string concatenation operation that is equivalent to multiplication with a processing efficiency that is no greater than 10 times the processing efficiency of the multiplication operation assuming the same type of processor. For example, if a given processor requires 500 cycles to multiply 2 32 bit numbers in plaintext, the FHE system would require no more than 5000 cycles to perform a string concatenation operation, which is mathematically equivalent to multiplication, on the encrypted version of the 2 32 bit numbers. In sum, the FHE system is designed to perform a series of string concatenation operations that are equivalent to any set of polynomial operations with a processing efficiency that is no greater than 10 times the processing efficiency of the polynomial operation assuming the same type of processor. For example, if a given processor requires 1000 cycles to perform a given polynomial operation on 2 32 bit numbers in plaintext, the FHE system would require no more than 10000 cycles to perform a string concatenation operation, or set of string concatenation operations, which are mathematically equivalent to the polynomial operation, on the encrypted version of the 2 32 bit numbers. It should be appreciated that this feature is achieved by each combination or embodiment disclosed herein, including where the input data is ciphertext.

In another embodiment, on average, the string concatenation operations will require no more than processing cycles than 120% of the average of the mathematically equivalent combination of addition and multiplication operations. Therefore if the processing speed of a multiplication operation on plaintext is 500 cycles and the processing speed of an addition operation on the plaintext is 100 cycles on given processor, the processing speed of a mathematically equivalent set of string concatenation operations in the present FHE or UHE system is 360 cycles or less (or less than 120% of the average of the multiplication and addition operations, which is 300 cycles). It should be appreciated that this feature is achieved by each combination or embodiment disclosed herein, including where the input data is ciphertext.

Third, unlike any other previously disclosed homomorphic encryption approach, this completely secure processing method is achieved with minimal amounts of data expansion. The encrypted form of the plaintext data grows almost linearly with respect to the size of the plaintext data. In an embodiment, the amount of memory occupied by the encrypted form of plaintext data will not exceed 4 times n log(n), where n is the length of plaintext in bits. In an embodiment, the amount of memory occupied by the encrypted form of plaintext data is equal to n log(n), where n is the length of plaintext in bits. It should be appreciated that this feature is achieved by each combination or embodiment disclosed herein, including where the input data is ciphertext.

Fourth, the presently disclosed FHE and UHE systems do not degrade the current user experience. Because the processing and memory use impact is minimal, the presently disclosed FHE and UHE systems can be readily implemented in existing commercial messaging, search, financial transaction, file and user authentication, block chain processing, filtering, network monitoring and other systems. It should be appreciated that this feature is achieved by each combination or embodiment disclosed herein, including where the input data is ciphertext.

Fifth, the presently disclosed FHE and UHE systems do not require bootstrapping to achieve homomorphism. Stated differently, in the course of applying a plurality of operations, whether multiplication, addition, other functions, or combinations thereof, the encrypted data in the FHE and UHE systems do not degrade and, therefore, do not require intermediate steps of decrypting and re-encrypting in order to remove the degradation. It should be appreciated that this feature is achieved by each combination or embodiment disclosed herein, including where the input data is ciphertext.

The above listed hardware and computing performance benefits are meaningful limitations because they demonstrate an effective solution to an Internet-centric problem (keeping data private and secure during electronic transmission over networks) with a solution that is necessarily rooted in computer technology (data encryption and limitations on increased processing cycles and memory size). It should also be appreciated that, while the data transformation process relies on the use of certain mathematical algorithms, these algorithms are narrowly defined, and they are tied to a specific data encryption process. These limitations are not necessary or obvious tools for achieving data encryption, and, accordingly, the claims do not preempt the field of data encryption, or homomorphic data encryption generally.

I. Overview

The FHE or UHE system comprises a plurality of programmatic instructions, stored in memory and executed on a processor, which applies a parameterized family of homomorphic encryption operations on plaintext data. Each individual encryption operation is defined on a set of natural numbers and returning natural numbers. The plurality of programmatic instructions of the FHE or UHE system operates by first choosing natural numbers parameters K, L, i and j such that $0<K=L$ and with i naming the $i^{th}$ permutation of $\{1, 2, \ldots, K\}$ and j being the $j^{th}$ permutation of $\{1, 2, \ldots, L\}$. For each input x, the plurality of programmatic instructions of the FHE or UHE system computes the numerical position of the term in the canonical cardinal ordering of $A_K$ that represents x, and through a reflection operation from jth enumeration of the canonical ordinal enumeration $A_L$, a number named x^. From the Fundamental Theorem of Arithmetic, and a natural recursion, it follows that each $Alpha_K$ term is positioned in a unique position for each enumeration or permutation, i, of $\{1, 2, \ldots, K\}$. The input to the presently disclosed encryption process and system are a plurality of data elements derived from the plurality of bits of the plaintext data. In an embodiment, the inputs are defined as integers.

The positions associated with particular inputs and particular permutation indices define numbers for which the system can create additive and multiplicative views. The multiplicative view is uniquely determined by the fundamental theorem of arithmetic and the additive view, while not unique, can be defined in a number of ways, one of simplest of which follows. By definition, the system defines $AV(2)=\{2\}$ and $AV(3)=\{3\}$ and for any natural numbers larger than 3, the system picks the largest prime that is less than or equal to half of x. The system subtracts that prime from the input x, and recurs this process downward to create an additive view of x, guaranteeing no more than log(x) terms. All non-Boolean natural numbers can be expressed as the sum of no more than six primes allowing certain optimization of space when compared to the simple algorithm presented.

The creation of the multiplicative view of a number x is a unique multiset of primes. The very act of encryption causes a natural number to be factored, a known difficult problem and a feature that adds to the difficulty of breaking the encrypting code. The plurality of programmatic instructions of the FHE or UHE system next expresses the natural numbers for each of the index position numbers as a set of standard terms in the first-order language of $Alpha_K$ and translates (or reflects) these terms, using the permutation i, into terms in $j^{th}$ enumeration in $Alpha_L$ and then back into i as previously described.

After creating the $A_K$ index term positions, the plurality of programmatic instructions of the FHE or UHE system encrypts each of these index positions to a term in the language of $A_K$ with the change being that the symbol that names the B and $C_i$ monadic operations in $A_K$ are changed through reflection from the $A_L$. These terms are then evaluated in $A_K$ to yield the appropriate numerical outputs.

II. UHE/FHE Encryption Method

Let x, K and L be any natural numbers such that $0<K=L$ and let i and j be natural numbers as described above. For each combination of these input parameters the present specification discloses the creation of a specific FHE/UHE encryption scheme.

Cryptography systems require a specific number, say 0 or a 1, to be encrypted to a different random value for a given key □(K.i, L.j). To accomplish this, the FHE/UHE system uses Semantic Security (see the description in the Semantic Security section below).

In accordance with an aspect, the FHE/UHE system supports an arbitrarily large key space with semantically indistinguishable keys. The result of using these keys and the underlying arithmetic models, $A_K$, is an encryption system that is recursively enumerable complete in its complexity. The FHE/UHE system operates in real-time, with efficiency gains at least $10^{10}$ times greater speed than the prior art encryption systems. The FHE/UHE system works not only as a bitwise encryptor, but also operates on different word lengths (8-bit, 16-bit, 32-bit and even 64-bit). Prior art homomorphic encryption implementations create a dramatic increase in the memory requirement for key generation. The FHE/UHE system ciphertext, of the present specification, is typically less than two times the plaintext size, and no more than 4 times n log(n) where n is the number of plaintext bits.

Keying Complexity

Since FHE/UHE system uses two or more different arithmetic models and each model is dependent on the choice of a particular prime number, the concept of key generation within the FHE/UHE system cryptographic system is natural and will now be discussed. Key generation is the process of generating keys to enable a cryptographic process, i.e. a key is used to encrypt and decrypt whatever data or plaintext is being encrypted/decrypted. Modern cryptographic systems may include symmetric-key algorithms (such as DES and AES) and public-key algorithms (such as RSA). Symmetric-key algorithms use a single shared key and keeping data secret requires keeping this key secret. Public-key algorithms use a public key and a private key. The public key is made available to anyone (often by means of a digital certificate). A sender encrypts data with the public key and only the holder of the private key can decrypt this data. Since public-key algorithms tend to be much slower than symmetric-key algorithms, modern systems such as TLS and SSH use a combination of the two: one party receives the other's public key and encrypts a small piece of data (either a symmetric key or some data used to generate it). The remainder of the communication uses a typically faster symmetric-key algorithm for encryption.

Computer cryptography uses integers for keys. In some cases, keys are randomly generated using a random number generator (RNG) or pseudorandom number generator (PRNG). A PRNG is a computer algorithm that produces data that appears random under analysis. PRNGs that use system entropy to seed data generally produce better results, since this makes the initial conditions of the PRNG much more difficult for an attacker to guess. In other situations, the key is created using a passphrase and a key generation algorithm, usually involving a cryptographic hash function such as SHA-1.

A typical method to read encrypted data is a brute force attack-simply attempting every number, up to the maximum length of the key. Therefore, it is desirable to use a sufficiently long key length as longer keys take exponentially longer to attack, rendering a brute force attack impractical.

With the FHE/UHE system of the present specification, it is possible to implement any key generation scheme with arbitrary key length—such as Public Key, Private Key, Symmetric Key exchange and Private Key exchange. The FHE/UHE system enables a plurality of key generation and exchanges such as, but not limited to, random binary string key generation and exchange, structured binary string key generation and exchange, hierarchical binary string key generation and exchange, simple keying similar to on-off keying, FHE/UHE selection based on nth prime successor or other prime oriented computations. Also, the FHE/UHE system based key generation and exchange processes do not interfere with the homomorphic properties of the encryptors.

The FHE/UHE system of the present specification enables any permutation of the order of the monadic C-operators to create an isomorph of the original model. In the case of K=3, there are 3! or 6 permutations. Each of these permutations creates a different algebra and each permutation induces a unique ordering or enumeration of the node labeled-tree storing triples of natural numbers. Therefore, each permutation translates each natural number uniquely to another natural number derived from the unique enumeration while preserving homomorphism. This allows the model dimension to be mapped homomorphically into the model of dimension 3 and generally allows K-models to be mapped homomorphically into L-models and then reflected back to the K-models.

Since we assume that for the natural number dimensions of K and L that 0<K=L, it follows that if the number K!>2^128, then K>32. This however would be the number of dimensions needed if no reflection was performed to accomplish encryption. In the FHE/UHE system described herein, where reflection is used, (K!)^2 must be greater than 2^28, and hence K >20. Manipulating K and L allows us to optimize or otherwise make dynamic FHE/UHE system complexity and is appropriate for the intended application. As apparent from the discussion above, many different types of FHE/UHE system implementations can be developed using the basic prime-based node labeled trees and types of recursive enumerations described in this document.

It should be noted that in all L or K models, the initial prime natural numbers can be named by their C-symbols and later through the use of the monadic B-operator combined with multiplication. Therefore, the primes larger than those named by the C-symbol operators are enumerated by applying the B-Operator to the terms of the algebra in numeric order. Since the FHE/UHE system mapping involves the use of the prime successor function, the mapping can be assumed to be pseudo random since primes are pseudo random. In accordance with an embodiment, K-tuple and the L-tuple and their specific permutations represent the key space. Therefore, each key is structurally identical to every other key.

In the present FHE/UHE embodiment, the generation of a key does not affect the degree or extent of homomorphism. FHE/UHE key generation and use is very efficient and does not depend on the size of the key space. Further, it should also be noted that L and K themselves can be made part of the key and that neither FHE/UHE encryption nor decryption would then requires knowledge of L or K.

Finally we note that both addition and multiplication as operations can be represented as special form of set union with the individual sets being finite sets of prime natural numbers. This allows the present embodiments to treat the problem of full homomorphism in parallel ways as is shown in the next sections.

Homomorphic Multiplication

Assume that the natural numbers K and L are equal to each other and that each FHE(x, □(K.i, L.j)) or UHE(x, □(K.i, L.j)) multiplicative encryption request begins with the construction of the $Alpha_K$ expressions that represent the inputs x and y in the canonical cardinal ordering of $Alpha_K$. This allowing the FHE/UHE system to create the position numbers for the same $Alpha_K$ expressions using the $i^{th}$ enumeration described in the requested key. These numerical position are denoted by $\hat{x}$ and $\hat{y}$.

For each natural number position name, $\hat{x}$, the FHE/UHE system creates two finite sets of prime natural numbers, an additive set or view whose elements add together to be x and a multiplicative set or view whose elements multiple together to be x. The FHE/UHE system creates, for each of these views, the $Alpha_L$ terms that describe the prime numbers in these views. It is these views that allow us to map $\hat{x}$ and $\hat{y}$ homomorphically back to terms in $Alpha_K$.

To do this, the $Alpha_L$ terms are processed, using the permutation j to rearrange the C-symbols, and, in that way, create the $Alpha_K$ terms x' and y', read "x-prime" and y-prime' in the ordinal enumeration of $Alpha_k$. These terms are evaluated in $Alpha_K$ resulting FHE/UHE's output.

Because of this construction and the Fundamental Theorem of Arithmetic, the FHE/UHE encryption operation has the property:

$$UHE(x*y, \square(K.i,L.j))=UHE(x, \square(K.i,L.j))*UHE(y, \square(K.i,L.j))$$ or $$FHE(x*y, \square(K.i,L.j))=FHE(x, \square(K.i,L.j))*FHE(y, \square(K.i,L.j)).$$

To illustrate the FHE/UHE process and demonstrate the multiplicative homomorphic property of the FHE/UHE system we start with two numbers, x=30 and y=31, and using their $Alpha_3$ canonical cardinal order create the symbolic expression of natural numbers 30 and 31. Next, the FHE/UHE system finds the position number of these forms under the {2→1}, 1→2, 3→3} transformation. Using additive and multiplicative views and the permutation j, these positional terms are translated back to $Alpha_3$.

Said precisely begin with x=30 and y=31 and let key chosen be the tuple that follows:

$$<K=2, L=3, i=\{1\to 2, 2\to 1, 3\to 3\}, j=\{1\to 3, 2\to 1, 3\to 2\}>.$$

Below, we illustrate the translation of these index terms into each other while preserving multiplicative morphism. In the following section, we will use the same example and show that additive morphism is also preserved.

The natural number 30, in $Alpha_3$, is canonically represented, in a cardinal fashion, as the term $C_1(C_2(C_3(1)))$ and this term in the i enumeration named by the key of request is represented by the term $C_2(C_1(C_3(1)))$, which (also) evaluates to the number 30.

The natural number 31, in $Alpha_3$, is canonically represented in a cardinal fashion, as the term $B(C_1(C_1(C_1(1))))$ and this term in the i enumeration named by the key of request is represented by the term $B(C_2(C_2(C_2(1))))$, which evaluates to the number p(27+3)=113.

We now translate the numbers 30 and 113 to their homomorphic translations in $Alpha_3$ by first constructing the multiplicative view of both numbers.

| $Alpha_{3=K}$ Multiplicative Terms Cardinal ordering/$1^{st}$ permutation | $Alpha_{3=L}$ Multiplicative Translates Ordinal Ordering/$i^{th}$ permutation |
|---|---|
| x = 30 → {2, 3, 5} | |
| K = 3 { $C_1(1), C_2(1), C_3(1)$ } | K = 3 { $C_2(1), C_1(1), C_3(1)$ } → $30\hat{} = 30$ |
| y = 31 → { 31 } | |
| K = 3 { $B(C_1(C_1(C_1(1))))$ } | K = 3 { $B(C_2(C_2(C_2(1))))$ } → $31\hat{} = 113$ |

Assume that the FHE/UHE system is requested to multiply x by y to obtain z and to then translate z into cyber text using the key. From above, translations of $30\hat{}$ and $31\hat{}$ are created and it is shown that multiplicative homomorphism holds.

| $Alpha_{3=L}$ Multiplicative Terms Ordinal ordering/$1^{st}$ permutation | $Alpha_{3=K}$ Multiplicative Translates Cardinal Ordering/$i^{th}$ permutation |
|---|---|
| x = 30 → { 2, 3, 5 } | |
| K = 3 { $C_1(1), C_2(1), C_3(1)$ } | K = 3 { $C_3(1), C_1(1), C_2(1)$ } → $30\hat{} = 105$ |
| y = 113 → { 113 } | |
| K = 3 { $B(C_2(C_2(C_2(1))))$ } | K = 3 { $B(C_1(C_1(C_1(1))))$ } → $113\hat{} = 113$ |

Next the FHE/UHE system multiplies 30 by 31 obtaining 930 as the number, which is then translated into $Alpha_3$ using the canonical cardinal enumeration. Next the $Alpha_3$ index of this number is found using the key permutation i={1→2, 2→1, 3→3} and then the results are compared.

| $Alpha_3$ Multiplicative Terms Cardinal ordering | $Alpha_3$ Multiplicative Translates Cardinal ordering |
|---|---|
| 930 → { 2, 3, 5, 31 } | |
| K = 3 → {$C_1(1), C_2(1), C_3(1), B(C_1(C_1(C_1(1))))$ } | K = 3 { $C_2(1), C_1(1), C_3(1), B(C_2(C_2(C_2(1))))$ } |
| | 3  2  5  113  $930\hat{} = 3390$ |

The FHE/UHE process has now translated each of the plain text multiplicative symbolic views, or multiplicative alpha forms, into the equivalent dimension 3 terms and back as is determined by the keys. Note that this second operation that translates $A_K$ terms into $A_K$ terms is itself a homomorphic encryption because the unions of the translation of the separate set of primes that define the index position of x and y is equal to the translation of the set of primes that define the product of x and y.

This property generalizes to the product of any two non-Boolean natural numbers, but also by definition for the Boolean numbers, and hence for all natural numbers showing that UHE is homomorphic over multiplication.

Homomorphic Addition

Assume that the natural numbers K and L are equal to each other and that each FHE(x, $\square$(K.i, L.j)) or UHE(x, $\square$(K.i, L.j)) addition encryption request begins with the construction of the $Alpha_K$ expressions that represent the inputs x and y in the canonical cardinal ordering of $Alpha_K$. This allows the FHE/UHE system to create the position numbers for the same $Alpha_K$ expressions using the $i^{th}$ enumeration described in the requested key. These numerical position are denoted by $\hat{x}$ and $\hat{y}$.

For each natural number position name, $\hat{x}$, the FHE/UHE system creates two finite sets of prime natural numbers, an additive set or view whose elements add to x and a multiplicative set or view whose elements multiply to be x. The FHE/UHE system creates for each of these views the $Alpha_L$ terms that describe the prime numbers in these views. It is these views that allow us to map $\hat{x}$ and $\hat{y}$ homomorphically back to terms in $Alpha_K$.

To do this, the $Alpha_L$ terms are processed, using the permutation j to rearrange the C-symbols and, in that way, create the $Alpha_K$ terms x' and y', read "x-prime" and y-prime' in the ordinal enumeration of $Alpha_k$. These terms are evaluated in $Alpha_K$ resulting FHE/UHE's output.

Because of this construction the FHE/UHE encryption operation has the homomorphic property that:

$$UHE(x+y,\Box(K.i,L.j))=UHE(x,\Box(K.i,L.j))+UHE(y,\Box(K.i,L.j)) \text{ or}$$

$$FHE(x+y,\Box(K.i,L.j))=FHE(x,\Box(K.i,L.j))+FHE(y,\Box(K.i,L.j)).$$

To illustrate the FHE/UHE process and demonstrate the multiplicative homomorphic property of FHE/UHE, start with two numbers, x=30 and y=31, and use their $Alpha_3$ canonical cardinal order create the symbolic expression of natural numbers 30 and 31. Next, find the position number of these forms under the {2→1, 1→2, 3→3} transformation. Using the additive and multiplicative views and the permutation j these positional terms are translated back to $Alpha_3$.

Begin with x=30 and y=31 and let key chosen be the tuple that follows:

$$<K=3,L=3,=\{1\to 2, 2\to 1, 3\to 3\}, j=\{1\to 3, 2\to 1, 3\to 2\}>.$$

In this section, we will illustrate with a simple example the translation of these index terms into each other while preserving multiplicative morphism. In the following section we will use the same example and show that additive morphism is also preserved.

Each FHE(x, □(K.i, L.j)) or UHE(x, □(K.i, L.j)) additive encryption request begins with the construction of the $Alpha_K$ expression of the inputs x and y, allowing the FHE/UHE system to create the position of the $Alpha_K$ expression creating position values x^ and y^, using the $i^{th}$ enumeration ordering in the key to the request.

The FHE/UHE system then constructs two sets of arithmetic terms describing the prime natural numbers in the cardinal enumeration of $A_K$. These terms are then passed on and, as a result of further FHE/UHE processing, using the key permutation, to create terms x', read "x-prime" in the ordinal enumeration of the structure $A_L$. A second request for encryption, UHE(y, K, L, key) or FHE(y, K, L, key), based on the same parameters, yields the natural numbers y', read "y-prime" because of the construction UHE(x+y, K, L, key)=UHE(x, K, L, key)+UHE(y, K, L, key) or FHE(x+y, K, L, key)=FHE(x, K, L, key)+FHE(y, K, L, key)

To illustrate the FHE/UHE process and demonstrate the multiplicative homomorphic property of FHE/UHE, the FHE/UHE system starts with two numbers, x=30 and y=31, and uses their $A_3$ cardinal order to create the symbolic express of the numbers 30 and 31. Next, the FHE/UHE system finds the position number of these forms in the {(2→1), (1→)} transformed order. Begin with x=30 and y=31 and let □(K.i, L.j) key chosen be <K=3, L=3, j={1→2, 2→1), j={1→3, 2→1, 3→2}>.

The natural number 30, in $Alpha_3$, is canonically represented in a cardinal fashion as $C_2(C_1(B(1)))$ and this term in the non-identical permuted enumeration is represent by the term $C_1(C_2(B(1)))$, which evaluates to the number 30.

The natural number 31, in $Alpha_3$, is canonically represented in a cardinal fashion as $B(C_2(C_2(1)))$ and this term in the non-identical permuted enumeration is represent by the term $B(C_1(C_1(1)))$, which is 13. The FHE/UHE system now translates the numbers 30 and 13 to their additive homomorphic translates in $Alpha_3$ by first constructing the additive view of both numbers.

Each natural number larger than 1 can be written as a sum of prime natural numbers in several different ways. In this example, the FHE/UHE system uses an algorithm that identifies 2 with the set of primes, {2}, and 3 with the set of primes {3}. For any natural number, n, larger than 3, the FHE/UHE system begins by subtracting the largest prime less than or equal half of the number n from the number and continuing downward until terminating on a final prime.

| $Alpha_3$ Additive Terms<br>Cardinal ordering | $Alpha_3$ Additive Translates<br>Cardinal Ordering |
|---|---|
| x = 30 → {13, 7, 5, 2, 3 }<br>K = 3 {B($C_2$(1)), B(1), $C_3$(1), $C_1$(1) ), $C_2$(1)} | L = 3 { B($C_2$(1)), B(1),<br>$C_3$(1), $C_1$(1) ), $C_2$(1) } |
| y = 31 → {13, 7, 5, 3, 3 }<br>K = 3 { B($C_2$(1)), B(1), $C_3$(1), $C_2$(1), $C_2$(1) } | L = 3 { B($C_2$(1)), B(1),<br>$C_3$(1), $C_1$(1) ), $C_1$(1) } |

This operation that translates $A_K$ terms into $A_L$ terms for K=3 and L=3 is a homomorphic encryption because the unions of the translation of the separate set of primes that define the index position of x and y is equal to the union translation of the set of primes that define the product of x and y. This property generalizes to the product of any two non-Boolean, but also by definition for the Boolean numbers, and hence for all natural numbers showing that this operation, by itself, is a homomorphic over addition.

The translation of 30^ and 31^ proceeds in the same way that they did for multiplication and thus it follows that FHE/UHE is an additive homomorphism, that is:

$$UHE(30+13,\Box(3.\{1\to 2,2\to 1,3\to 3\},3.\{1\to 3,2\to 1, 3\to 2\}))=UHE(30,\Box(K.\{1\to 2,2\to 1,3\to 3, L.\{1\to 3,2\to 1,3\to 2\}))*UHE(31,\Box(K.\{1\to 2, 2\to 1,3\to 3\},L.\{1\to 3,2\to 1,3\to 2\})) \text{ or}$$

$$FHE(30+13,\Box(3.\{1\to 2,2\to 1,3\to 3\},3.\{1\to 3,2\to 1, 3\to 2\}))=FHE(30,\Box(K.\{1\to 2,2\to 1,3\to 3, L.\{1\to 3,2\to 1,3\to 2\}))*FHE(31,\Box(K.\{1\to 2, 2\to 1,3\to 3\},L.\{1\to 3,2\to 1,3\to 2\})).$$

Homomorphic Addition with Negative Numbers

It should be appreciated from the above description of homomorphic addition in FHE/UHE that, since in the case of additive homomorph the addition in the plaintext domain is multiplication in cipher text domain, then subtraction in plaintext is equivalent to division in the cipher text domain. However, in order to make sure that division maps back to subtraction and multiplication maps back to addition, a plurality of conditions apply as described below.

The subtraction (or addition with negative numbers) (x−y) in cipher text, is represented as $(x'_A/y'_A=N_A/D_A)$, where $N_A$ is the numerator and hence composed of prime multiplicative factors $x'_A$ while $D_A$ is the denominator and hence composed of the prime multiplicative factors of $y'_A$. $N_A$ and $D_A$ can be divided through to the most basic rational factor or a decimal representation. If these numbers are completely divided through, the corresponding rational factor containing natural numbers must first be computed and then factored into $N_A$ and $D_A$ NLTs so they can be mapped back to plaintext using the keys and then added or subtracted in the plaintext domain.

Looking at this from a set-theory perspective, if the FHE/UHE system starts with non-Boolean natural numbers y and x where 0<y−x<y<x then the process of addition is described in action as a union of the additive components of the x and y inputs. However, we chose the X-Pairs $(X_A, x_M)$ and $(y_A, y_M)$ pairs such that $(x-y)_A$ equals the set theoretic intersection of $x_A$ and $y_A$ (and this is possible) then the process of subtraction is described as an intersection of the additive side of the x and the additive side of the y inputs.

Semantic Security

Let x and y be two arbitrary plaintext messages. Their cipher texts are of the ordered pair forms $x'=(x'_A, x'_M)$ and $y'=(y'_A, y'_M)$. Also, in order to compute $x'_A$ and $x'_M$, we add another random number $\square_x$ to x, such that $X=x+\square_x$. To compute $X'_A$ and $X'_M$ then the $\alpha_K$ NLT representation of X is mapped to its $\alpha_L$ NLT representation using the key, which will now include $\square_x'$ as a factor. In cipher text domain (in $A_L$), addition is done using multiplication so $\square_x'$ factor is not affected, which can always be subtracted in plain text if the original $\square_x$ is already known. The multiplicative components of $X_M$ are completely different from $x_M$.

Using a similar approach, to compute $y'=(y'_A, y'_M)$ from y, the FHE/UHE system adds another random number $\square_y$ to y, such that $Y=y+\square_y$. To compute $Y'_A$ and $Y'_M$ then the $\alpha_K$ NLT representation of Y is mapped to its $\alpha_L$ NLT representation using the key, which will now include $\square_y'$ as a factor. In cipher text domain (in $A_L$), addition is done using multiplication so $\square_y'$ factor is not affected, which can always be subtracted in plain text if the original $\square_y$ is already known. The multiplicative components of $Y_M$ are completely different from $y_M$. The computations are now performed on $X'$ and $Y'$ as defined earlier.

The semantic security presented above is a way to add random numbers to plaintext, where the processes of homomorphic addition and homomorphic multiplication do not affect the encrypted portions of these random numbers and they can be removed from plaintext once the information is decoded. It should be appreciated that the FHE/UHE can be extended to work, without boot-strapping, over the entire range integers and it is still semantically secure. It should also be clear that semantic security methods shown here also protect the keys from being exposed that result from mapping of small primes (associated with the key).

Mixing Addition and Multiplication Operations on Cipher-text

Persons of ordinary skill in the art would appreciate, from the above descriptions of homomorphic addition and multiplication in FHE/UHE, that plaintext addition maps to cipher text multiplication while plaintext multiplication also maps to cipher text multiplication. In order to perform addition and multiplication operations in cipher text without any limit, resulting additive and multiplicative morphs both have to be updated after each operation. Thus, in the case of (x+y), the additive morph is $x'_Ay'_A$, but the $(x+y)'_M$ component needs to be determined. Similarly, in the case of (xy), the multiplicative morph is $x'_My'_M$, but the FHE/UHE system needs to determine the additive component $(xy)'_A$. This is accomplished as follows:

TABLE Y

| | Additive View | Multiplicative View |
|---|---|---|
| x + y | $(x+y)'_A = x'_Ay'_A$ | $(x+y)'_M = x'_My'_M$ |
| Xy | $(xy)'_A = x'_Ay'_A$ | $(xy)'_M = x'_My'_M$ |

$(x+y)'_A=x'_Ay'_A$, where every prime factor of the Kleene Prime indices of $x'_Ay'_A$ are added together when they are mapped back in plaintext;

$(x+y)'_M=x'_My'_M$, where prime factor of the Kleene Prime indices of $x'_My'_M$ are individually multiplied together and their results are added together after these are mapped back in plaintext;

$(xy)'_A=x'_Ay'_A$, where prime factor of the Kleene Prime indices of $x'_Ay'_A$ are individually added together and their results are multiplied together after these are mapped back in plaintext; and $(xy)'_M=x'_My'_M$, where every prime factor of the Kleene Prime indices of $x'_My'_M$ are multiplied together when they are mapped back in plaintext.

It should be noted that for $(x+y)'_A=x'_Ay'_A$, where every multiplication operation in $x'_Ay'_A$ is interpreted in plaintext domain as addition, the operation of addition in plaintext maps to the operation of multiplication in the cipher-text and the operation of subtraction in plaintext maps to the operation of division in cipher-text. It should also be noted that for $(xy)'_M=x'_My'_M$, where every multiplication operation in $x'_My'_M$ is interpreted in plaintext domain as multiplication, the operation of multiplication in plaintext maps to the operation of multiplication in the cipher-text and the operation of division in plaintext maps to the operation of division in cipher-text.

The problem, however, arises in the mixed mode cases of $(x+y)'_M=x'_My'_M$, where every multiplication operation of the prime factors of $x'_My'_M$ should be interpreted in plaintext domain as multiplication, but these multiplied output values should then be added together. While in the case of $(xy)'_A=x'_Ay'_A$, every prime factor of $x'_Ay'_A$ should be interpreted in plaintext domain as addition, but these added results should then be multiplied together. The problem occurs since both multiplication and addition operations in cipher-text are represented using the multiplication operation. An alternate way to think about this is as follows:

$$(x+y)'_A = x'_A U_A y'_A$$

$$(x+y)'_M = x'_M U_A y'_M$$

$$(xy)'_A = x'_A U_M y'_A$$

$$(xy)'_M = x'_M U_M y'_M$$

where $U_A$ is the union (multiplication) in cipher-text that is interpreted as addition in plaintext and $U_M$ is the union (multiplication) in cipher-text that is interpreted as multiplication in plaintext.

In practice, the FHE/UHE system only needs to keep either the multiplicative view (MV) or the additive view (AV) since both addition and multiplication operations in plaintext can be represented in terms of only the AV or only the MV.

To accomplish the above, the additive and the multiplicative unions should be appropriately marked. This can be accomplished in a plurality of ways. Consider the following example: plaintexts x=6 and y=4. The additive view of $x_A=\{3, 3\}=\{C_2c, C_2c\}$ and its multiplicative view $x_M=\{2, 3\}=\{C_1c, C_2c\}$ while $y_A=\{2, 2\}=\{C_1c, C_1c\}$ and $y_M=\{2, 2\}=\{C_1c, C_1c\}$. Since union in our system is multiplication, $x_A=C_2cC_2c$, $x_M=C_1cC_2c$, $y_A=C_1cC_1c$ and $y_M=C_1cC_1c$. The FHE/UHE system can now encrypt these values using the same key as discussed above with reference to FIG. 1E. The FHE/UHE system uses a translation keying here just to illustrate the concept, such that K=2 and L=3 and $C_1$ maps to $C_3$ and $C_2$ maps to $C_1$ into $x'_A=C_1cC_1c$, $x'_M=C_3cC_1c$, $y'_A=C_3cC_3c$ and $y'_M=C_3cC_3c$. However, in order to mark the additive and multiplicative unions separately, the FHE/UHE system reassigns these values as $x_A=C_1BC_2cC_2c$, $x_M=BC_1cC_2c$, $y_A=C_1BC_1cC_1c$ and $y_M=BC_1cC_1c$, where $C_1B$ is the additive union marker and B is the multiplicative union marker. The 4 values from Table Y become:

$$(x+y)'_A = x'_A U_A y'_A = C_1B(C_1BC_2cC_2c + C_1BC_1cC_1c)$$

$$(x+y)'_M = x'_M U_A y'_M = C_1B(BC_1cC_2c + BC_1cC_1c)$$

$(xy)'_A = x'_A U_M y'_A = B(C_1 B C_2 c C_2 c + C_1 B C_1 c C_1 c)$ $(xy)'_M = x'_M U_M y'_M = B(B C_1 c C_2 c + B C_1 c C_1 c)$

The above example illustrates the power and simplicity in which FHE/UHE can be implemented, without requiring any boot strapping. Semantic security can be guaranteed by adding a random number to the $x_A$ and $y_A$ and random multiple to $x_M$ and $y_M$, which would translate into the prime index being changed by the cipher-text of the random amount. The random number is carried as a plaintext so that it can be subtracted/divided at the time of decoding.

It should also be noted that the actual algebraic expressions above may never have to be evaluated and could simply be represented as a binary sequence. It can be shown that such naturally enumerated tables of binary sequence length n grow at Big-Oh n log(n) rate.

Persons of ordinary skill in the art should appreciate that the fully homomorphic encryption example described above is just one possible way of meeting the requirements for full homomorphism. It should also be clear that the marking technique described above is not the only way to mark the binary operation.

Homomorphic Comparison

At times, the FHE/UHE system needs to perform order detection in a homomorphic environment. In such cases, the following mechanism can be used to perform homomorphic addition or multiplication as well. If x and y are natural numbers and addition, +, is the text operation chosen as part of the input condition then the FHE/UHE system of the present specification computes homomorphic addition as a look-up table generated for a given key as part of the encryption process. The Table Z, below, exhaustively contains all possible addition combinations of inputs x and y, given that x+y is same as y+x. The primary benefit of the Table Z below is the speed and processing efficiency. The Table Z essentially reduces the processing required to perform the process of addition to an efficient look-up table.

It should be noted that the information contained in the Table Z, below, is all encrypted and provides no information about the keys, plain-text values or the source of their creation.

TABLE Z

| X' | Y' | (X + Y)' | X < Y |
|---|---|---|---|
| encrypted value of input X | encrypted value of input Y | encrypted value of (X + Y) | 1-bit value denoting if X is less than Y for the X' and Y' in this column |

An alternative method for computing homomorphic addition from the multiplicative homomorphs of x and y, namely x' and y' respectively, may be achieved using recursive computation on the symbolic representations of x' and y'. This recursive process is relatively slow and requires categorizing if the x' and y' are prime numbers, even numbers or odd numbers that are not prime numbers. The process is, however, time and resource intensive.

Table Z, described above, is used to perform fast homomorphic addition and includes a fourth column that provides a 1-bit value denoting whether the plain-text x is less than plain-text y for a given cipher-text x' and cipher-text y' and for that key. Since the FHE/UHE encryption guarantees a 1-1 mapping of plain-text to cipher text for a given key, for x and y to be equal, x' and y' would have to be the same. Hence a single bit value is sufficient to provide inequality information. It should be noted that this approach can be made semantically secure by the method described in the Semantic Security section above.

As in addition, the inequality test in the UHE system of the present specification is reduced to an efficient look-up function. It should be noted that the inequality part, that is the column four of the Table Z above, can be an entirely separate table in various embodiments. The order information that can be gleaned from this inequality "computation" is for the user.

UHE Complexity

For any natural numbers K and L the complexity inherent in the core notions and transformations that define UHE (x, □(K.i, L.j)) or FHE (x, □(K.i, L.j)) are guaranteed by the Theorem below:

Theorem: For natural number K and any set X of natural number K-tuples:

X is re iff X is EBQ definable over the structure:

$A_K = <N, 0, p(x+K), p(i)*x \text{ for } 0 < i < K+1, x*y>$.

where EBQ definability restricts all definitions to be definitions written in prefix normal form with only one existential quantifier and where all internal quantifier are restricted to be bound in any evaluation or model checking process to elements that are syntactic "less than" the witness for the lead quantifier. It should be noted that each existential k-free formula interpreted over the aforementioned arithmetic structure $A_K$ defines a recursively enumerable set of k-tuples.

To show that each re set of k-tuples is definable in such a particular way, the monadic operation on the natural numbers of $2^x$ is first defined in an existential bounded quantification or EBQ-like fashion as defined. To complete the construction of an EBQ form for defining any re set of k-tuples, the usual arithmetic constructions are followed using our EBQ definition of $2^x$ noting that each intermediate construction remains an EBQ form. In summary, the logical re-completeness of the EBQ forms guarantees the complexity of the UHE family of algorithms and shows that they are also re-complete.

In addition, any standard Chinese Remainder Theorem query (CRT), Q, involving k different co-prime modulus values and certain conditions involving these values, can be expressed in the language of $A_K$ using its monadic operations to create k different prime arithmetic progressions. In this way, using the same encoding techniques used to prove the aforementioned theorem, we see that $A_K$ expresses query Q as an existential sentence whose internal quantifiers are bound in a natural way by the lead existential quantifier. This expression is preserved using any of the UHE dimensional translations showing that those translation are at least as complex as the CRT queries.

Thus, the FHE/UHE sample bulges are above the not quite achievable limit of 1/16. The FHE/UHE sample has a larger average and a higher standard deviation than the other functions studied. On the other hand, the sample is not a primitive of a cryptographic systems but merely one of a very large number of transformations that can be generated in the course of its operation.

The Alpha Core Language, ACL, is an applied first-order language with equality whose non-logical symbols include a single constant symbol "c", a single binary operation symbol "+", a single monadic operator, B, and a monadic operation symbol C, where C generically represents an entire family of $C_1, C_2, \ldots C_i$. It should be noted that i C symbols along with a single B created an i! key space. Each of the As ($A_1, A_2, \ldots$) can be referred to as types of A and, similarly, each of the components of B can be called types of B, etc.

In general, the C-Symbol is seen as a counting symbol or a node creation symbol in a node-labeled tree, whereas the B-Symbol is seen as a container creation symbol or the root creation symbol in a node labeled tree.

Although i C symbols with a single B symbol can create a high level of complexity, the security of such a system can be greatly enhanced by introducing j B symbols instead of just one. The key space for such a system becomes $2^{(i \times j)}$, where the keys could be the function adding specific Bs and Cs to the plaintext in a specific order or changing their indices, or even changing specific Cs to specific Bs.

In addition, an A-Symbol (representing k A symbols) can be introduced to create distinction including, but not limited to, the distinction of duality and negation, and even the single '+' binary symbol can be replaced by 1 different M symbols representing 1 different types of binary operators such as, but not limited to, multiplication, addition, subtraction and division.

The above represents the more general representation of the node labeled trees and hence node labeled tree based UHE of the present specification.

Operational Metrics

FIG. 2 is an example table illustrating a comparison of performance and operational metrics with reference to a typical SHE (Somewhat Homomorphic Encryption) 205, FHE (Fully Homomorphic Encryption) 210 and the UHE system 215 of the present invention when run on a dual-core 2.65 GHz processor with 8 GB RAM.

In accordance with an embodiment, the UHE system is approximately $10^{12}$ times faster than a typical FHE implementation, such as FHE 210. As shown in FIG. 2, the UHE system 215 provides ~2-5 μs (microseconds) for two simultaneous 32 bit encryption and multiplication and ~2-5 μs (microseconds) for two simultaneous 32 bit encryption and addition. The UHE encryption and decryption processes further provide the following benefits:

Multiplication is directly homomorphic, so the processing cost of multiplication in cipher-text is the same as the processing cost of multiplication in plaintext.

Addition in cipher-text is an ordinary multiplication.

UHE is semantically secure.

Inequality comparison in cipher-text is reduced to a single bit look-up (illustrated as column four in Table Z), the processing cost of which is less than any comparison test done in plaintext.

The cipher-text is approximately n log(n) times the size of the plaintext (where the size of the plaintext is n), and does not exceed 4 times n log(n). This does not include saving the plaintext random number for semantic security.

Key generation requires very little memory and the keys are structurally indistinguishable from each other. The length of the key increases the complexity of the security, but it does not affect the processing required to do encryption or decryption.

According to various aspects, the FHE/UHE system of the present specification supports multiplication and addition, including homomorphic order detection as well as other set processing capabilities, such as but not limited to homomorphic union and membership without boot strapping, and the entire system is secure. FHE/UHE does not cause meaningful data expansion and, as such, the cipher-text is roughly the same length as plaintext thereby requiring limited key generation memory. In addition, the FHE/UHE system goes beyond additive and multiplicative morphism to, for example, morphism in more general set and tree functions, as defined above. The FHE/UHE is substantially more complex than prior art encryption standards since it is based on finding the distance between arbitrary unknown primes and then performing additional operations such as multiple divisions.

The FHE/UHE system of the present specification supports an arbitrarily large key space with semantically indistinguishable keys. The result is an encryption system that is recursively enumerable complete in its complexity. The FHE/UHE system operates in real-time, with efficiency gains at least $10^{12}$ times greater speed than the prior art full homomorphic encryption systems. The FHE/UHE system works not only as a bitwise encryptor, but also operates on different word lengths (8-bit, 16-bit, 32-bit and even 64-bit).

Prior art homomorphic encryption implementations create a dramatic increase in the memory requirement for key generation. However, the FHE/UHE ciphertext, according to the present specification, is less than two times the plaintext size, and the memory requirement for key generation is insignificant. Multiplication is directly homomorphic, so the cost of multiplication in ciphertext is the same as the cost of multiplication in plaintext. Addition, in ciphertext, is equivalent to multiplication in the plaintext. Semantic security is easily accomplished whether we keep the additive morph or the multiplicative morph and does not affect the performance of the homomorphic addition or the homomorphic multiplication operations. It only requires saving the original random number in plaintext. The ciphertext is preferably n log(n) times the size of the plaintext, and no greater than 4 times n log(n). The key generation requires very little memory and the keys are structurally indistinguishable from each other. The length of the key increases the complexity of the security, but does not affect the processing required to affect the encryption or decryption.

III. Another Method for UHE/FHE Encryption

An abstract notion of a finite unranked tree and an abstract notion of a prime natural number are directly inter-translatable. Further, both of the binary operations of addition and multiplication are Sigma-1, or recursively enumerable, over a structure $<N^+, 1, p(x), x*y>$. This is direct evidence that finite trees can be used as a base of a new homomorphic encryption scheme and that the tree themselves provide a bridge over a "syntax/semantic divide".

FIG. 21 illustrates a mapping of numbers to primes, in accordance with an embodiment of the present specification. The table 2100 shows a first column 2105 of natural numbers in order acting as an index, a second column 2110 of a listing of all quasi natural numbers (where a number is a quasi-prime if and only if any product of natural number that multiplies together to be the number forces one or both of the factors to be the number one, as previously defined) and a third column 2115 is a binary string in Prime Arithmetics that is used to name a prime in a corresponding position of the second column 2110.

To begin, it is noted that an accepted standard model of arithmetic, $<N, 0, 1, +, *>$ where N names a set of all natural numbers, "0" names zero, "1" names one, and the two binary operation "+" and "*" name the ordinary binary operations of addition and multiplication, is isomorphic to a prime arithmetic structure $<\{p(0)\}, p(1), p(2), p(3), \ldots \}, p(0), p(1), ++, >$ based on a universe consisting of the numbers one and all the primes, with constants or names for $p(0)=1$ and $p(1)=2$, and the two binary operation, x++y and xy, where for any natural numbers m and n:

$$p(m)++p(n)=p(m+n) \text{ and } p(m)**p(n)=p(m*n)$$

In accordance with embodiments, a Tree Based Encryption and a UHE(n, key, perm) operation is described using subsets of the universe of prime arithmetics, a system equivalent in overall complexity to standard arithmetic but that allows a special and very useful binary numeration system for describing one and the prime natural numbers as will be seen below. After noting the change in notational base from standard arithmetic to prime arithmetics an overall description of the Tree Based Encryption begins with a description of certain sets of prime natural numbers called keys. By definition, K is a key if and only if 0 is not an element of K, 1 and 2 are both elements of K and for any element t of K greater than 2 the element t is a prime and there exist another prime in K that is larger than t but less than 2t. It follows that for any non-zero natural number, n, and any key, K, the number n can be written as a sum of a unique subset of K. For any key K, we define the enumeration of K using the monadic operation q as the enumerator of K. For example, any key K must begin as <q(0)=1, q(1)=2, q(2)=3, q(3)=7, ... >. This notation is used to define the operation UHE(n, K, Pem).

Example: The Additive Morph for Tree Based Encryption

Using the Max-Key with the Perm shown as follows:

$$MaxK=<1,2,3,5,7,13,23,43,83,\ldots>$$

$$q(0)q(1)q(2)q(3)q(4)q(5)q(6)q(7)q(8)\ldots$$

$$Perm=q(1)q(6)q(3)q(0)q(2)q(4)q(5)q(8)q(7)\ldots$$

Let x=79 and y=47 be inputs from the new Prime Arithmetics structure noting that the number 79=p(22) and the number 47=p(15). Suppose Alice computes 79+47 and sends the output to Bob as (79++47)' in Prime Arithmetics. To show the ++-morphology we need to show that from the inputs 79' and 47' Bob can compute (79+47)'.

First, Bob forms a unique set of Max-Key primes (or the unique set of primes of the key under consideration) that add to the inputs 79 and 47 by forming a multiset union of the sets prime key elements that add to 79 and 47 respectively.

Next Alice uses the permutation Perm to rename the arguments in the multi-sets of primes that add to the inputs and in this way maintain the use environment of Prime Arithmetics.

Next this multi-set is rewritten, using the q(x) notation or not, to sequentially replace pairs of prime in the union multiset with their equivalent translation, as follows:

$$79=\{43,23,13\}=\{q(7),q(6),q(5)\})\to 79'=\{q(8),q(5),q(4)\}=A$$

$$47=\{43,3,1\}=\{q(7),q(2),q(0)\})\to 47'=\{q(8),q(3),q(1)\}=B$$

$$126=\{83,43\}=\{q(8),q(7)\}\to 126'=\{q(7),q(8)\}=C$$

Note that there are Max/Perm Prime Arithmetic pair-transformation rules that transform equal valued pairs of primes in the multi-set union of the multiset corresponding to the inputs 79 and 47 if and only if there are Max/Perm Prime Arithmetic pair-transformation rules that transform equal value pairs in the multi-set union of the multiset corresponding to the inputs 79' and 47'.

The paired transformation rules used to transform 79 and 47 into 126 are shown below:

{43,23,13} multiset union {43,3,1}={43,43,23,13,3,1}=use 43+43=83+3 to replace the multiset above with {83,23,13,3,3,1}=use 3+3=5 to replace the multiset above with {83,23,13,5,1,1}=use 1+1=2 to replace the multiset above with

{83,23,13,5,2}

Finally it should be noted that 23+13+5+2=43 to replace the multi-set above with.

Also it should be noted that the Max/Perm Prime Arithmetic pair-transformation rules that transform the multi-set union of 79' and 47' into 126' are directly derived from Max Standard Arithmetic pair transformation that translate the multiset union of the set of primes that represent 79 and the set of primes that represent 47'. The translations are shown below:

$$43+43=83+3q(7)+q(7)=q(8)+q(2)q(8)+q(8)=q(7)+q(6)$$

$$3+3=5+1q(2)+q(2)=q(3)+q(0)q(2)+q(2)=q(3)+q(0)$$

$$1+1=2q(0)+q(0)=q(1)q(0)+q(0)=q(1)$$

Example: The Multiplicative Morph of Tree Base Encryption

Using the Max-Key with the Perm shown $$MaxK=<1,2,3,5,7,13,23,43,83,\ldots>$$

$$q(0)q(1)q(2)q(3)q(4)q(5)q(6)q(7)q(8)\ldots$$

$$Perm=q(1)q(6)q(3)q(0)q(2)q(4)q(5)q(8)q(7)\ldots$$

Let x=79 and y=47 be inputs from the new Prime Arithmetics structure noting that the number 79=p(22) and the number 47=p(15). Suppose Alice computes 79*47 and sends the output to Bob as (7947)' in Prime Arithmetics. To show the -morphology we need to show that from the inputs 79' and 47' Bob can compute (79+47)'.

$$79=\{43,23,13\}=\{q(7),q(6),q(5)\}\to 79'=\{q(8),q(5),q(4)\}=A$$

$$48=\{43,3,1\}=\{q(7),q(2),q(0)\}\to 47'=\{q(8),q(3),q(1)\}=B$$

3713

Note first that Alice, in the process of constructing (79*47)', would express 3713 as a sum of the {2633, 661, 331, 83, 5} in MaxKey.

Next note that because of the distributive law and the way these numbers have been expressed as sums of multi-set of prime we can write the product of 79 and 47 as the sum of a set of paired produces as follows:

$$3713=\{43\times 42+43\times 3+43\times 1+23\times 43+23\times 3+23\times 1+13\times 43+13\times 3+13\times 1\}$$

The fact that these two forms are logically equal given the proper paired translation rules is something that can be determined by Bob using the cyber text created by Alice and the translating permutation. Bob can also ask the same questions concerning the appropriateness of certain paired translations within the isomorphic context of Prime Arithmetics. Finally asking the same question in the realm of Prime Arithmetic represented using the translation rules of FIG. 21 and the ++ and ** binary operation rules does not change the underlying logic but does allow the efficiency of Prime Arithmetic notational system to reduce the complexity of the binary strings involved in the process (FIG. 21).

General Notation for Naming Primes

It should be noted that in both the additive and multiplicative forms of encryption described above we come to a last stage of computation which involve a manipulation of finite multi-sets containing any number of symbols naming the natural number one together with the multi-set union of some finite multi-set of prime natural numbers. Such multi-sets can be converted into binary strings that name the collection of multi-set being collected, up to order, and also name primes allowing for a naturally manipulation of the strings in Prime Arithmetics.

To begin, we build a table, such as table 2100 of FIG. 21, that associates with the natural number one the binary string <10> and associates for every positive natural number k, a binary string that names the prime natural number p(k). The recursion used to create the table 2100 is described more formally below using a notation that allows the symbols "[x]p" to name a position in the table 2100 with the binary string naming p(x):

[1]$p$=<10>;

If k>1 and a prime then $[p(k)]_p$=<1_[k]$_p$>;
if k>1 and composite then $[p(k)]_p$=<1_0_[A]$_p$_[B]$_p$_[C]$_p$ ... [Z]$_p$>, where, A, B, C, ... Z are the prime natural numbers that multiply together to form k.

Note that defining the natural number n using the standard Vonn Neumann numerals requires about 2^n bits but same natural number using the numerals defined here requires only about log $2(n)$ bits.

Security

It should be noted that the definition of a key, as defined so far, allows many different sets of primes to be keys. In fact the definition allows for a possibility of an uncountable number of keys, a result that follows directly from a straight forward Cantor argument.

We could, for example, identify each monadic index operation defined on the natural numbers yielding Boolean values with the key that asks the next value to be either the maximum prime allowed or the next to the largest prime allowed depending on the corresponding of the Boolean sequence used to define the key. It is known to persons of ordinary skill in the art that there are an uncountable number of such Boolean enumerations and so it follows that there are also an uncountable number of TBE keys.

Since, in the construction of UHE(n, Key, Perm), we know that part of the argument that show how to construct UHE(x+y, Key, Perm) from UHE(x, Key, Perm) and UHE(y, Key, Perm) involved the construction of a permuted multi-set of primes and the testing of possible paired-rewrite rules for appropriateness. If the set of prime in the key used is recursively enumerable we can use this fact to create an algorithm that can be reused to create the original key.

But if the key is not recursively enumerable, which some must be because there are more than a countable number of keys but only a countable number of algorithms in any finitary programming language, then this process is not possible.

To argue for security we need only construct a single non-re key and then compose this single key with, say the polynomial functions, creating a countable and controllable number of unbreakable keys. The Konig Lemm/Kleene Tree gives directions for building the single unbreakable key we need for our argument.

The FHE/UHE methodologies of the present invention are implemented as logical steps in one or more computer systems. The logical operations of the present invention are implemented as a sequence of processor-implemented steps executing in one or more computer systems and/or as interconnected machine or circuit engines within one or more computer systems. The implementation is a matter of choice, dependent on the performance requirements of the computer system implementing the invention.

FIG. 3 illustrates an example of a suitable computing system environment 300 for implementing the FHE/UHE processes of the present invention comprising a computing device in the form of a computer 310. Components of the computer 310 may include, but are not limited to, a processing unit 320, a system memory 330, and a system bus 322 that couples various system components including the system memory 330 to the processing unit 320. The computer 310 typically includes a variety of computer readable media that can be accessed by computer 310. The system memory 330 may include computer storage media in the form of volatile and/or nonvolatile memory such as read only memory (ROM) and/or random access memory (RAM). By way of example, and not limitation, system memory 330 may also include an operating system, application programs, other program modules, and program data. A user can typically enter commands and information into the computer 310 through input devices 340. A monitor or other type of display device (not shown) is also connected to the system bus 322 via an interface, such as output interface 350. In addition to a monitor, computers can also include other peripheral output devices such as speakers and a printer, which may be connected through output interface 350. The term "server" may refer to a single distinct computing device or a network of computing devices that are collectively configured to receive and to transmit data as an addressable unit. The term "memory" or "memory device" may refer to a single storage device or a network of storage devices that are collectively configured to receive and to transmit data as an addressable unit.

The computer 310 may operate in a networked or distributed environment using logical connections to one or more other remote computers, such as remote computer 370. The remote computer 370 may be a personal computer, a server, a router, a network PC, a peer device or other common network node, or any other remote media consumption or transmission device, and may include any or all of the elements described above relative to the computer 310. The logical connections illustrated in FIG. 3 include a network 372, such as local area network (LAN) or a wide area network (WAN), but may also include other networks/buses. Such networking environments exist in homes, offices, enterprise-wide computer networks, intranets and the Internet.

Persons of ordinary skill in the art should appreciate that the UHE system of the present invention may be implemented in connection with hardware or software or, where appropriate, with a combination of both. As used herein, the terms "algorithm," "scheme," "system" and the like are likewise intended to refer to a computer-related entity, either hardware, a combination of hardware and software, software, or software in execution.

IV. Example Applications

The UHE scheme of the present invention enables application of a plurality of analyses including evaluation of polynomials of bounded degree on elements of encrypted data thereby maintaining confidentiality of sensitive data. As an example, predictive analysis uses computational tools, often statistical tools including modeling, data mining, or game theory to analyze data to make predictions about future events, trends, or values. In one implementation, predictive analysis employing statistical computations such as, but not limited to, an average, a standard deviation, and a logistical regression, may be performed.

Additionally, the FHE/UHE semantic security described above provides the possibility of public key encryption using FHE/UHE. It should be noted that the keying mechanism described above is private or symmetric key. The □(K.i, L.j)-key used above is a secret key in the symmetric keying mechanism described. However, with the inclusion of the random prime additive D in the additive morph and the random prime factor □ in the multiplicative morph offers the following two possibilities:

Symmetric Keying—? is kept in plaintext and carried along with their respective cipher texts with 𝒦 (K.i, L.j)-key being the evaluation key $E_k$ Public Keying—? is encrypted using any encryption standard like AES using another key $P_k$, while the UHE key is □(K.i, L.j). Using the two keys, a public key protocol can be developed.

These keying mechanisms can be further developed using similar concepts. The above example is just one of a plurality of possible methods. The symmetric and public keying mechanisms are then used as the application requires.

One method of maintaining the secrecy of a user's data in a cloud-based computational environment is to store all data in an encrypted format and to perform the computations on the encrypted data, without decrypting the data first. The FHE/UHE scheme of the present specification enables storage and computation of secret data without decrypting the data. In this specification, the term "cloud" typically refers to any group of networked computers capable of delivering computing services (such as computations, applications, data access, and data management and storage resources) to end users. This specification does not limit the type (such as public or private) of the cloud as well as the underlying system architecture used by the cloud.

Figure 10:
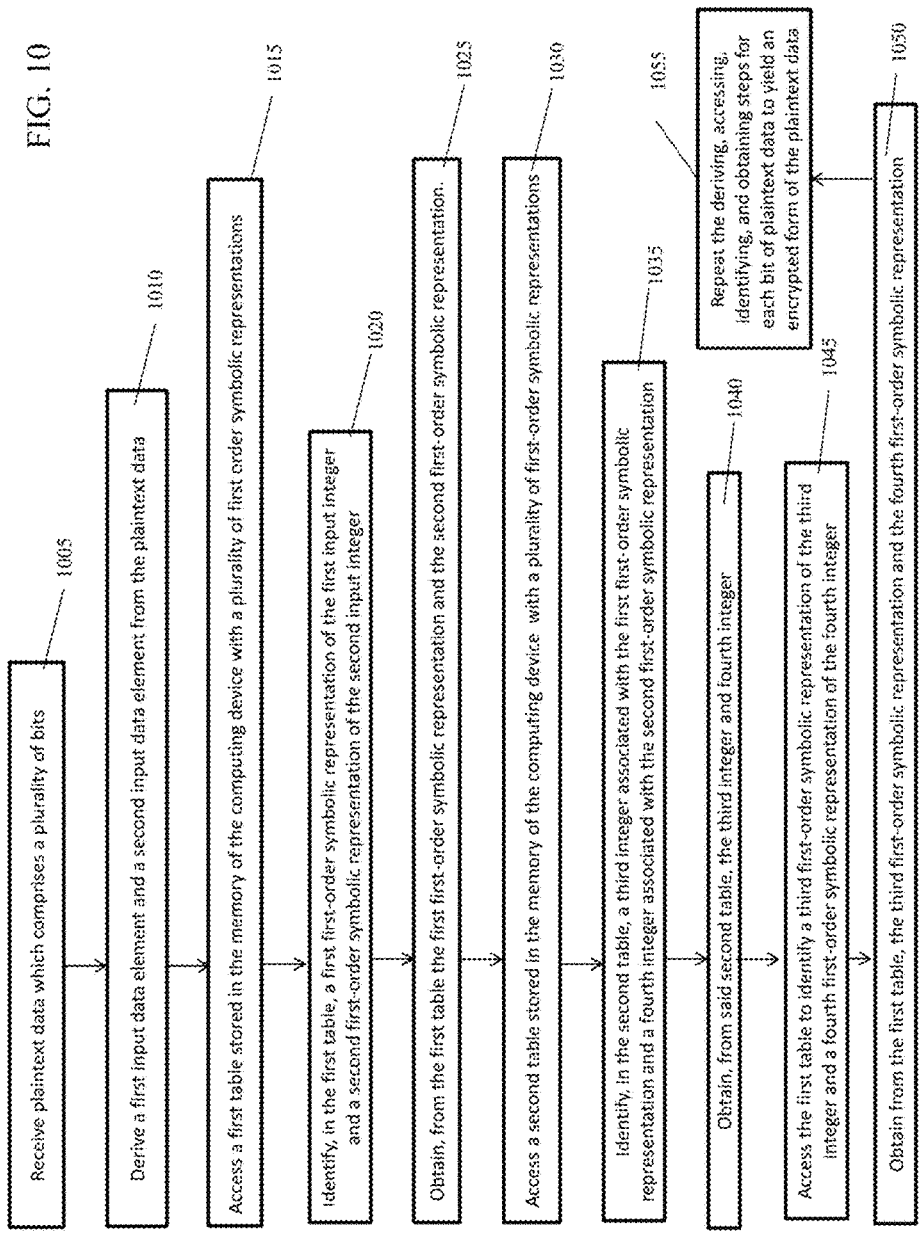
FIG. 10 is a flowchart illustrating an exemplary encryption process performed by computing devices.

It should be appreciated that, in the following examples, the applications are enabled by a server or client device implementing an encryption process, as described above. Referring to FIG. 10, a server or client device would encrypt plaintext data in a computing device having a processor and memory by: 1) at step 1005, receiving, in the memory of the computing device, plaintext data, which comprises a plurality of bits, 2) at step 1010, deriving from the plaintext data a first input data element and a second input data element, where the data element is any representation of the plaintext data bits and is preferably in the form of an integer (first input integer and a second input integer), and 3) at step 1015, accessing a first table stored in the memory of the computing device, where the first table associates a plurality of integers with a plurality of first order symbolic representations. It should be appreciated that the first table may be predefined prior to the encryption process or computed on the fly and provided in real-time. The server or client device then identifies, at step 1020, in the first table, a first first-order symbolic representation of the first input integer and a second first-order symbolic representation of the second input integer. The server or client device then obtains, at step 1025, from the first table the first first-order symbolic representation and the second first-order symbolic representation. The server or client device then accesses, at step 1030, a second table stored in the memory of the computing device (predefined or computed on the fly), which associates a plurality of integers with a plurality of first-order symbolic representations, and subsequently identifies in the second table, at step 1035, a third integer associated with the first first-order symbolic representation and a fourth integer associated with the second first-order symbolic representation. The server or client device then obtains, from said second table, at step 1040, the third integer and fourth integer and accesses, at step 1045, the first table to identify a third first-order symbolic representation of the third integer and a fourth first-order symbolic representation of the fourth integer. At step 1050, the server or client device obtains from the first table, the third first-order symbolic representation and the fourth first-order symbolic representation, wherein the third first-order symbolic representation and fourth first-order symbolic representation are encrypted forms of the first input integer and second input integer, and in steps 1055 onward, repeats the deriving, accessing, identifying, and obtaining steps for each bit of said plurality of bits of plaintext data to yield an encrypted form of the plaintext data, where the encrypted form of the plaintext data does not occupy more than 4 times n log(n) of the memory and wherein n is equal to the number of said plurality of bits.

Alternatively, a server or client device would encrypt plaintext data in a computing device having a processor and memory by: 1) receiving, in the memory of the computing device, plaintext data comprising a plurality of bits; 2) deriving from the plaintext data a first data element (e.g. input integer) and a second data element (e.g. input integer); 3) adding a first random number to the first input integer to yield a modified first input integer and adding a second random number to the second input integer to yield a modified second input integer; 4) accessing a first table stored in the memory of the computing device, the first table associating a plurality of integers with a plurality of first-order symbolic representations, 5) identifying, in the first table, a first first-order symbolic representation of the modified first input integer and a second first-order symbolic representation of the modified second input integer; 6) obtaining from the first table the first first-order symbolic representation and the second first-order symbolic representation; 7) accessing a second table stored in the memory of the computing device, the second table associating a plurality of integers with a plurality of first-order symbolic representations; 8) identifying, in the second table, a third integer associated with the first first-order symbolic representation and a fourth integer associated with the second first-order symbolic representation; 9) obtaining, from the second table, the third integer and fourth integer; 10) accessing the first table to identify a third first-order symbolic representation of the third integer and a fourth first-order symbolic representation of the fourth integer; 11) obtaining the third first-order symbolic representation and the fourth first-order symbolic representation, wherein said third first-order symbolic representation and fourth first-order symbolic representation are encrypted forms of the first input integer and second input integer; and 12) repeating the deriving, accessing, identifying, and obtaining steps for each bit of said plurality of bits of plaintext data to yield an encrypted form of the plaintext data, where the encrypted form of the plaintext data does not occupy more than 4 times n log(n) of the memory and where n is equal to the number of said plurality of bits. Alternatively, a server or client device would encrypt plaintext data in a computing device having a processor and memory by: 1) receiving, in the memory of the computing device, plaintext data comprising a plurality of bits; 2) deriving from the plaintext data a first input integer and a second input integer; 3) accessing a first table stored in the memory of the computing device, the first table associating a plurality of integers with a plurality of first-order symbolic representations, to identify a first first-order symbolic representation of the first input integer and a second first-order symbolic representation of the second input integer; 4) obtaining the first first-order symbolic representation and the second first-order symbolic representation, where the first first-order symbolic representation and said second first-order symbolic representation are encrypted forms of the first input integer and second input integer; 5) repeating the deriving, accessing, and obtaining steps for each bit of the plurality of bits of plaintext data to yield an encrypted form of the plaintext data, where the encrypted form of the plaintext data does not occupy more than 4 times n log(n) of memory and wherein n is equal to the number of said plurality of bits.

Alternatively, a server or client device would process encrypted data in a computing device having a processor and memory by: 1) receiving, in the memory of the computing device, the encrypted data, where the encrypted data comprises a string of symbols, wherein each of said symbols is a node labeled tree representation of an integer; 2) applying at least one string concatenation operation on at least a portion of the encrypted data to yield modified encrypted data, where applying the string concatenation operation to a portion of the encrypted data is adapted to be mathematically equivalent to applying an addition and/or multiplication operation on a portion of the plaintext data, and where applying the string concatenation operation to the portion of the encrypted data requires no more than 10 times more processing cycles, executed by the processor, than the mathematically equivalent addition and/or multiplication operation applied on the portion of the plaintext data; 3) outputting the modified encrypted data; and 4) decrypting the modified encrypted data to yield modified plaintext data, where the modified plaintext data is equal to an output of said mathematically equivalent addition and/or multiplication operation applied to the plaintext data.

The server or client device may implement a variety of optional features, including 1) the first table being partially representative of a key and one of a first plurality of tables and where each entry in each of said first plurality of tables relates an integer to a symbolic representation; 2) a first-order symbolic representation of an integer in one of the first plurality of tables differing from a first-order symbolic representation of the integer in any other of the first plurality of tables, 3) the first plurality of tables defining a cardinal enumeration of dimension K where K is a positive natural number, 4) the second table being partially representative of a key and one of a second plurality of tables, where each entry in each of the second plurality of tables relates an integer to a first-order symbolic representation; 5) the first-order symbolic representation of an integer in one of the second plurality of tables differing from a first-order symbolic representation of the integer in any other of the second plurality of tables; 6) the second plurality of tables defining an ordinal enumeration of dimension L where L is a positive natural number; 7) the encrypted form of the plaintext data comprising a string of symbols where each of the symbols is a node labeled tree representation of an input integer; 8) the encrypted form of the plaintext data comprising a plurality of node labeled tree representations where each node label tree representation corresponds to an input integer; 9) the encrypted form of the plaintext data comprising a plurality of first-order symbolic representations where the plurality of first-order symbolic representations comprise Boolean strings; and 10) the encrypted form of the plaintext data comprises a string of symbols wherein each of said symbols is a node labeled tree representation of an input integer.

Figure 4:
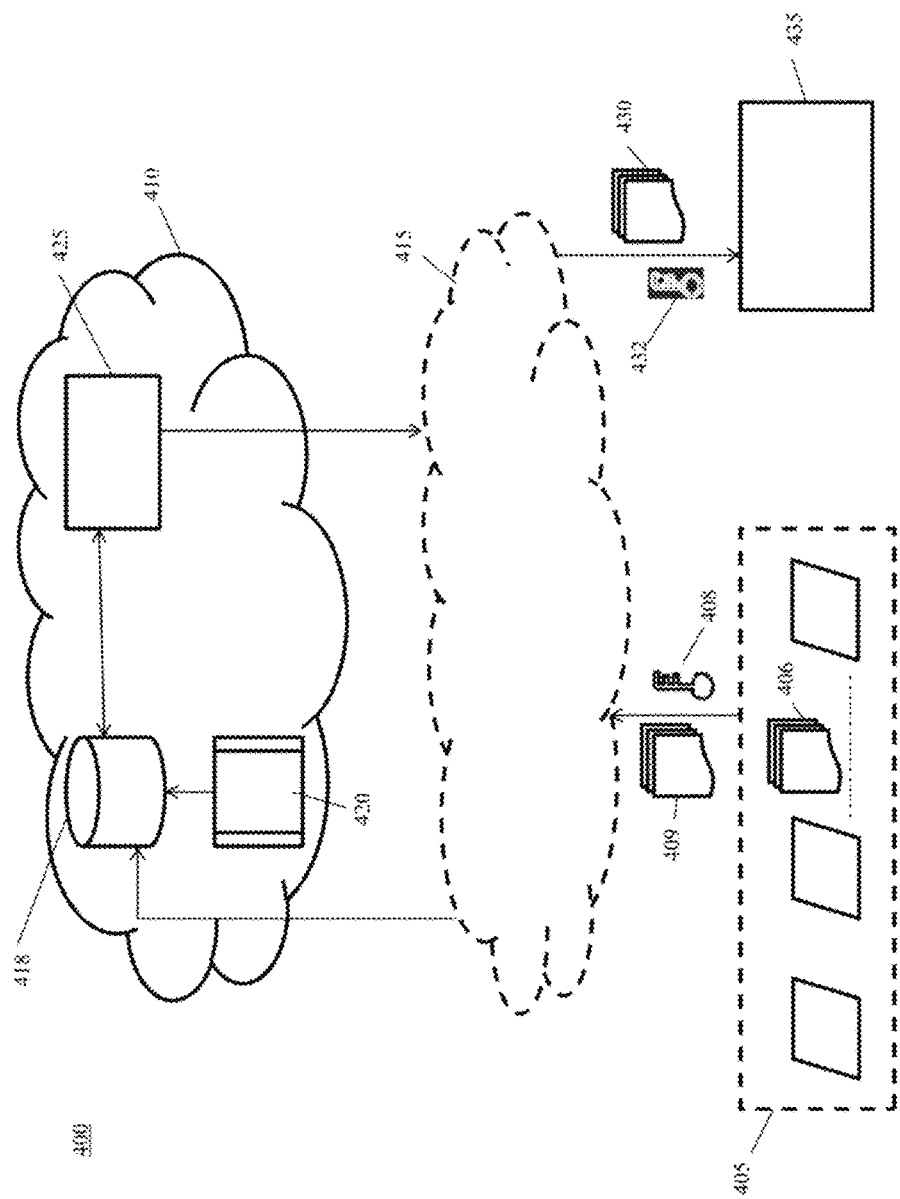
FIG. 4 illustrates an exemplary cloud-based scenario providing secure storage and computation services.

FIG. 4 illustrates an embodiment of an exemplary cloud-based scenario 400 providing secure storage and computation services on data encrypted using a user's public key 408 (under a public-key or asymmetric cryptography scheme), although in an alternative implementation, symmetric-key encryption, using a shared secret/key, may be employed. As shown in FIG. 4, a plurality of data collection, generation or provider entities 405 (hereinafter referred to as 'data entities') are communicatively coupled to a cloud service system 410 via a public or private communication network 415. The data entities 405 encrypt data 406 using the public key 408 before uploading the data 406 to the cloud service system 410. Data 409 represent the user's data being uploaded in encrypted format to the cloud service system 410. In various embodiments, the encrypted data 409 may be streamed in real time or uploaded in batches to the cloud service system 410. The uploaded encrypted data 409 is received by at least one storage device 418 associated with the cloud service system 410. In various embodiments, the at least one storage device 418 may physically or logically reside within a single location or organization, or may be distributed.

Using an implementation of the FHE/UHE system of the present invention, the cloud service system 410 performs a plurality of computations/operations on the uploaded encrypted data 409 without decrypting the data itself. In various embodiments a plurality of application specific computation/operation functions 420 reside within the storage device 418. These functions 420 are called upon by a computing system 425 to perform a plurality of computations, calculations or analyses on the encrypted data 409 to generate a plurality of processed encrypted output 430 without breaching secrecy of the encrypted data 409. The processed encrypted output 430 is then communicated to the user 435 who decrypts the output 430 using a private key 432.

In accordance with an embodiment, the FHE/UHE system based public/private key pair 408, 432 are generated by a trusted third party which publishes the public key 408 and distributes the private key 432 to the registered user.

The aforementioned cloud service based implementation of the FHE/UHE system of the present invention may be customized for a plurality of specific applications. In an embodiment, the scenario 400 of FIG. 4 is enabled for secure storage and processing of a patient's electronic health records (EHR). Thus, in this embodiment the plurality of data entities 405 are various healthcare-monitoring devices monitoring the patient to collect and encrypt data 406 pertaining to a patient's medical record before uploading the patient's encrypted data 409 to the patient's record in the cloud service system 410. The healthcare-monitoring devices comprise devices such as a blood pressure reader, heart monitor, a thermometer, a pulse oximeter, an image data store, such as an imaging database containing a patient's MIR results, or any other healthcare data source that would be readily evident to persons of ordinary skill in the art. The encrypted data 409 may include blood pressure readings, heart monitor data, blood sugar readings, for example, along with information about the patient, such as age, weight, gender, and other patient parameters. The functions 420 are, in this embodiment, healthcare computation/operation functions that perform a plurality of computations on the patient's encrypted medical data 409.

Example computations that may be performed include without limitation averages, standard deviations, and other statistical functions, such as logistical regressions that can help predict the likelihood of certain dangerous health episodes. As a result of these computations/analyses the computing system 425 sends processed encrypted output 430 to the patient 435. The output 430 may comprise various updates, alerts, predictions, or recommendations which, in an embodiment, are decrypted by various monitoring and/or dosage devices, or an alert station that provides a user interface to the alert information, or by other healthcare systems.

Figure 5:
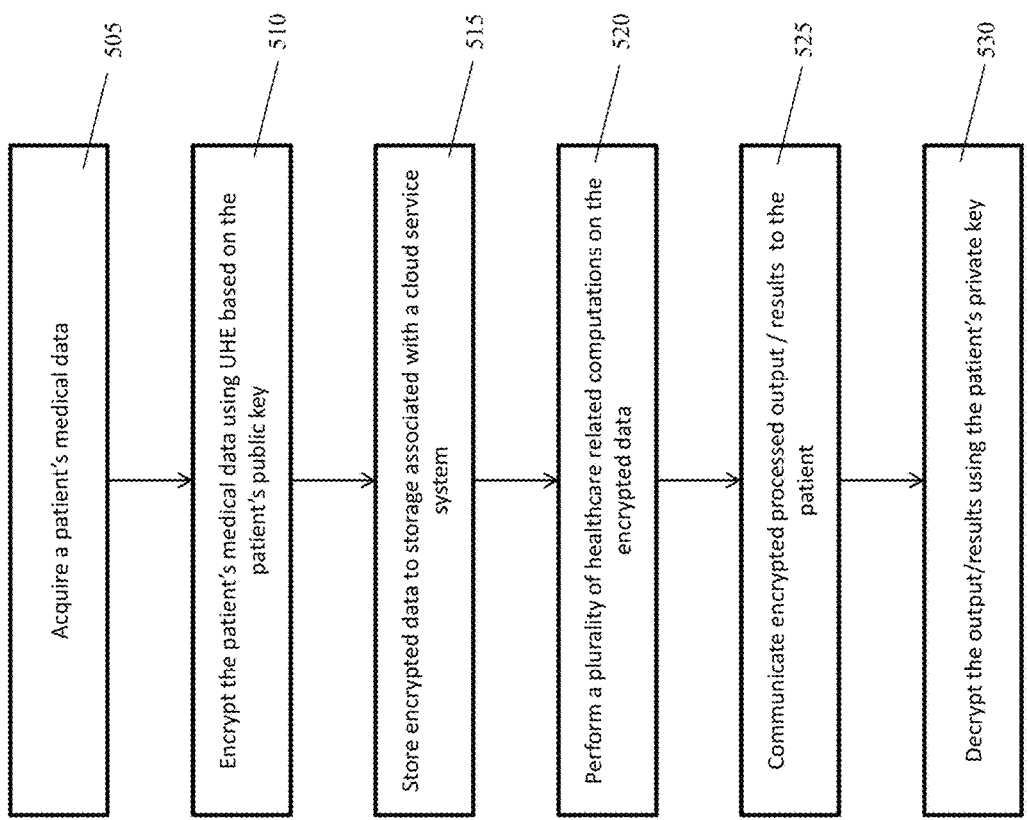
FIG. 5 is a flow chart illustrating a plurality of exemplary steps for implementing a cloud based electronic healthcare records system in accordance with an embodiment.

FIG. 5 is a flow chart illustrating a plurality of exemplary steps for implementing a cloud based electronic healthcare records system in accordance with an embodiment. At step 505, a patient's medical data is acquired. The acquired medical data is then encrypted, at step 510, using FHE/UHE based on the patient's public key and thereafter the encrypted medical data is uploaded for storing, at step 515, to a cloud service system. The medical data may be acquired using a plurality of healthcare-monitoring devices and streamed in real-time or in batches directly to the cloud service system and/or may be uploaded offline by a caregiver. At step 520, a computing system associated with the cloud service system then uses a plurality of healthcare functions to perform computations, operations or analyses on the encrypted medical data of the patient. The processed encrypted output/result is communicated back to the patient, at step 525 where the encrypted output/result is decrypted, at step 530, using the patient's private key.

In another embodiment, the scenario 400 of FIG. 4 is enabled for secure storage and processing of financial, compliance (such as taxes) and/or business data for a user's consumption. Thus, in this embodiment the plurality of data entities 405 correspond to corporate, banks, financial institutions, stock exchanges, financial analysts, brokerage firms, financial and taxation regulatory bodies/authorities. Depending on the context of their business operations, these data entities 405 generate a plurality of financial and/or business data 406. For example, in case of a corporate (including, for example, brokerage firms and financial analysts wanting to analyze performance of the corporate), data 406 may comprise stock price data over a period of time, inventory, a plurality of accounts related data such as sales, costs, expenses, investments and debt. Similarly, in case of a bank, data 406 may comprise a plurality of asset and liability items such as loans, interests, deposits and other cash inflows/outflows. Still further, in case of an individual, data 406 may comprise income, expenses and investments as part of personal income tax computation disclosures. It should be appreciated that these financial/business data entities 405 may generate a portion of the financial and/or business data 406 themselves and may collect, acquire or source another portion of the data 406 from third parties (such as, for example, stock price information may be sourced from a stock exchange). Alternatively, all financial and/or business data 406 may be generated by these financial/business data entities 405 themselves or fully sourced from third parties depending on the context of business operations and the sensitive nature and availability of such data 406.

The aforementioned plurality of financial and/or business data 406 is encrypted using the user's public key and uploaded to the at least one storage device 418 as encrypted financial and/or business data 409. The functions 420 are, in this embodiment, financial computation/operation functions that perform a plurality of computations on the encrypted financial and/or business data 409. In accordance with an embodiment, the financial and/or business computation functions 420 are also encrypted using the user's public key and uploaded to the storage device 418 as encrypted functions. Example computations that may be performed include without limitation financial ratio analyses, predictive models for stock price performance, inventory management decision modeling, enterprise resource planning and analyses, business operational management and performance analyses and benchmarking, asset-liability mismatch analyses, advance and forecasted tax liabilities. As a result of these computations/analyses the computing system 425 sends processed encrypted output 430 to the user 435. In some embodiments, the user 435 and a party representing the data entities 406 may be the same. However, in various alternate embodiments, the user 435 may be a different party from those representing the data entities 406.

The output 430 may comprise various financial and/or business related updates, alerts, predictions, or recommendations which, in an embodiment, are decrypted using the user's private key for the user's private consumption and/or financial/business publishing.

Figure 6:
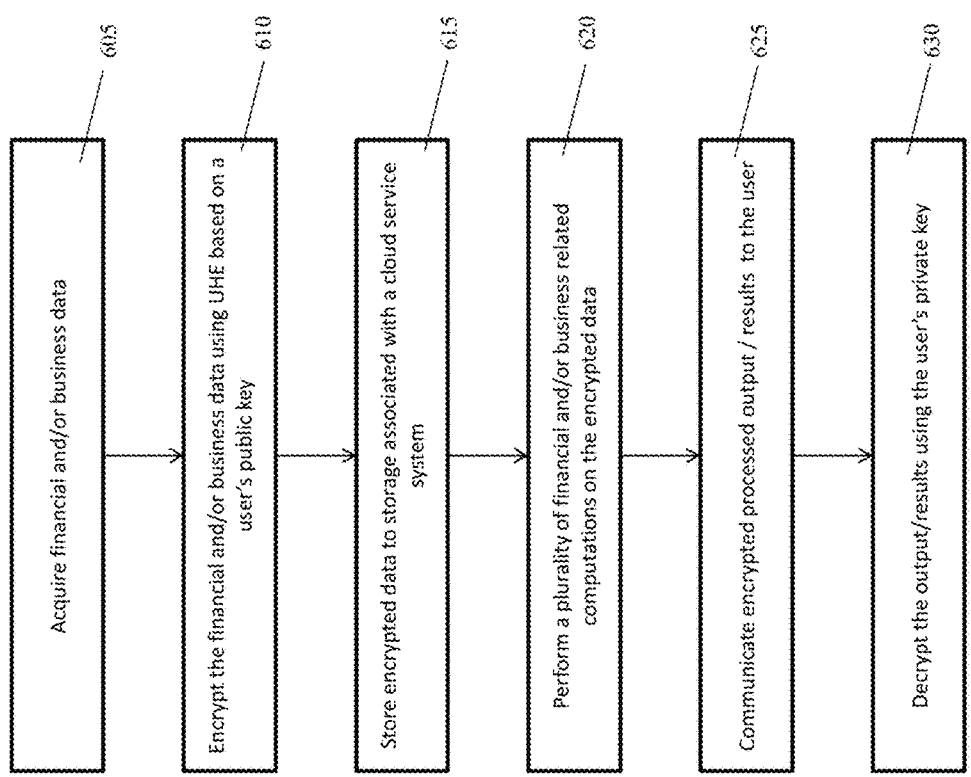
FIG. 6 is a flow chart illustrating a plurality of exemplary steps for implementing a cloud based financial and/or business compliance, intelligence and decision management system in accordance with an embodiment.

FIG. 6 is a flow chart illustrating a plurality of exemplary steps for implementing a cloud based financial and/or business compliance, intelligence and decision management system in accordance with an embodiment. At step 605, a plurality of financial and/or business data is acquired. The acquired financial and/or business data is then encrypted, at step 610, using FHE/UHE based on a user's public key and thereafter the encrypted financial and/or business data is uploaded for storing, at step 615, to a cloud service system. The financial and/or business data may be streamed in real-time or in batches directly to the cloud service system and/or may be uploaded offline. At step 620, a computing system associated with the cloud service system then uses a plurality of financial and/or business functions to perform computations, operations or analyses on the encrypted financial and/or business data. The processed encrypted output/result is communicated back to the user, at step 625 where the encrypted output/result is decrypted, at step 630, using the user's private key.

While the example applications of an electronic healthcare record system and a financial and/or business compliance, intelligence and decision management system have been described with reference to FIGS. 5 and 6, respectively, in the back drop of a cloud based computing service of FIG. 4, persons of ordinary skill in the art should appreciate that these and other applications can be implemented on any type of private or public network topology/architecture. Thus, various embodiments and methods described in this specification can be implemented in connection with any computer—client or server device, which can be deployed as part of a computer network or in a distributed computing environment, and can be connected to any kind of data store or stores. In this regard, the various embodiments and methods described in this specification can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage. Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like.

There are a variety of systems, components, and network configurations that support distributed computing environments. For example, computing systems can be connected together by wired or wireless systems, by local networks or widely distributed networks. Typically, many networks are coupled to the Internet, which provides an infrastructure for widely distributed computing and encompasses many different networks. Thus, a host of network topologies and network infrastructures, such as client/server, peer-to-peer, or hybrid architectures, can be utilized.

In another exemplary application of the UHE method of the present specification, a secure information providing/retrieval service which can be accessed through secured querying or search is described. Examples of information/retrieval providing services include, without limitation, patent information retrieval systems, customer's banking account information systems, genetic arrangement information retrieval systems, archived email information retrieval systems, criminal and defense intelligence information retrieval systems, or general informational search. While accessing or querying such information providing services, for example, in the case of retrieving genetic arrangement information or patient information, it is desirable that who accessed the information under which conditions can be concealed, that is, confidentiality of the name of the user who accessed the information and the contents of retrieval/query is maintained. Another example is that of accessing of a customer's banking account and related account processing resulting from the customer's e-commerce (via net banking and/or credit/debit card) or ATM transactions. It would be highly desirable if the customer's banking account information, especially account balances, payables/receivables, is stored and processed in encrypted form in response to an encrypted e-commerce/ATM transaction or query. A yet another example is that of accessing/querying sensitive email archives that are stored in encrypted form and processed or searched without a need for decrypting in response to secured encrypted querying.

Figure 7:
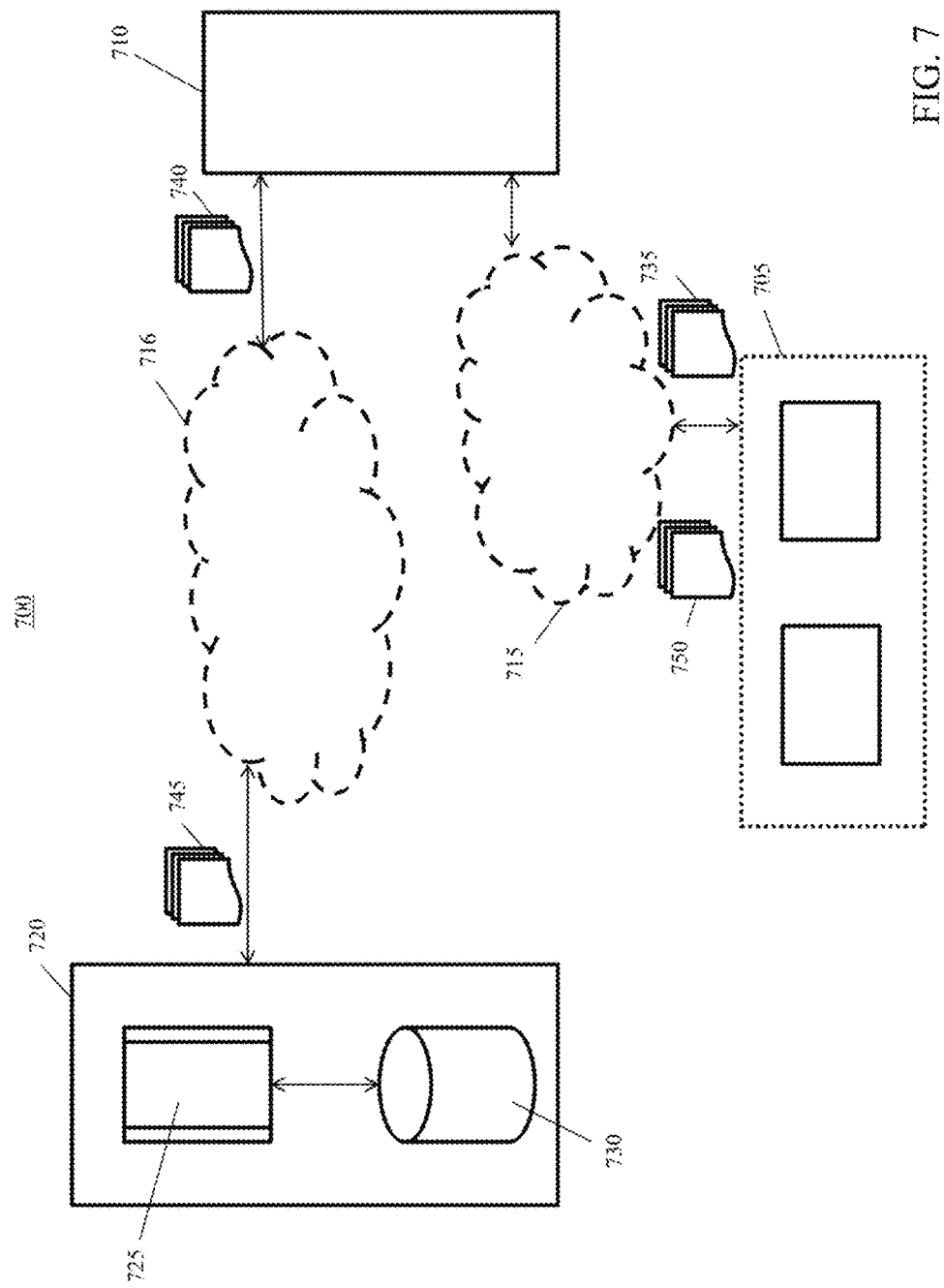
FIG. 7 illustrates an exemplary client-server topology for enabling an information providing/retrieval service.

In accordance with an embodiment, an information providing/retrieval service is enabled on a client-server topology 700, as illustrated in FIG. 7. It should, however, be appreciated that other configurations such as, for example, peer-to-peer, distributed computing and/or cloud based network systems are equally enabling on private, public and/or hybrid network infrastructures. A user of such information providing/retrieval service accesses computers providing the information service via networks from various computers or terminals. In the following description, the computer or terminal operated by the user will be called a client computer, and the computer for providing information service will be called a server computer or DB server. To access the information providing service, the user uses dedicated software or a web browser on the client computer. On the other hand, data management and retrieval on the server computer for providing information service are typically performed by a database management system (herein below, called a DBMS).

Referring now to FIG. 7, a plurality of client computers 705 are connected to a third party server 710 via a network 715. The third party server 710 is connected to a DB server 720 via a network 716. The networks 715, 716 may be, for example, the Ethernet, a local area network (LAN) connected via an optical fiber or FDDI, or a wide area network (WAN) including the Internet. A data management and retrieval system 725 which operates for information providing service, in communication with a database 730, on the DB server 720 may take the form of a general database management system (DBMS) such as, for example, Oracle 8 of Oracle Corporation, or DB2 of IBM Corporation.

Although the networks 715, 716 are independent of each other in this example, they may be a single network. Although two client computers 705 are connected to the third party server 710, the number of client computers is arbitrary. The number of third party servers connected to the networks 715, 716 is also arbitrary. In an embodiment, in consideration of a case where the client computers 705 cannot have enough/requisite processing capability due to limitation of storage capacity, calculation capability, or battery capability like in a small portable terminal, PDA, smart phone, an ATM machine/dispenser—the third party server 710 is disposed between the client computers 705 and the DB server 720. In alternate embodiments, the third party server 710 is a trusted third party that issues UHE based public/private keys for encrypting information stored in the database 730 and ensures that all accesses/queries by client computers 705 as well as retrieval results from the DB server 720 are encrypted. In various embodiments, a part or all of the functions of the third party server 710 may be provided for by the client computers 705.

Figure 8:
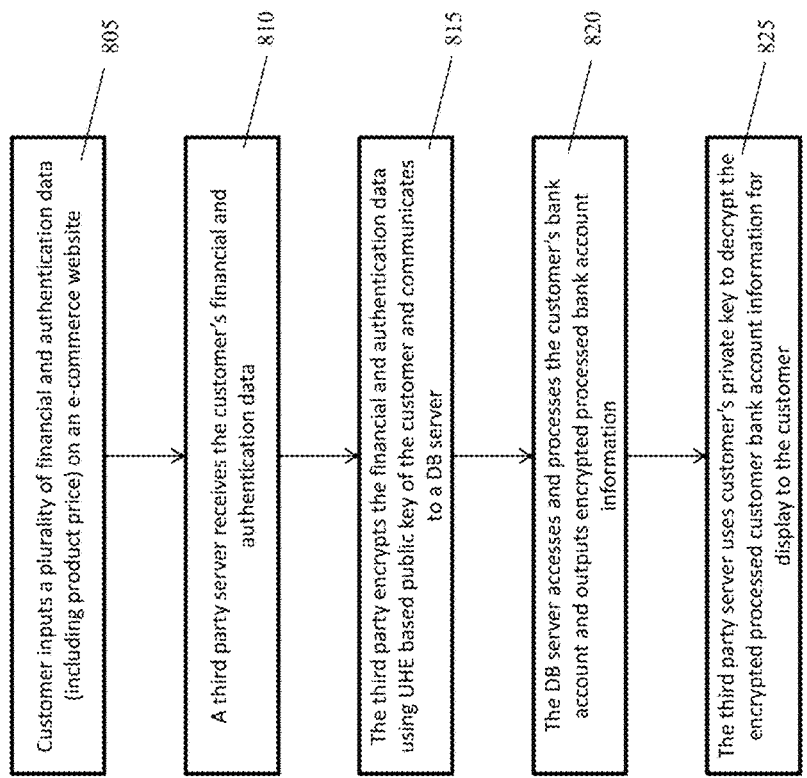
FIG. 8 is a flowchart illustrating a plurality of exemplary steps of a method of securely accessing, querying and processing a customer's bank account with reference to an e-commerce transaction.

FIG. 8 is a flowchart illustrating a plurality of exemplary steps of a method of securely accessing, querying and processing a customer's bank account with reference to an e-commerce transaction. Referring now to FIGS. 7 and 8, one of the client computers 705 represents a customer who is buying a product at a price from an online retail store, for example. In order to complete the purchase, the customer may input, at step 805, a plurality of financial data 735 such as his debit card number and other authentication information, such as a transaction password, on the online retailer's website with reference to the product price amount. On clicking a 'purchase' button on the retailer's website, in an embodiment, the financial data 735 is received, at step 810, by the third party server 710 via network 715. At step 815, the third party server 710 uses the customer's public key based on the FHE/UHE method of the present invention to encrypt the financial data 735 and communicate encrypted financial data 740 to the DB server 720 via network 716. In an embodiment, the encrypted financial data 740 is in the form of a database query including at least one comparative condition and a computation condition. For example, comparative conditions may comprise operations (such as an "=" operation) to verify/authenticate the encrypted debit card number and authentication information with the encrypted credentials of the customer residing in the database 730. Similarly, an example of a computation condition may comprise a debit or subtraction operation causing the encrypted product price amount to be subtracted/debited from the encrypted balance of the customer in the database 730. At step 820, on receiving the encrypted financial data 740 at the DB server 720 (in the form of the database query), the DBMS 725 accesses the customer's encrypted accounts stored in the database 730, authenticates the customer's credentials vis-à-vis encrypted financial data 740 and processes the customer's account balance to reflect a debit in response to the purchased product price without the need to decrypt the encrypted financial data 740 or the encrypted bank account information of the customer stored on the database 730. In an embodiment, the customer's updated (as a result of the debit by an amount equal to the purchased product price) encrypted account balance 745 is communicated back to the third party server 710 that decrypts the encrypted account balance 745, at step 825, using the customer's private key before displaying the decrypted account balance 750 to the customer on the client computer 705.

Persons of ordinary skill in the art should appreciate that while in the e-commerce embodiment of FIG. 8 the customer's financial data 735 is encrypted by the third party server 710, in an alternate embodiment encompassing a debit card transaction through an ATM terminal a part of the financial data 735 may already reside in encrypted form on the debit card. For example, the debit card number, customer ID, bank, branch and PIN may already be stored in encrypted format on the customer's debit card using the customer's private key.

Figure 9:
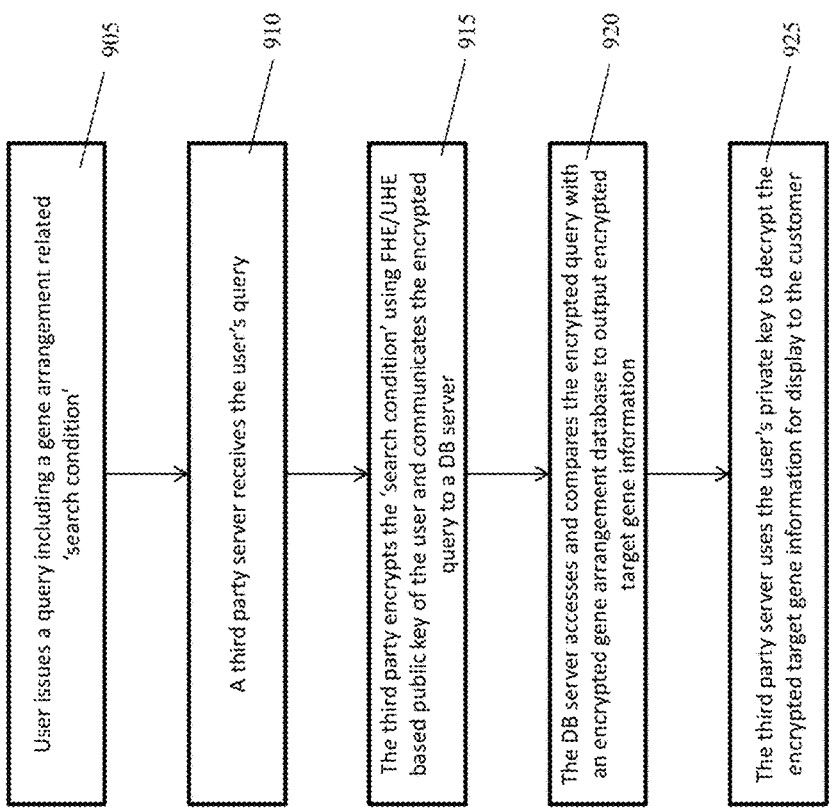
FIG. 9 is a flowchart illustrating a plurality of exemplary steps of a method of securely accessing, querying and processing a search.

FIG. 9 is a flowchart illustrating a plurality of exemplary steps of a method of securely accessing and querying a gene arrangement information retrieval database. Referring now to FIGS. 7 and 9, one of the client computers 705 represent a user who is querying gene arrangement information stored within the database 730. It should be appreciated that the gene arrangement information may be stored in encrypted from in the database 730, in accordance with an embodiment. At step 905, the user issues a query 735 including a 'search condition' that delineates a gene arrangement structure and related information to be accessed. The query 735 may be constructed using a custom gene information retrieval web interface, in accordance with an embodiment, through one of the client computers 705. At step 910, the query is received by the third party server 710 via network 715. At step 915, the third party server 710 uses the user's public key based on the UHE method of the present invention to encrypt the 'search condition' 735 and communicates encrypted query 740 to the DB server 720 via network 716. At step 920, on receiving the encrypted query 740 at the DB server 720, the DBMS 725 compares the encrypted 'search condition' of the encrypted query 740 with encrypted gene arrangement information stored within database 730 and retrieves encrypted target gene information 745 corresponding to the requested encrypted 'search condition'. Thus, searching and comparison of gene arrangement information is conducted without the need to decrypt the encrypted gene information within the database 730 or the encrypted query 740. The encrypted target gene information 745 is communicated back to the third party server 710 that decrypts the encrypted target gene information 745, at step 925, using the user's private key before displaying the decrypted target gene information 750 to the user on the client computer 705.

The FHE/UHE method of the present specification, in a yet another non-limiting application, enables search engine queries where the search engine responds to a query without knowledge of the query, i.e., a search engine can provide an encrypted answer to an encrypted (Boolean) query without knowing what the query was. It also enables searching on encrypted data; one can store encrypted data on a remote server and later have the server retrieve only files that (when decrypted) satisfy some Boolean constraint, even though the server cannot decrypt the files on its own. A user is provided with an encryption module on his or her client device which is adapted to perform the requisite encryption of the search and send the encrypted search request to a server. In response, the server performs a series of FHE/UHE functions on it, including multiplication and addition in the form of string concatenation operations, to generate a FHE/UHE output that is sent back to the encryption module on the client device, which, in turn, decrypts the FHE/UHE output and displays the result via a browser.

Figure 11:
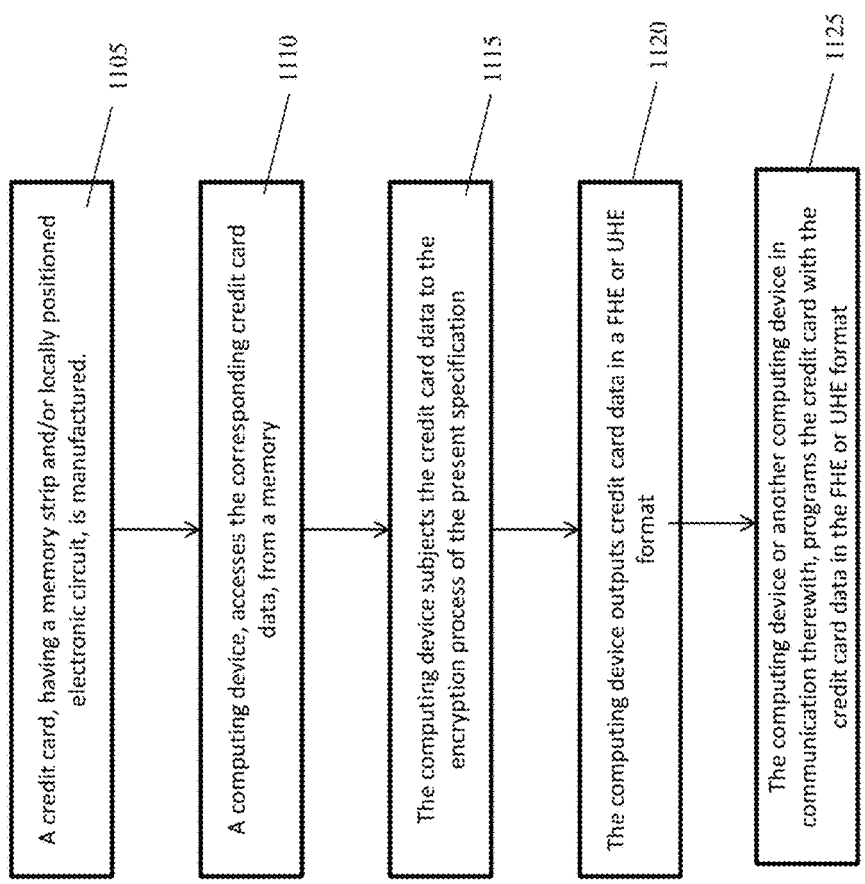
FIG. 11 is a flowchart illustrating a method of manufacturing a credit card using the encryption processes disclosed herein.

In another embodiment, the disclosed homomorphic encryption system is used to secure credit card or other financial data. Referring to FIG. 11, a credit card is first manufactured with the credit card data stored locally in the credit card in a homomorphic encryption format. A credit card, having a memory strip and/or locally positioned electronic circuit, is manufactured in step 1105. A computing device, comprising a processor executing a plurality of programmatic instructions stored in memory, accesses, in step 1110, the corresponding programmed credit card data, including the user's name, credit card number, expiration date, CCV code, and other codes and/or biometric data, from a memory. The computing device subjects, in step 1115, the credit card data to the encryption process described above and, as a result thereof, outputs, in step 1120, credit card data in a FHE or UHE format. The computing device or another computing device in communication therewith, programs, in step 1125, the credit card with the credit card data in the FHE or UHE format. In an embodiment, the amount of memory occupied by the credit card data in the FHE or UHE format does not exceed 4 times $n \log(n)$, where n is the length of plaintext credit card data in bits. In an embodiment, the amount of memory occupied by the credit card data in the FHE or UHE format does not exceed $n \log(n)$, where n is the length of plaintext credit card data in bits.

Figure 12:
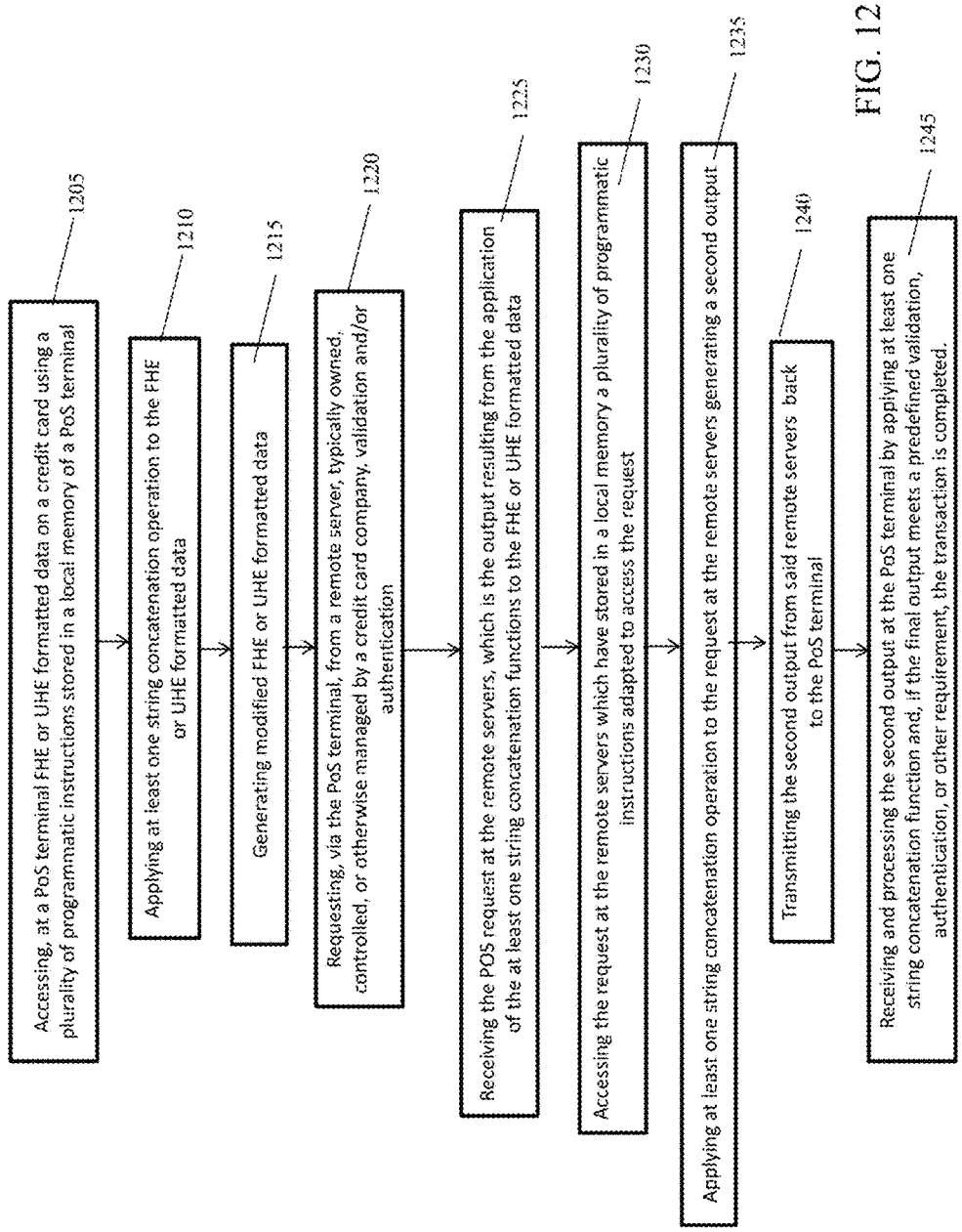
FIG. 12 is a flowchart illustrating a method of using a credit card using the encryption processes disclosed herein.

Referring to FIG. 12, the credit card with credit card data in the FHE or UHE format is used at a point of sale (PoS) terminal. The PoS terminal has stored in a local memory a plurality of programmatic instructions adapted to access, in step 1205, the FHE or UHE formatted data on the card and apply to the FHE or UHE formatted data at least one string concatenation operation, as described above. The at least one string concatenation operation is the mathematical equivalent to applying a multiplication and/or addition operation to the plaintext credit card data. After applying, in step 1210, at least one string concatenation operation to the FHE or UHE formatted data and generating, in step 1215, modified FHE or UHE formatted data, the PoS then sends a request, in step 1220, which is derived from or a function of the modified FHE or UHE formatted data, to a remote server, typically owned, controlled, or otherwise managed by a credit card company, for validation and/or authentication. In an embodiment, the transmission of a request derived from or a function of the modified FHE or UHE formatted data would require bandwidth or a memory allocation that is no greater than 4 time $n \log(n)$, wherein n is the number of bits of the plaintext data. The remote servers receive the POS request, in step 1225, which is the output resulting from the application of the at least one string concatenation functions to the FHE or UHE formatted data (modified FHE or UHE formatted data). The remote servers have stored in a local memory a plurality of programmatic instructions adapted to access, in step 1230, the request (which is in a FHE or UHE format) and apply to the request, in step 1235, at least one string concatenation operation. The at least one string concatenation operation is the mathematical equivalent to applying a multiplication and/or addition operation to the plaintext version of the data. As a result of applying the at least one string concatenation operation, the servers generate a second output, still in a FHE or UHE format, which is then transmitted back to the PoS terminal in step 1240. The PoS terminal receives and subsequently processes the second output by applying, in step 1245, at least one string concatenation function and, if the final output meets a predefined validation, authentication, or other requirement, the transaction is completed. The transaction is completed but at no time were the plaintext credit card data exposed.

Figure 13:
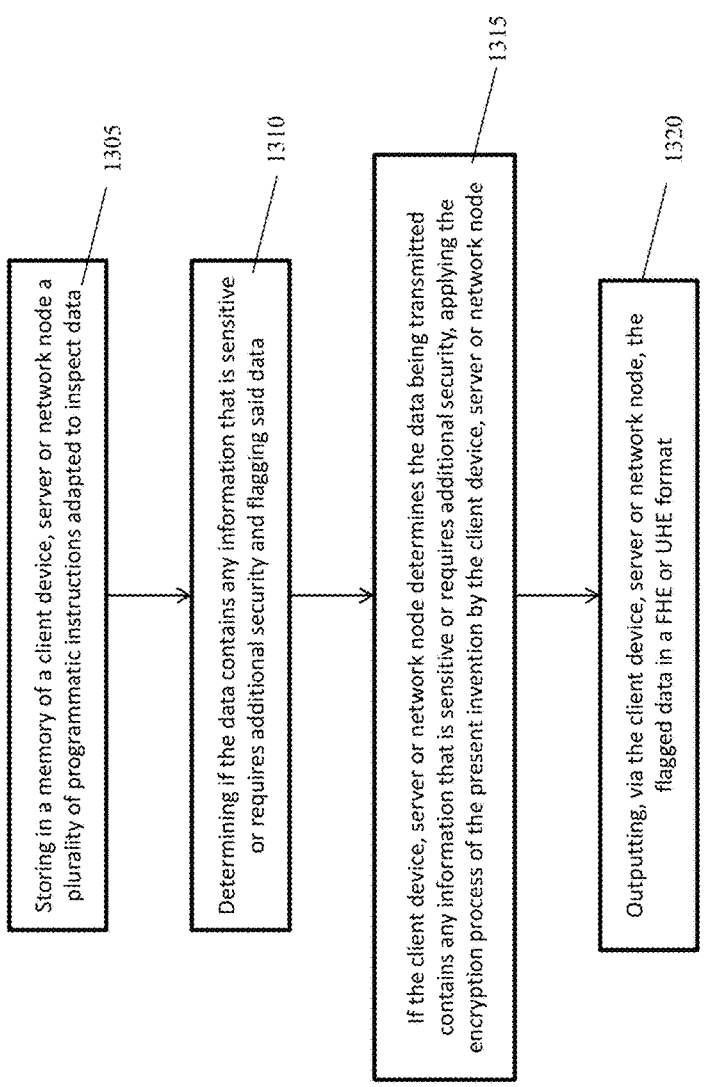
FIG. 13 is a flowchart illustrating a method of performing homomorphic filtering using the encryption processes disclosed herein.

In another embodiment, the FHE and UHE encryption system can be used to protect an enterprise, a device or an application using homomorphic filtering. This filter would inspect traffic going in and the traffic going out and encrypt all unprotected, yet sensitive, information. This type of filter allows information that the filter deems non-sensitive to go in or out without any changes. However, any information that the filter deems sensitive will have to be FHE or UHE protected or any information that is going in will have to be FHE or UHE protected. Referring to FIG. 13 in an embodiment, the disclosed FHE or UHE system is implemented in a server or network node to inspect data flowing in and out of a network, determine if any of that data requires a greater level of security, and, if so, apply a FHE or UHE encryption format to only the sensitive data portions, or reject the message and require the sending to first apply a FHE or UHE encryption format and resend. A client device, server or network node has stored, in step 1305, in a memory a plurality of programmatic instructions adapted to inspect data, contained in a message, to determine, in step 1310, if the data contains any information that is sensitive or requires additional security. If the client device, server or network node determines the data being transmitted contains any information that is sensitive or requires additional security, the client device, server or network node applies, in step 1315, the encryption process described above and, as a result thereof, outputs, in step 1320, the flagged data in a FHE or UHE format. The client device, server or network node comprises a processor executing a plurality of programmatic instructions stored in memory for applying the FHE or UHE encryption process described herein.

In another embodiment, the FHE and UHE encryption system can be used to protect distributed public ledgers. Distributed public ledgers, such as the blockchain, are becoming increasingly important. However, these ledgers are unprotected while they are being used. These ledgers can contain sensitive information such as financial records, contractual terms, payment records and much more. The FHE/UHE encryption system can ensure complete security of such information in a public platform like the blockchain. Blockchain today uses public/private keying for security. With homomorphic encryption, the whole blockchain can always be encrypted and still be accessible to be used by people with appropriate credentials. Also, the power usage of the blockchain can be dramatically reduced because the FHE/UHE information with appropriate permissions and credentials can be used instead of expensive hashing.

In another embodiment, one of the most interesting applications of homomorphic encryption is its use in protection of mobile agents. Since all conventional computer architectures are based on binary strings and only require multiplication and addition, such homomorphic cryptosystems would offer the possibility to encrypt a whole program so that it is still executable. Hence, it could be used to protect mobile agents against malicious hosts by encrypting them. The protection of mobile agents by homomorphic encryption can be used in two ways: (i) computing with encrypted functions and (ii) computing with encrypted data. Computation with encrypted functions is a special case of protection of mobile agents. In such scenarios, a secret function is publicly evaluated in such a way that the function remains secret. Using homomorphic cryptosystems the encrypted function can be evaluated which guarantees its privacy. Homomorphic schemes also work on encrypted data to compute publicly while maintaining the privacy of the secret data. This can be done encrypting the data in advance and then exploiting the homomorphic property to compute with encrypted data.

In another embodiment, in multiparty computation schemes, several parties are interested in computing a common, public function on their inputs while keeping their individual inputs private. This problem belongs to the area of computing with encrypted data. Usually in multiparty computation protocols, we have a set of n>1 players whereas in computing with encrypted data scenarios n=2. Furthermore, in multi-party computation protocols, the function that should be computed is publicly known, whereas in the area of computing with encrypted data it is a private input of one party.

In another embodiment, in-network data aggregation in WSNs is a technique that combines partial results at the intermediate nodes en route to the base station (i.e., the node issuing the query), thereby reducing the communication overhead and optimizing the bandwidth utilization in the wireless links. However, this technique raises privacy and security issues if the sensor nodes which need to share their data with the aggregator node. In applications such as healthcare and military surveillance where the sensitivity of private data of the sensor is very high, the aggregation has to be carried out in a privacy-preserving way, so that the sensitive data are not revealed to the aggregator. Prior art schemes for additive data aggregation functions are not generic and cannot be applied for multiplicative aggregation function. Homomorphic encryption schemes can be applied to protect privacy of input data while computing an arbitrary aggregation function in a wireless sensor network.

In another embodiment, messaging applications on mobile client devices can implement the disclosed encryption processes to encrypt plaintext data and transmit it to a third party. While such encrypted messaging exists, the disadvantage is that intermediate servers who receive or route the traffic are unable to inspect the messages for viruses, advertising related information, spam, or other content. In an embodiment, the disclosed FHE or UHE system is implemented in a client device to encrypt a message. The encrypted message is sent from the client device through a network to a destination client device. As the encrypted message passes through the network, intermediate servers apply string concatenation operations on the encrypted messages to and examine the output to determine if the encrypted message has viruses or other undesirable content. The output is further examined to extract relevant data in order to potentially assess the type, scope, and extent of content being delivered over a network, thereby enabling improved reporting and tailored advertising.

In another embodiment, the present FHE/UHE system can be used to functionally embed digital watermarking and fingerprinting data elements into digital data. The homomorphic property is used to add a mark to previously encrypted data. In general, watermarks are used to identify the owner/seller of digital goods to ensure the copyright. In fingerprinting schemes, the person who buys the data should be identifiable by the merchant to ensure that data is not illegally redistributed. Similar to the digital watermarking and fingerprinting schemes, a file and user authentication mechanism can also be built along similar lines by embedding a unique homomorphically encrypted digital signature into digital data. The signature can be retinal scans, fingerprints, voice sample or any such unique marks. The file is then authenticated using the sample of the signature from the user before allowing access to it.

In current data storage systems, the sharing of data is an irreversible process. Once the data is transferred, there is no way to reverse such transfer or limit the use of such data. Further, the information shared among a group of users on currently available data storage systems such as a shared folder on a network such as a Google drive or Dropbox does not offer much data privacy to users. The entire raw data available on such databases is accessible to all the users who are authorized to run any computations or edit such raw data. A group of users can keep their files cryptographically scrambled using a secret key which is only accessible to such users and in such a case it is highly possible that no hacker will have the code-breaking resources necessary to crack them, but, as soon as any of these users would want to actually do something with those files such as editing a word document or querying a database of financial data, he or she will have to unlock the data and leave it vulnerable. That is a very serious problem with data storage and sharing services today.

In an embodiment, the present specification discloses a shared data storage system in which any of the authorized users of that storage system can store raw data in an encrypted format and the other users can access such raw data to run computations on the same without having any access to the original raw data. In an embodiment, a user can encrypt the raw data through a private key which is not shared with any other user and stores the resulting encrypted data on the shared database system disclosed in this specification. Any other user who has the right to access that database can access the encrypted raw data to run computations on the same and see the output results by decrypting the same using a public key. However, no other user apart from the owner/creator of data can see the original raw data. In an embodiment, the present specification discloses a shared storage, sharing and multiple party processing service wherein the entire data is always private. In an embodiment, the system disclosed in the present specification is similar to a Dropbox or a Google drive however with additional security features such that the users can store their data in an encrypted format and yet allow other users to access the data to run computations on such data. For example, a group of people can provide access to their salary through a shared database system, and can together compute the average wage of the group. Each participant learns his relative position in the group, but learns nothing about other members' salaries.

In an embodiment, the data is encrypted through a FHE/UHE encryption method disclosed in this specification before storing the same in the shared data storage system. The FHE/UHE scheme of the present specification enables storage and computation of private data without decrypting the data. In an embodiment, the system uses the UHE encryption method disclosed in this specification to encrypt sensitive data during uploading of data such that the secret key used to encrypt the data is retained by the user and is not shared with any other user. As the UHE encryption system is fully homomorphic and the cost of processing encrypted data in a UHE system is similar to the cost of processing unencrypted, plaintext data, it can be used to efficiently store and process sensitive information without ever having to expose it. Further, as the UHE encryption system is completely scalable, applications requiring heavy processing can also be easily serviced.

In an embodiment of the present specification, a shared storage, sharing and multiple party processing service is described wherein a certain amount of storage along with private sharing and multi-party private processing of data is allowed for free, but usage beyond that is charged based on a formula. In an embodiment, the usage is charged based on a formula that takes both amount of data and amount and type of processing required into account.

Figure 14:
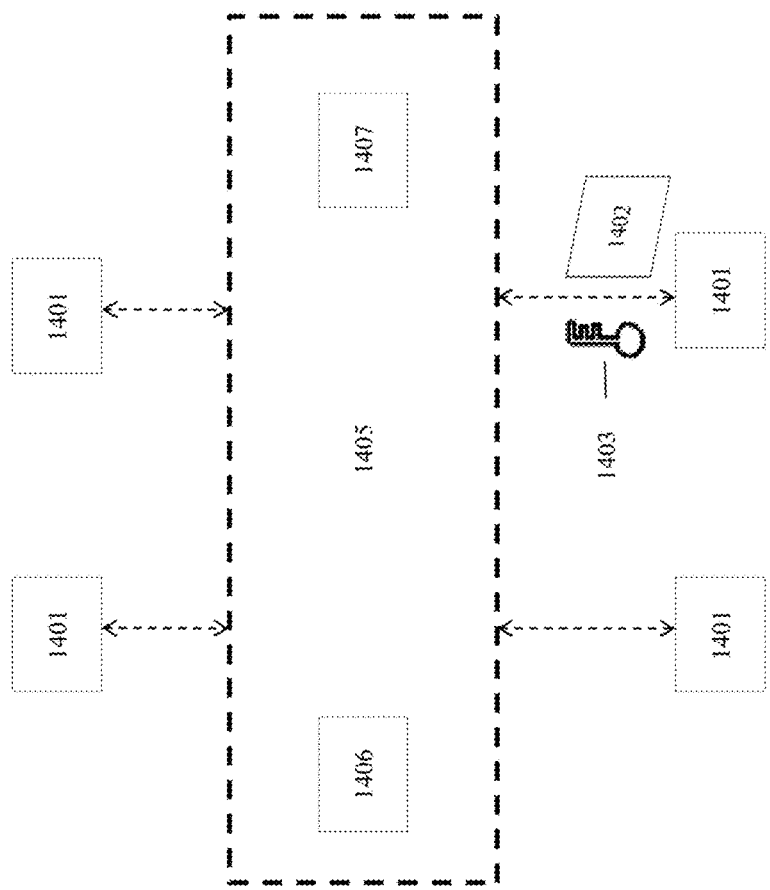
FIG. 14 is an illustration of a shared data storage system in accordance with an embodiment of the present specification.

FIG. 14 describes a shared data storage system in accordance with an embodiment of the present specification. As shown in FIG. 14, a server device 1405 is in communication with multiple client devices 1401. In embodiments, the client device 1401 is a typical computing device such as a personal computer, tablet or a mobile device that has the data processing and data communication capabilities. In various embodiments, the server device 1405 acts as the shared database and comprises one or more memory devices 1406 and one or more processing units 1407 which physically or logically reside within a single location or organization, or may be distributed. In an embodiment, the various client devices are connected to an Ethernet or local area network. In another embodiment, the various client devices are located at remote locations and communicate with the server 1405 through a public network such as Internet. In an embodiment, the various client devices 1401 are configured to store data on the memory 1406 present in the server 1405.

In an embodiment, the server 1405 is configured such that all the shared data stored on the memory 1406 is in an encrypted format. In an embodiment, the data is encrypted by the client device 1401 using a private key 1403 before uploading the same to the shared database present on the server 1405. The data 1402 represent the user's data being uploaded in encrypted format to the server 1405. In various embodiments, the encrypted data 1402 may be streamed in real time or uploaded in batches to the server or shared database 1405. Once the data is stored in the shared database 1405, using an implementation of the FHE/UHE system of the present specification, any of the client devices 1401 can access such data to perform a plurality of computations/operations on the uploaded encrypted data without decrypting the data itself. The output of such computations is then decrypted by the corresponding client device 1401 through a public key to access the results of such computations.

In an alternate embodiment, the server 1405 is configured such that the data encryption and decryption is performed at the server 1405 such that the client devices 1401 transmit plaintext unencrypted data to the server 1405. The server 1405, through the help of processor 1407 encrypts this plain text data before storing the same on the memory 1406. Subsequently, on receiving request from any client device 1401 to perform any computation or operation on the encrypted data, the server 1405 performs such computation on the encrypted data stored on the memory device 1406 to generate the output data in an encrypted format. The server 1405 then decrypts the encrypted output data to produce the output data in a plaintext format which is then transferred to the corresponding client device 1401.

Figure 15:
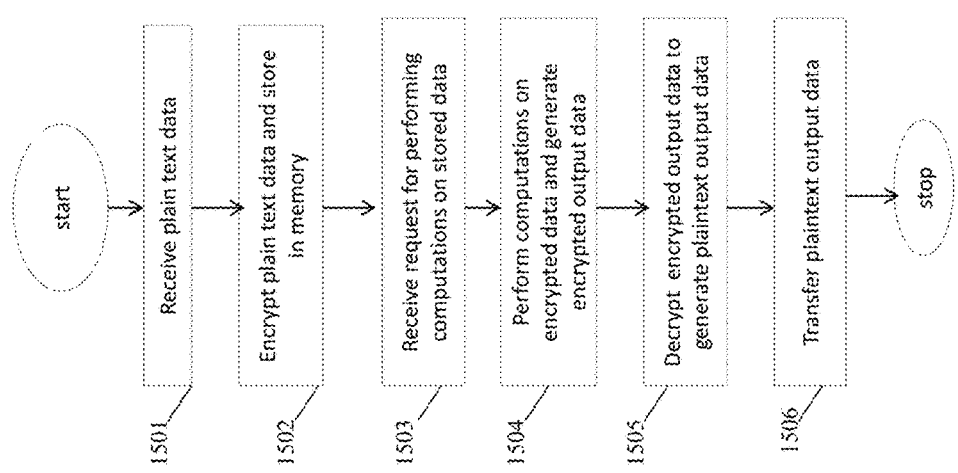
FIG. 15 shows a flowchart depicting the process followed in the shared database system wherein the data encryption and data decryption are performed on the server.

FIG. 15 shows a flowchart depicting the process followed in the shared database system wherein the data encryption and data decryption are performed on the server. As shown in FIG. 15, at step 1501, the plain text data is received by the server device. In an embodiment, the plaintext data is received from a client device and in an alternate embodiment, the plaintext data is not received from a client device but is directly stored in the server. At step 1502, the plaintext data is encrypted and is subsequently stored in a memory device. In an embodiment, the plaintext data is encrypted through a UHE encryption format disclosed in various embodiments of the present specification. At step 1503, the shared database system receives a request from a client device to perform certain computations or operations on the data stored in the system. At step 1504, the system performs the required computations or operations on the encrypted data and generates the output data which is also in an encrypted format. At step 1505, the system decrypts the encrypted output data to generate plaintext output data and in step 1506, the system transfers the final plaintext output data to the corresponding client device which requested for performing the computations on the data.

Figure 16:
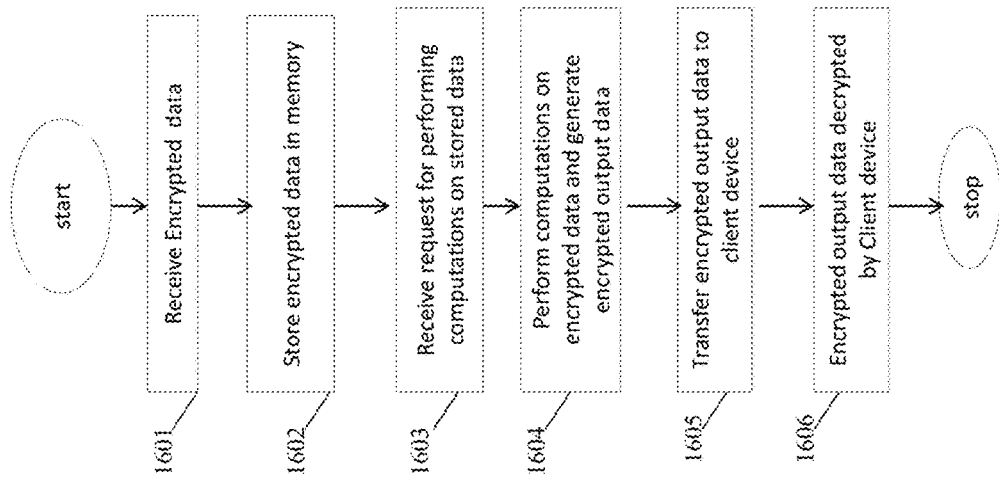
FIG. 16 shows a flowchart depicting the process followed in the shared database system wherein the data encryption and data decryption are not performed on the server.

FIG. 16 shows a flowchart depicting the process followed in the shared database system wherein the data encryption and data decryption are not performed on the server. As shown in FIG. 16, at step 1601, the encrypted data is received by the server device. At step 1602, the encrypted data is stored in a memory device. In an embodiment, the encrypted data is received from a client device which encrypts the data before transferring it to the server device and in an alternate embodiment, the encrypted data is not received from a client device but is directly stored in the server. In an embodiment, the plaintext data is encrypted through a UHE encryption format disclosed in various embodiments of the present specification. At step 1603, the shared database system receives a request from a client device to perform certain computations or operations on the data stored in the system. At step 1604, the system performs the required computations or operations on the encrypted data and generates the output data which is also in an encrypted format. At step 1605, the system transfers the encrypted output data to the corresponding client device which requested for performing the computations on the data. In embodiments, at step 1606, the corresponding client device then decrypts the output data to see the results of the computations.

In an embodiment, the shared data storage system of the present specification is referenced as "Dark Pool" as the original raw data stored in this data storage system is always in an encrypted format and cannot be accessed by any user except the original owner/creator of that data.

There can be multiple practical applications of the shared encrypted storage system described in this specification. In an embodiment, the shared data storage system of the present specification is used to provide a data marketplace in which confidential data can be stored in an encrypted format such that subscribers to that data marketplace can run computations on that data without accessing the original raw data. In an embodiment, a data marketplace comprising genomic information related to various patients is created and various subscribers such as a pharmaceutical company looking for patients for clinical trials are allowed to scan this genomic database for candidates. The information related to all the patients is stored in an encrypted format such as the universal homomorphic encryption format disclosed in the present specification. In case the genomic data of any patient matches with the clinical trial requirements, the subscriber (pharmaceutical company in this case) is provided information about the corresponding patient. However, the subscriber is not provided access to the raw genomic data of all the patients. The above confidential data marketplace structure eliminates tremendous amount of friction among various stakeholders and has the potential to lower the cost of customer acquisition for subscribers.

In an embodiment, the shared encrypted data storage system of the present specification can be used by businesses to create a secure backend comprising confidential data. Today, companies are required to store various types of confidential data such as the customer data on their remote and local machines to provide personalized services, match individual preferences, target advertisements and offers. However, providing access of such confidential data to all the employees or other stakeholders accessing such remote and local machines makes the data highly vulnerable and a lot of times such confidential data is compromised. The shared data storage system of the present specification alleviates this problem by storing the data in an encrypted format and only providing restricted access to users wherein the users can run computations on such data or can query the database for specific information but they cannot access the backend database.

In an embodiment, the shared data storage system or the "Dark Pool" disclosed in the present specification can be used by companies to protect their data and trade secrets from corporate espionage or stealing by rogue employees. In an embodiment, the companies can create internal compartmentalization wherein the data is stored in an encrypted format in shared databases. The employees are still allowed to use and analyze data for the benefit of the organization but they are not allowed to access the original raw data. Such a system could enhance the productivity of the organization as more number of people can be provided access to such a secure database.

In an embodiment, the shared data storage system or the "Dark Pool" disclosed in the present specification can be used to enable blind e-voting by voters. Voting on any subject such as political election or a company board meeting can be conducted without exposing anything besides the final outcome. In an embodiment, the data related to individual votes is stored in an encrypted format such as the universal homomorphic encryption format disclosed in the present specification in a shared database and the agency which is coordinating the voting is allowed to only run computations on that data to calculate the final outcome without having any access to the original individual votes. Not only is the privacy of each voter is maintained, even the actual vote count can remain private.

In an embodiment, the shared data storage system or the "Dark Pool" disclosed in the present specification can be used to authenticate and securely store identities of people in a fully anonymous way which can be used for various applications. In an embodiment, a user shares her personal information for authentication which is stored in a "Dark Pool" in an encrypted format and when the user logs in, an authenticating private contact is executed to validate the user and link her real identity with her public pseudo identity.

In an embodiment, the shared data storage system or the "Dark Pool" disclosed in the present specification is used to securely store the data collected by various IOT (Internet of Things) devices such that the original raw data is stored in an encrypted format such as the universal homomorphic encryption format disclosed in the present specification. Various devices or applications using inputs from such IOT devices can access specific data elements or run computations on such data through such a shared database but cannot access the complete original raw data.

In an embodiment, the shared data storage system or the "Dark Pool" disclosed in the present specification can be used for multi factor authentication of people. Confidential authentication data such as voice samples and fingerprints is stored in an encrypted format on a shared database which cannot be accessed by anyone. Only the user can access his personal data or authorized third parties are allowed access to scan this database by providing them the additional decryption keys.

In an embodiment, the shared data storage system or the "Dark Pool" disclosed in the present specification can be used to provide distributed personal data stores wherein data is stored in an encrypted format such that it can be shared with third parties while maintaining complete control and ownership. Specific policies are created for each data store so that the subscribers can run specific allowed computations on the data stored in such data store without having any access to the original raw data.

In an embodiment, the shared data storage system or the "Dark Pool" disclosed in the present specification can be used to build and support a secure, scalable Big Data processing and analytics system. Big Data refers to massive volumes of data, of the order of terabytes to petabyte scale, distributed over a myriad of storages. The data is generated, stored, and owned by a large number of disparate entities such as individuals, and institutions/organizations—private and public. These entities are unwilling to share data as there is an element of sensitivity and/or privacy attached to most of the data. As a result, sharing of data as well as access to data is limited and therefore actionable insights or analytics, resulting from processing such limited data, often lack comprehensiveness.

In accordance with an aspect, to promote sharing of and access to large volumes of data, the original raw data from these disparate entities is stored in the shared data storage system or Dark Pool of the present specification in encrypted format that cannot be accessed by any user except the original owner of that data. In embodiments, the data may include structured proprietary data, isolated encrypted private data and semi-structured or unstructured plain text public data.

In accordance with another aspect, the present specification discloses a Dark Pool technology stack and framework that enables building and implementation of secured and scalable Big Data analytics applications using distributed computing, networking and storage resources that may be available locally or rented from a cloud infrastructure. The Dark Pool technology stack enables keeping individual databases and data warehouses completely isolated from one another while different datasets, from these databases and data warehouses, are simultaneously analyzed. Thus, Big Data analytics built on Dark Pool technology stack, architecture or framework enables blind data processing that allows for complete data security.

In accordance with yet another aspect, the present specification discloses a framework, architecture or technology stack for supporting data management solutions that surpass traditional data warehousing systems to implement Big Data analytics for applications such as, but not limited to, risk modeling (for example, running stochastic algorithms and implementing collocation methods for numerical solution of ordinary differential equations, partial differential equations and integral equations), fraud prevention and detection (for example, analyzing current and historical customer transaction data from a multitude of sources to detect fraud patterns or opportunities during a lifetime cycle of a customer, and implementing methods related to recognition of patterns and regularities in data), and predictive analytics (for example, analyzing time series data to extract meaningful statistics and predict future values based on previously observed values, performing pattern matching, and performing analysis based on methods such as Discrete Fourier Transform, Singular Value Decomposition, Discrete Wavelet Transform).

Figure 20:
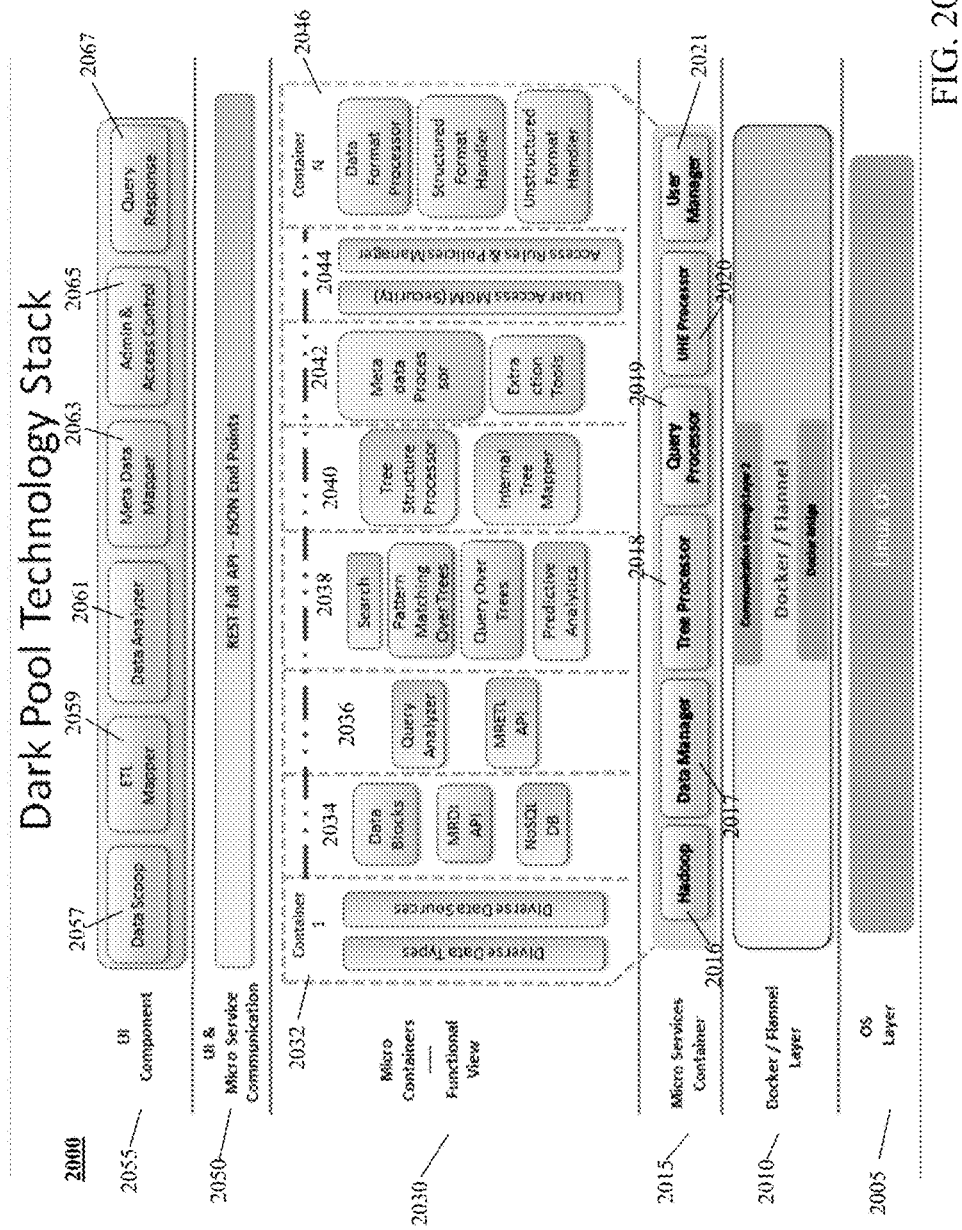
FIG. 20 is a "Dark Pool" technology stack for implementing secured Big Data analytics solutions, in accordance with an embodiment of the present specification.

FIG. 20 is a block diagram illustration of a technology stack, architecture or framework for building and implementing Big Data processing and analytics applications based on shared data storage system or "Dark Pool", in accordance with an embodiment of the present specification.

As shown in FIG. 20, the stack 2000 comprises a first layer 2005 which is an Operating System (OS) layer to manage various underlying computing hardware and software resources. The OS layer 2005 may be implemented using any multi-tasking, multi-user distributed system software known in the art such as Microsoft Windows, macOS by Apple or Linux. In a preferred embodiment, the OS layer 2005 implements the Linux operating system.

The second layer 2010 provides operating system-level virtualization using a software container architecture or platform such as the Docker system or Linux Containers, for example. A container is a lightweight, stand-alone, executable package of a piece of software that includes everything needed to run it: code, runtime, system tools, system libraries, settings such that containerized software will always run the same, regardless of the environment. As known to persons skilled in the art, containers are an abstraction that packages code and dependencies together. Thus, multiple containers can run on the same machine and share the OS kernel (of the first layer 2005) with other containers, each running as isolated processes. In embodiments, the second layer 2010 also implements Flannel based virtual overlay network for use with Docker containers. Flannel implements a virtual network that attaches IP addresses to containers for container-to-container communication.

The third layer 2015 supports a plurality of containerized micro-services such as Hadoop 2016, Data Manager 2017, Tree (Data Structure) Processor 2018, Query Processor 2019, UHE Processor 2020 and User Manager 2021. The fourth layer 2030 illustrates a functional view of a plurality of containers related to the plurality of micro-services of the third layer 2015. The Hadoop 2016 is a MapReduce framework used for distributed storage and processing of very large datasets (of the "Dark Pool") on computer clusters built from commodity hardware. Hadoop utilizes a distributed, scalable, portable file system, called Hadoop Distributed File System (HDFS), to distribute massive amounts of data among data nodes in a Hadoop cluster. To reduce an adverse impact of a data node power outage or network failure, data in an HDFS is typically replicated on different data nodes. In some embodiments, the third layer 2015 also supports (in addition to Hadoop) cluster-computing frameworks such as the Apache Spark which is an in-memory engine for processing large scale datasets (such as the "Dark Pool"). The Data Manager micro-service 2017 is related to organization, administration and governance of large volumes of structured as well as semi-structured and unstructured data such as machine logs, text documents and media frames. In various embodiments, a first container 2032 encapsulates diverse data types and sources, a second container 2034 encapsulates data blocks, MRDI application programming interfaces (API) and NoSQL databases, whereas a third container 2036 encapsulates query analysis and MRETL API. In embodiments, the first, second and third containers 2032, 2034, 2036 are associated with the Hadoop 2016 and Data Manager 2017 micro-services.

The Tree and Query Processor micro-services 2018, 2019 are associated with fourth, fifth and sixth containers 2038, 2040, 2042. The fourth container 2038 encapsulates services and applications such as pattern matching over trees, query and search over trees and predictive analytics. The fifth container 2040 packages tree structure processing and internal tree mapping services while the sixth container 2042 packages meta data processing and extraction tools.

The UHE Processor 2020 provides encryption services based on Universal Homomorphic Encryption (UHE) format of the present specification. Finally, the User Manager micro-service 2021 enables seventh and eight containers 2044, 2046. In embodiments, the seventh container 2044 packages services related to user access management as well as managing rules and policies to access "Dark Pool" data. The eighth container 2046 encapsulates services related to data format processing and those related to handling structured and unstructured data formats.

The fifth layer 2050 supports user interfaces and microservice communications using API such as the RESTful (Representational state transfer) API. In embodiments, the fifth layer 2050 also supports processing and querying structured or semi-structured data based on the Java Script Object Notification (JSON) data model. In the JSON data model, data is represented as an array of objects. In various embodiments, the query language for JSON is compiled to a series of MapReduce tasks that may be executed over a Hadoop cloud, for example.

The sixth layer 2055 is the topmost layer that supports a plurality of user interface (UI) components such as Data Scoop 2057, ETL Mapper 2059, Data Analyzer 2061, Meta Data Mapper 2063, Administration and Access Control 2065 and Query Response 2067. The Data Scoop component 2057 provides a command-line interface application for transferring bulk data between Hadoop and structured data stores such as relational databases. The ETL Mapper 2059 performs extract, transform, and load (ETL) functions. The Data Analyzer component 2061 handles processing and analyses on "Dark Pool" data while the Meta Data Mapper 2063 is a metadata mapping utility.

In an embodiment, the shared data storage system or the "Dark Pool" disclosed in the present specification can be used to provide a decentralized private key generation system for a virtual bitcoin wallet. In this embodiment, multiple dark pool nodes or databases locally create a segment of the key, whereas the full key is only ever assembled by the user leaving no trail of the evidence. In an embodiment, the shared data storage system disclosed in the present specification is used to provide a decentralized transaction signing system for a bitcoin wallet. In this embodiment, the transactions can be signed without ever exposing the private key which is stored in an encrypted format on the "Dark Pool". In another embodiment, the system is used to provide a decentralized control system for a bitcoin wallet such that information related to various control elements such as spending limits, required signatures is stored in an encrypted format inaccessible to the hackers.

A blockchain is a distributed database that maintains a continuously-growing list of data records hardened against tampering and revision. It consists of data structure blocks which hold exclusively data in initial blockchain implementations, and both data and programs in some of the more recent implementations with each block holding batches of individual transactions and the results of any blockchain executables. Bitcoin and other blockchains (e.g., Ethereum) promise a new future. Internet applications can now be built with a decentralized architecture, where no single party has absolute power and control. The public nature of the blockchain guarantees transparency over how applications work and leaves an irrefutable record of activities, providing strong incentives for honest behavior. Bitcoin, the currency was the first such application, initiating a new paradigm to the web. However, blockchain is a public ledger. The intense verification and public nature of the blockchain limits potential use cases. Further modern applications use huge amounts of data, and run extensive analysis on that data. This restriction means that only fiduciary code can run on the blockchain. In their current design, blockchains cannot handle privacy at all. Furthermore, they are not well suited for heavy computations. Their public nature means private data would flow through every full node on the blockchain, fully exposed.

In an embodiment, the present specification describes a novel private blockchain system wherein encryption methods such as the UHE encryption format disclosed in the present specification is used to homomorphically encrypt sensitive data within the blockchain. Since UHE is fully homomorphic and the cost of processing encrypted data in UHE is similar to the cost of processing unencrypted, plaintext data, it can be used to efficiently process sensitive information without ever having to expose it. And since UHE is completely scalable, applications requiring heavy processing are not a problem. In an embodiment, one can charge for the ability to process UHE encrypted blockchain data, based on a formula that takes both amount of data and amount and type of processing required.

V. Transforming Partially Homomorphic Conventional Encryption Systems to Fully Homomorphic Encryption Systems In accordance with an aspect, the present specification is directed to an encryption system that applies a Fully Homomorphic Encryption (FHE) format or data transformation to original data that, in various embodiments, may be encrypted data. A FHE system, as disclosed herein, is defined as a system which can successfully, homomorphically apply an unlimited number of subtraction, division, addition and/or multiplication operations to encrypted data to yield second encrypted data, that, when decrypted, yields plaintext data that would have been the same output plaintext data had the same operations been applied to the original input plaintext data.

Partially homomorphic encryption systems may be transformed into fully homomorphic encryption systems that are scalable, rapid in translation speed, difficult to invert or break, capable of enabling various types of public and/or private key generation protocols and semantically secure. Input plaintext data are transformed into modified plaintext data using a prime number operation and the modified plaintext data is then encrypted using any number of conventional encryption schemes. Desired computations on the encrypted data are transformed into homomorphic operations, based on the nature of the encryption format, and the homomorphic operations are applied to yield manipulated encrypted data. The manipulated encrypted data may be decrypted and the decrypted plaintext data may be modified into final, output plaintext data using a similar prime number operation as applied during encryption. The final, output plaintext is equivalent to plaintext data that would have been generated by just applying the desired computations to the input plaintext data.

More specifically, as further detailed below, the claimed systems and methods receive plaintext data into a computer, which can be a single device or a set of networked computing devices comprising at least one processor and a memory. The input plaintext data is first modified into modified plaintext data. The processor performs the modification by obtaining integer representations of the plaintext data and, for each integer, generating a set of prime numbers. The set of prime numbers is generated by first identifying the largest prime number that is 1) on a stored list of predefined prime numbers and 2) less than the integer representation. The list of pre-defined prime numbers may be of any length but is preferably in a range of 128 numbers. The identified prime number is then subtracted from the integer to yield a remainder. The process is then repeated with the remainder, namely a second prime number is identified which is the largest prime number that is 1) on a stored list of predefined prime numbers and 2) less than the remainder. This process is completed until a final number, one, is identified in which case the number one is mapped to a prime number that has not been previously used. The resulting process yields a set of prime numbers which are then multiplied together to yield a modified integer representative of the plaintext data, also referred to as modified plaintext data. Optionally, an additional unused prime number not included within the plurality of prime numbers may be identified for future use.

A conventional encryption system, such as RSA, Goldwasser-Micali, El-Gamal, Benaloh, Paillier, any encryption format which is not homomorphic for both multiplication and addition operations or any encryption format which is not homomorphic for all of division, subtraction, multiplication and addition operations, can then be applied to the modified plaintext data to yield encryption data. The encryption data may then be homomorphically manipulated across addition, multiplication, subtraction and division operations, even though the conventional encryption methods are not fully homomorphic. To do so, a desired computation is first transformed into a homomorphic operation, based on the type of encryption format applied, by redefining an addition operation (requested computation) as at least one multiplication operation (homomorphic operation), redefining a multiplication operation (requested computation) as at least one exponentiation operation (homomorphic operation), redefining a subtraction operation (requested computation) as at least one division operation (homomorphic operation), redefining a division operation (requested computation) as at least one root operation (homomorphic operation). Once the desired operations are performed, yielding second encrypted data, the transformed encrypted data may then be decrypted using a conventional decryption process corresponding to, or associated with, the applied encryption process.

The decrypted data are then modified into the final output plaintext data by applying a mirror prime number process as applied to the data before encryption. The processor performs the modification by obtaining integer representations of the decrypted data and, for each integer, generating a set of prime numbers. The set of prime numbers is generated by first identifying the largest prime number that is 1) on a stored list of predefined prime numbers and 2) less than the integer representation. The list used in the decryption process is the same list of prime numbers used in the encryption process and preferably stored with the private key of the user. The integer is then divided by the identified prime number to yield a remainder. The process is then repeated with the remainder, namely a second prime number is identified which is the largest prime number that is 1) on a stored list of predefined prime numbers and 2) less than the remainder. This process is completed until a final number, e.g. one, is identified in which case the number one is mapped to the same prime number as previously used. The resulting process yields a set of prime numbers which are then added together to yield an integer representative of the final output plaintext data, also referred to as final, output plaintext data. Optionally, the additional unused prime number not included within the plurality of prime numbers is used to decrypt second encrypted data, where the second encrypted data has been subject to an exponentiation operation.

Figure 33:
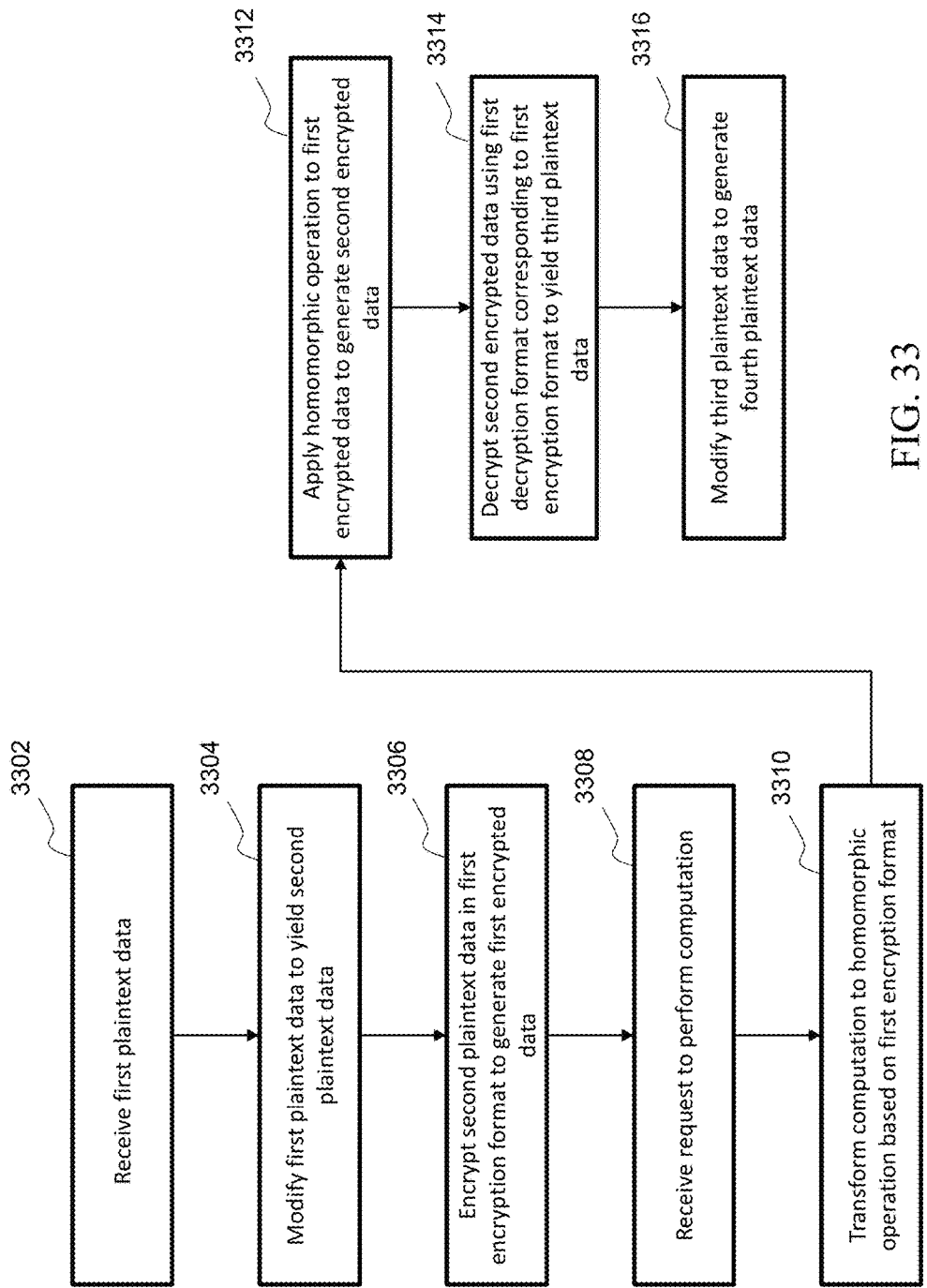

FIG. 33 shows a flowchart depicting an exemplary process for transforming a partially homomorphic encryption system to a FHE system, in accordance with some embodiments of the present specification. At 3302, a first plaintext data is received into a computer, which can be a single device or a set of networked computing devices comprising at least one processor and a memory. At 3304, the first plaintext data is modified to yield a second plaintext data. The computer performs the modification by obtaining integer representations of the plaintext data and, for each integer, generating a set of prime numbers. A set of prime numbers is generated by first identifying the largest prime number that is 1) on a stored list of predefined prime numbers and 2) less than the integer representation. The list of pre-defined prime numbers may be of any length but is preferably in a range of 128 numbers. The identified prime number is then subtracted from the integer to yield a remainder. The process is then repeated with the remainder, namely a second prime number is identified which is the largest prime number that is 1) on a stored list of predefined prime numbers and 2) less than the remainder. This process is completed until a final number, one, is identified in which case the number one is mapped to a prime number that has not been previously used. The resulting process yields a set of prime numbers which are then multiplied together to yield a modified integer representative of the plaintext data, also referred to as modified plaintext data.

At 3306, the second plaintext data is encrypted in a first encryption format to generate a first encrypted data. A conventional encryption system, such as RSA, Goldwasser-Micali, El-Gamal, Benaloh, and Paillier, can then be applied to the modified plaintext data to yield encryption data. At 3308, a request is received to perform a computation such as a multiplication operation, a subtraction operation, a division operation and an addition operation, even though the conventional encryption methods are not fully homomorphic. At 3310, the computation is transformed into a homomorphic operation based on the first encryption format, by algorithmically redefining an addition operation as at least one multiplication operation, algorithmically redefining a multiplication operation as at least one exponentiation operation, algorithmically redefining a subtraction operation as at least one division operation, and algorithmically redefining a division operation as at least one root operation. At 3312, the homomorphic operation is applied to the first encrypted data to generate a second encrypted data. At 3314, the second encrypted data is decrypted using a first decryption format corresponding to the first encryption format to yield a third plaintext data. At 3316, the third plaintext data is modified to generate a fourth plaintext data. The computer performs the modification by obtaining integer representations of the decrypted data and, for each integer, generating a set of prime numbers. The set of prime numbers is generated by first identifying the largest prime number that is 1) on a stored list of predefined prime numbers and 2) less than the integer representation. The list used in the decryption process is the same list of prime numbers used in the encryption process and preferably stored with the private key of the user. The integer is then divided by the identified prime number to yield a remainder. The process is then repeated with the remainder, namely a second prime number is identified which is the largest prime number that is 1) on a stored list of predefined prime numbers and 2) less than the remainder. This process is completed until a final number, e.g. one, is identified in which case the number one is mapped to the same prime number as previously used. The resulting process yields a set of prime numbers which are then added together to yield an integer representative of the final output plaintext data, also referred to as final, output plaintext data.

Thus, in embodiments where the original data is encrypted data, such as $E_1$, the UHE system functions as a layer operating between two ends of a conventional encryption system (such as, but not limited to, Paillier, RSA, El-Gamal). It should be appreciated that the first encrypted data $E_1$ may have been obtained by applying any conventional encryption method, known to persons of ordinary skill in the art, on corresponding plaintext. In embodiments, where the UHE system decrypts manipulated ciphertext data to yield back original data in the form of first encrypted data $E_1$, the first encrypted data $E_1$ can be further decrypted back to obtain the corresponding plaintext using the conventional decryption method associated with the conventional encryption method that was used to generate the first encrypted data $E_1$. The plurality of functions (to yield manipulated ciphertext data) include addition operations, multiplication operations, division, subtraction, membership, finite automata and other additional functions, such as set function operations (union, intersection, merge and push), Boolean operations (AND, OR, XOR), and logical operations such as greater (>), lesser (<), equal (=), greater than or equal (≥), less than or equal (≤), and not equal (≠). Compared to a SHE system, a UHE system can use more functions and is not limited with respect to the number and/or order of multiplication and addition operations.

In embodiments, data expansion (associated with the UHE system) is approximately $O(3 \log(n))$ where n is the binary length of ciphertext. The homomorphically encrypted data preferably does not occupy more than 4 times $n \log(n)$ of the memory and wherein n is equal to the number of said plurality of bits.

In one embodiment, the present specification is directed to an encryption system that applies a Fully Homomorphic Encryption (FHE) format or data transformation to original data that, in various embodiments, may be plaintext data or encrypted data. A FHE system, as disclosed herein, is defined as a system which can either encrypt plaintext data P (original data) to yield encrypted data E or encrypt a first encrypted data $E_1$ (original data) to yield a second encrypted data $E_2$, apply a multiplication or addition function to E or $E_2$ to yield manipulated ciphertext data, and then decrypt manipulated ciphertext data to yield back the original data, that is P or $E_1$, respectively. Thus, in embodiments where the original data is encrypted data, such as $E_1$, the FHE system functions as a layer operating between two ends of a conventional encryption system (such as, but not limited to, Paillier, RSA, El-Gamal). It should be appreciated that the first encrypted data $E_1$ may have been obtained by applying any conventional encryption method, known to persons of ordinary skill in the art, on corresponding plaintext. In embodiments, where the FHE system decrypts manipulated ciphertext data to yield back original data in the form of first encrypted data $E_1$, the first encrypted data $E_1$ can be further decrypted back to obtain the corresponding plaintext using the conventional decryption method associated with the conventional encryption method that was used to generate the first encrypted data $E_1$.

Unlike a UHE system, a FHE system is not adapted to work with other functions, such as set function operations (union, intersection, merge and push), Boolean operations (AND, OR, XOR), and logical operations such as greater (>), lesser (<), equal (=), greater than or equal (≥), less than or equal (≤), and not equal (≠). Compared to a SHE system, however, a FHE system is not limited with respect to the number and/or order of multiplication and addition operations.

Figure 17:
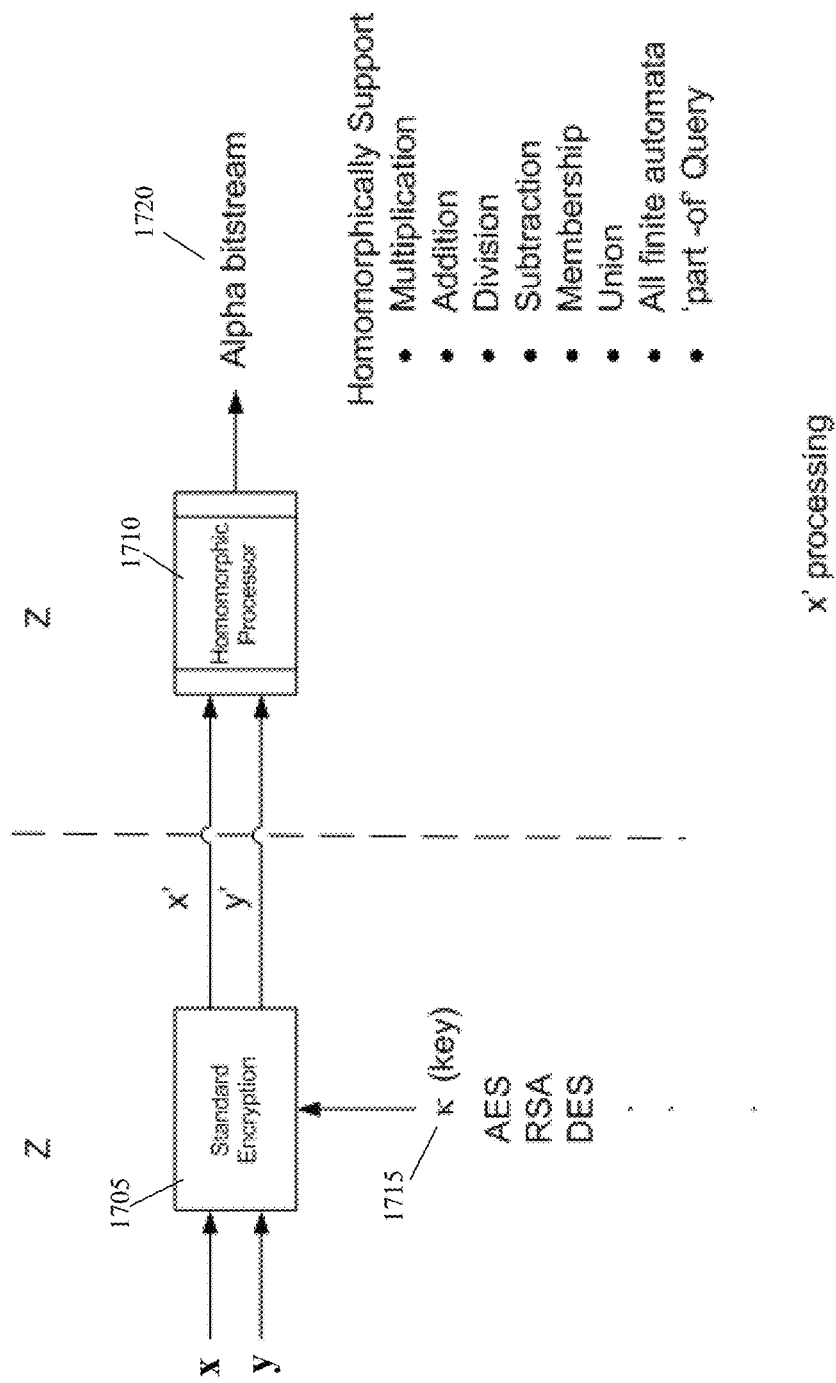
FIG. 17 is a block diagram illustrating a homomorphic processing system operating on ciphertext data, in accordance with an embodiment of the present specification.

FIG. 17 is a block diagram illustrating a homomorphic processing system operating on ciphertext data, in accordance with an embodiment of the present specification. As shown, let x and y be two arbitrary plaintext messages input to an encryption system 1705. In various embodiments, the encryption system 1705 is any proprietary or conventional encryption system known to persons of ordinary skill in the art such as, but not limited to, Pallier, RSA, El-Gamal. The encryption system 1705 uses an associated encryption key 1715 to encrypt the plaintext messages x and y to generate corresponding first ciphertexts x' and y'. In accordance with an embodiment, the first ciphertexts x' and y' are input to a homomorphic processing system 1710 of the present specification. The homomorphic processing system 1710 encrypts the first ciphertexts x' and y' to generate corresponding second encrypted texts x" and y" and applies a plurality of different functions to the second encrypted texts x" and y" to yield manipulated ciphertext data. In an embodiment, the first ciphertexts x' and y' are encrypted through a UHE encryption format disclosed in various embodiments of the present specification. The plurality of functions comprise computations or operations such as, but not limited to, multiplication, addition, division, subtraction, membership, union, all finite automata, 'part-of' query.

In embodiments, the homomorphic processing system 1710, thereafter, decrypts the manipulated ciphertext data to yield back data or alpha bitstream 1720 in an encryption format corresponding to the first ciphertexts x' and y'. Thus, in embodiments, the homomorphic processing system operates as a layer over any conventional encryption system and performs a plurality of computations or operations on input encrypted data without the need to first decrypt the input encrypted data.

Figure 18:
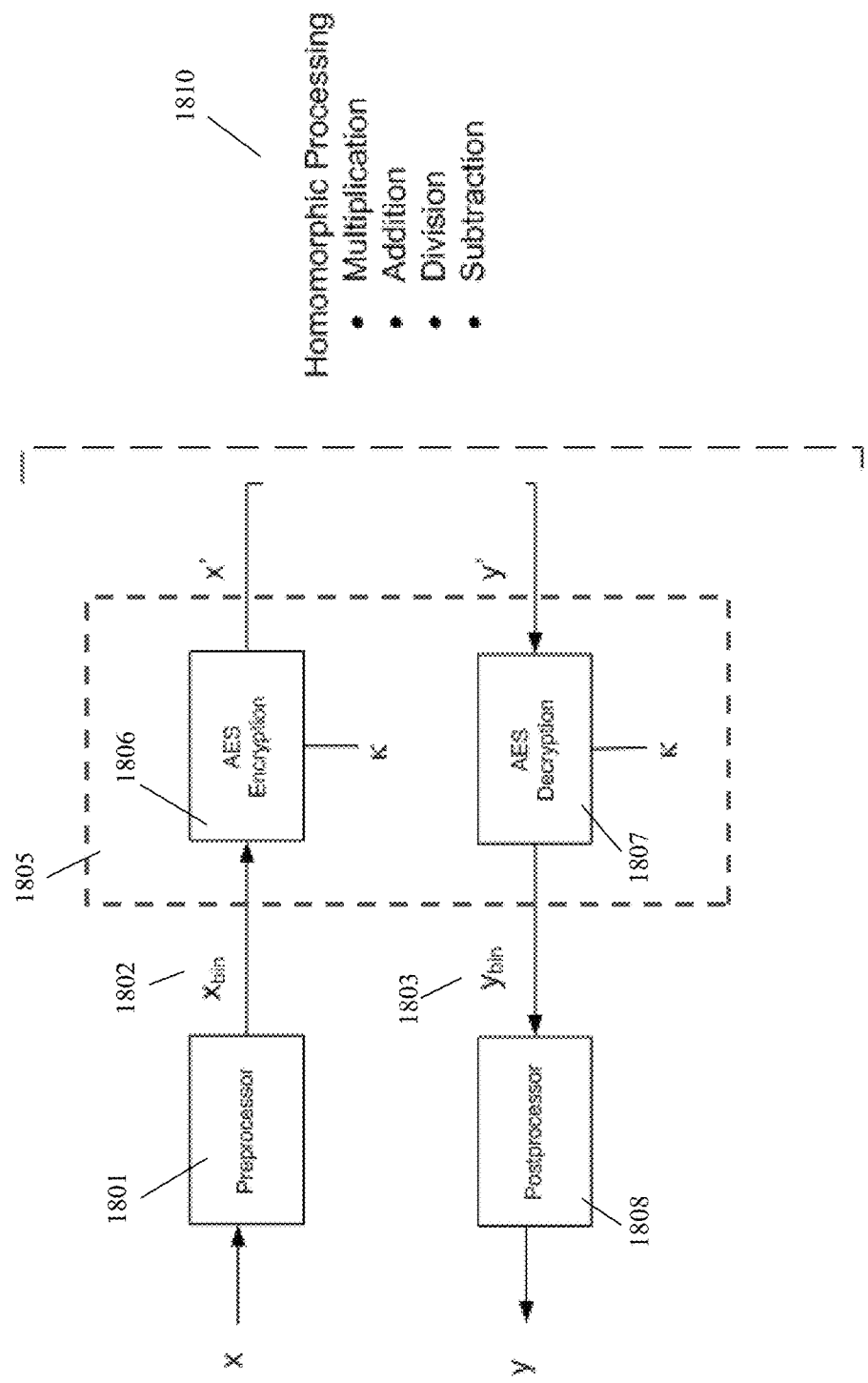
FIG. 18 is a block diagram illustrating a homomorphic processing system operating as a layer between an encryption module and a decryption module of an encryption system, in accordance with an embodiment of the present specification.

FIG. 18 is a block diagram illustrating a homomorphic processing system 1810 operating as a layer between two ends, that is, an encryption module 1806 and a decryption module 1807, of an encryption system 1805. As shown in FIG. 18, let x be an arbitrary plaintext message that is input to a pre-processor 1801 that generates a binary stream 1802 corresponding to the plaintext x. The binary stream 1802 is input to the encryption module 1806 of the encryption system 1805. The encryption system 1805 is any proprietary or conventional encryption system known to persons of ordinary skill in the art such as, but not limited to, RSA, Goldwasser-Micali, El-Gamal, Benaloh, and Paillier standards. The encryption module 1806 generates first ciphertext x' corresponding to the plaintext x. The first ciphertext x' is now input to the homomorphic processing system 1810 of the present specification.

The homomorphic processing system 1810 encrypts the first ciphertext x' to generate corresponding homomorphically encrypted text and applies a plurality of different functions to the homomorphically encrypted text to yield manipulated ciphertext data. In an embodiment, the first ciphertext x' is homomorphically encrypted through a UHE encryption format disclosed in various embodiments of the present specification. The plurality of functions comprise computations or operations such as, but not limited to, multiplication, addition, division, subtraction, membership, union, all finite automata, 'part-of' query. In embodiments, the homomorphic processing system 1810, now decrypts the manipulated ciphertext data to yield back second ciphertext data y' in an encryption format corresponding to the first ciphertext x'. The second ciphertext data y' is, thereafter, decrypted by the decryption module 1807 to generate a binary stream 1803 which is processed by a post-processor 1808 to generate plaintext message y.

In accordance with embodiments, the system implements a pairing function on integers that allows arithmetic structures to be viewed and manipulated as combinatorics. In embodiments, an integer-to-Cantor-like pairing transformation system is employed.

Figure 19:
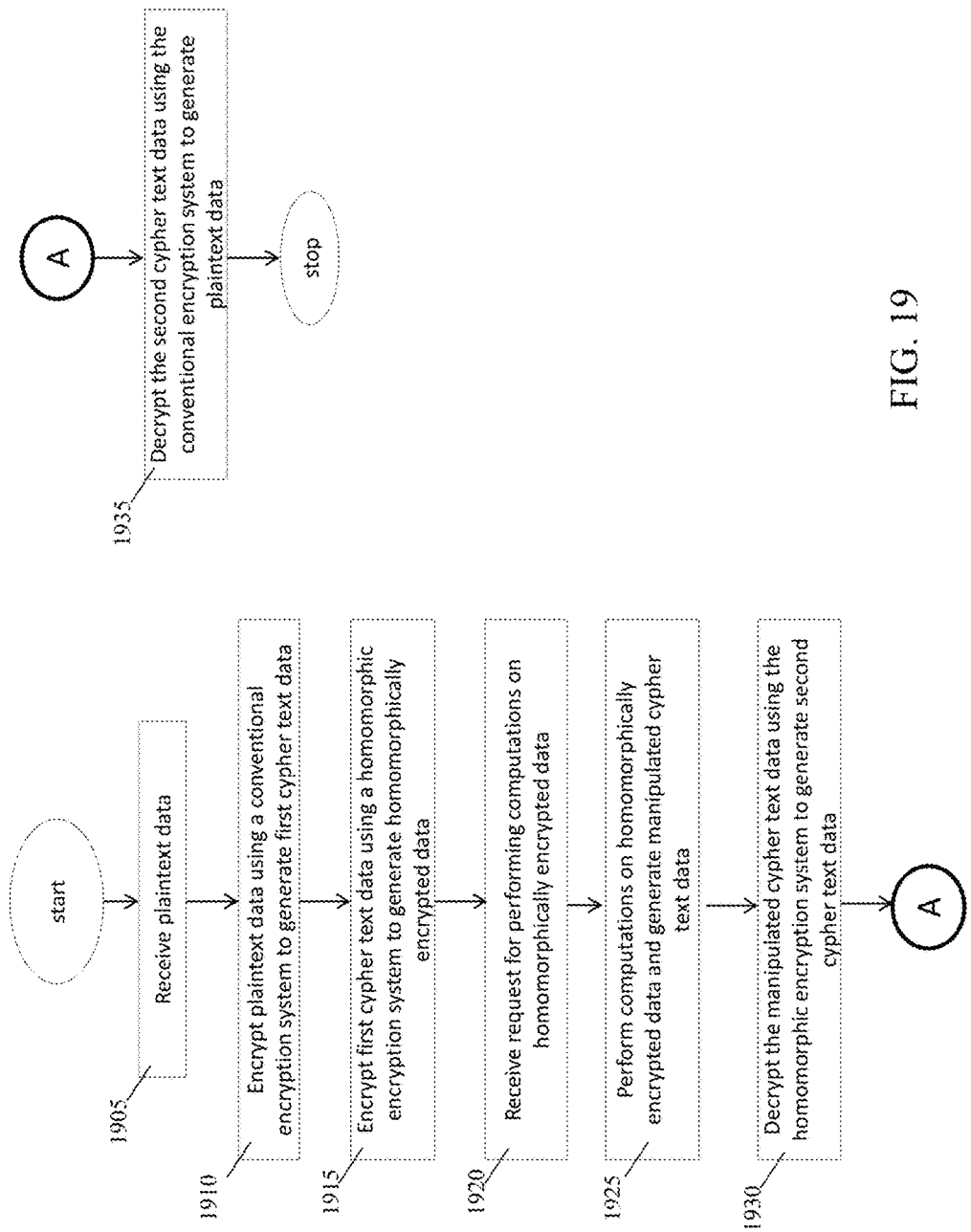
FIG. 19 is a flowchart of a method of homomorphic encryption and processing implemented as a layer between encryption and decryption of a conventional encryption system.

FIG. 19 is a flowchart of a method of homomorphic encryption and processing implemented as a layer between two ends, that is, encryption and decryption, of a conventional encryption system. As shown in FIG. 19, at step 1905, plaintext data is received by a conventional encryption system. The conventional encryption system uses an associated encryption key to encrypt the plaintext data, at step 1910, to generate first ciphertext data. The conventional encryption system is any proprietary or prior art encryption system known to persons of ordinary skill in the art such as, but not limited to, Paillier, RSA, El-Gamal. At step 1915, the first ciphertext data is encrypted using a homomorphic processing system to generate homomorphically encrypted data. In an embodiment, the first ciphertext data is encrypted through a UHE encryption format disclosed in various embodiments of the present specification.

A request is received, at step 1920, to perform a plurality of computations or operations on the homomorphically encrypted data. At step 1925, the required computations or operations are performed to generate manipulated ciphertext data. Thereafter, decrypt the manipulated ciphertext data, at step 1930, using the homomorphic processing system to generate second ciphertext data which is in the same encryption format as the first ciphertext data. Finally, at step 1935, the second ciphertext data is decrypted, using the decryption key associated with the conventional encryption system, to generate plaintext data.

In accordance with aspects of the present specification, a conventional third-party cryptosystem is converted into a fully homomorphic encryption (FHE) scheme. It should be appreciated that each of the aforementioned applications may also be implemented by using a conventional encryption scheme overlaid with the homomorphic transformation schemes described herein.

In various embodiments, the conventional third-party cryptosystem chosen for conversion to FHE are somewhat homomorphic encryption (SHE) schemes that are typically well known and already thoroughly researched. The SHE schemes support either addition operation or multiplication operation on encrypted data. Non-limiting examples of SHE schemes are RSA cryptosystem and Pailiar cryptosystem. Accordingly, to convert a SHE scheme into FHE, the present specification defines customized addition/multiplication operations in such a way that SHE becomes FHE.

This approach has advantages such as: there is no need to explicitly perform a security analysis of an underlying SHE scheme; there exists a massive amount of worldwide installed code base as well as a fact that encryption systems globally are designed to already support this conventional third-party cryptosystem; and that the implementation details of the SHE scheme on different hardware platforms with timing benchmarks are known.

In embodiments, the present specification describes the FHE scheme using a well-known SHE scheme—which is the RSA cryptosystem. In embodiments of the FHE scheme, the customized addition/multiplication operations are defined in such a way that RSA cryptosystem becomes FHE cryptosystem. It should be appreciated that this approach is completely general and can be applied to convert any conventional third-party SHE cryptosystem that is either additively homomorphic or multiplicatively homomorphic to FHE. In accordance with aspects of the present specification, the encryption, decryption and the actual cipher text of the FHE cryptosystem is the same as the conventional third-party cryptosystem. Hence any system that supports the conventional third-party cryptosystem can now be treated as fully homomorphic.

In accordance with further aspects of the present specification, the FHE cryptosystem is enabled to be highly efficient by replacing modular exponentiation operations with Montgomery Multiplication arithmetic.

Following are non-limiting examples of existing, conventional, third-party SHE schemes that can be converted to FHE scheme of the present specification:

RSA Cryptosystem

RSA (Rivest-Shamir-Adleman) is a public-key cryptosystem used for secure data transmission. In this cryptosystem, the encryption key is public and it is different from the decryption key which is kept secret (private). In the RSA, this asymmetry is based on the practical difficulty of the factorization of the product of two large prime numbers, the "factoring problem". A user of the RSA cryptosystem creates and then publishes a public key based on two large prime numbers, along with an auxiliary value. The prime numbers are kept secret. Anyone can use the public key to encrypt a message, but with currently published methods, and if the public key is large enough, only someone with knowledge of the prime numbers can decode the message feasibly.

The RSA is a relatively slow algorithm, and because of this, it is less commonly used to directly encrypt user data. More often, the RSA passes encrypted shared keys for symmetric key cryptography which in turn can perform bulk encryption-decryption operations at much higher speed.

The RSA method of cryptography involves four steps: key generation, key distribution, encryption and decryption:

RSA Key Generation—involves the following steps:
- Generate two large distinct primes p and q of roughly the same size (for example, 1024 bits each)
- Compute the modulus N where N=p*q.
- Compute Euler-Totient ($\varphi$) of N where $\varphi(N)=(p-1)*(q-1)$. Select random integer e as the public key component with $1<e<\varphi(N)$, where $1 \equiv \gcd(e, \varphi(N))$, that is, e is relatively prime to N and has an inverse so that decryption can occur.
- Use Extended Euclidean Algorithm to compute the inverse of e, private key component d, where $1<d<\varphi(N)$, and $e*d \equiv 1 \mod \varphi(N)$. From this we have: Public Key=(e, N) and private key=(d, N). Now d, p and q are kept private or p and q may be destroyed.

RSA Key Distribution

Suppose that Bob wants to send a secret message to Alice. If they decide to use RSA, Bob must know Alice's public key to encrypt the message and, Alice must use her private key to decrypt the message. To enable Bob to send his encrypted messages, Alice transmits her public key (n, e) to Bob via a reliable, but not necessarily secret route. Alice's private key (d), is never distributed.

RSA Encryption

After Bob obtains Alice's public key, he can send a message M to Alice. To do it, he first turns M (the un-padded plaintext) into an integer m (the padded plaintext), such that $0 \le m < n$ by using an agreed-upon reversible protocol referred to as a padding scheme. He then computes the cipher text c, using Alice's public key e, corresponding to $c \equiv m^e \pmod{N}$.

RSA Decryption

Alice can recover m from c by using her private key exponent d by computing $c^d \equiv (m^e)^d \pmod{n} \equiv m$. Given m, she can recover the original message M by reversing the padding scheme.

Following are a plurality of steps of an example of RSA based encryption and decryption. The parameters used in the example are small, but one can also use Open SSL to generate and examine a real key pair.

Choose two distinct prime numbers, such as p=61 and q=53.
Compute n=p*q giving n=3233.
Compute the Euler-Totient of the product as $\varphi(N)$= (p−1)*(q−1)=3120.
Choose any number 1<e<3120 that is co-prime to 3120. Let e=17.
Compute d, the modular multiplicative inverse of e mod ($\varphi(N)$) yielding d=2753. Note that 17*2753≡1 mod $\varphi(N)$.

The public key is (n=3233, e=17). For a padded plaintext message m, the encryption function is $c = m^{17}$ mod 3233.
The private key is (n=3233, d=2753). For an encrypted cipher text c, the decryption function is $m = c^{2753}$ mod 3233.
For instance, in order to encrypt m=65, we calculate $c = 65^{17}$ mod 3233=2790
To decrypt c=2790, we calculate $m = 2790^{2753}$ mod 3233=65

Both of the aforementioned calculations can be computed efficiently using a square-and-multiply algorithm for modular exponentiation. It should be appreciated that modular exponentiation is the main operation involved in RSA, which is time consuming when the bit-size is large, usually in the range of 1024-bit to 4096-bits. In embodiments, performance of RSA can be improved by utilizing parallel computing architecture or enhancing existing modular exponentiation algorithm.

However, an implementation of 1024-bit modular exponentiation with the exponent as large as 1024-bit will require an excessive amount of modular multiplication to be performed. Additionally, each modular multiplication involves a 2048-bit (2049-bit if the carry present) product followed by an expensive division. In accordance with aspects of the present specification, to simplify the computation and aforementioned problems, Montgomery Multiplication is implemented to avoid the expensive division by replacing it with cheaper shift operations. Binary method may also be used to reduce the number of modular multiplication needed to compute a modular exponentiation.

Goldwasser-Micali (GM) Cryptosystem

The GM cryptosystem is based on the hardness of quadratic residuosity problem. Number a is called quadratic residue modulo n if there exists an integer x such that $x^2 \equiv a$ mod n. Quadratic residuosity problem decides whether a given number q is quadratic modulo n or not. GM cryptosystem is described as follows:

GM Key Generation

Similar to RSA, n=p*q is computed where p and q are distinct large primes and then, x is chosen as one of the quadratic non residue modulo n values with $$\left(\frac{x}{x}\right) = 1.$$

Finally, (x,n) is published as the public key while (p, q) is kept as the secret key.

GM Encryption

Firstly, the message m is converted into a string of bits. Then, for every bit of the message $m_i$, a quadratic non residue value $y_i$ is produced such that gcd($y_i$, n)=1. Then, each bit is encrypted to $c_i$ as follows:

$$c_i = E(m_i) = y_i^2 x^{m_i} \pmod{n}, \forall m_i = \{0,1\}$$

Where m=$m_0 m_1 \ldots m_r$ and c=$c_0 c_1 \ldots c_r$, and r is the block size used for the message space and x is picked from $Z_n^*$ at random for every encryption, where $Z_n^*$ is the multiplicative subgroup of integers modulo n which includes all the numbers smaller than r and relatively prime to r.

GM Decryption

Since x is picked from the set $Z_n^*$ (1<x≤n−1), x is quadratic residue modulo n for only $m_i$=0. Hence, to decrypt the ciphertext $c_i$, one decides whether $c_i$ is a quadratic residue modulo n or not; if so, $m_i$ returns 0, else $m_i$ returns n for only $m_i$=0. Hence, to decrypt the ciphertext $c_i$, one decides whether $c_i$ is a quadratic residue modulo n or not; if so, $m_i$ returns 0, else $m_i$ returns 1.

Elgamal Cryptosystem

In 1985, Taher Elgamal proposed a new public key encryption scheme which is an improved version of the original Diffie-Hellman Key algorithm that is based on the hardness of certain problems in discrete logarithm. It is mostly used in hybrid encryption systems to encrypt the secret key of a symmetric encryption system. The Elgamal cryptosystem is defined as follows:

---

Algorithm Key generation for ElGamal public-key encryption

SUMMARY: each entity creates a public key and a corresponding private key.
Each entity A should do the following:
1. Generate a large random prime p and a generator α of the multiplicative group $Z_p^*$ of the integers modulo p (using Algorithm 4.84).
2. Select a random integer α, 1 ≤ α ≤ p − 2, and compute $α^α$ mod p (using Algorithm 2.143).
3. A's public key is (p, α, $α^α$): A's private key is α.

---

Algorithm ElGamal public-key encryption

SUMMARY: B encrypts a message m for A. which A decrypts.
1. Encryption. B should do the following:
   (a) Obtain A's authentic public key (p, α, $α^α$).
   (b) Represent the message as an integer m in the range {0, 1, . . . , p − 1}.
   (c) Select a random integer k, 1 ≤ k ≤ p − 2.
   (d) Compute $γ = α^k$ mod p and $δ = m \cdot (α^α)^k$ mod p.
   (e) Send the ciphertext c = (γ, δ) to A.
2. Decryption. To recover plaintext m from c. A should do the following:
   (a) Use the private key α to compute $γ^{p-1-α}$ mod p (note: $γ^{p-1-α} = γ^{-α} = α^{-αk}$).
   (b) Recover m by computing $(γ^{-α}) \cdot γ$ mod p.

---

Benaloh Cryptosystem

Benaloh proposed an extension of the GM Cryptosystem by improving it to encrypt the message as a block instead of bit by bit. Benaloh's proposal was based on the higher residuosity problem. Higher residuosity problem ($x^n$) is the generalization of quadratic residuosity problems ($x^2$) that is used for the GM cryptosystem.

Benaloh Key Generation

Block size r and large primes p and q are chosen such that r divides p−1 and r is relatively prime to (p−1)/r and q−1 (i.e., gcd (r; (p−1)/r)=1 and gcd(r; (q−1))=1). Then, n=pq and Ø=(p−1)*(q−1) are computed. Lastly, y∈$Z_n^*$ is chosen such that $y^\varnothing \equiv 1$ mod n, where $Z_n^*$ is the multiplicative subgroup of integers modulo n which includes all the numbers smaller than r and relatively prime to r. Finally, (y, n) is published as public key, and (p, q) is kept as secret key.
Benaloh Encryption For the message $m \in Z_r$, choose a random u such that $u \in Z_n^*$. Then, to encrypt the message m:

$$c = E(m) = y^m u^r (\mathrm{mod}\ n)$$

where the public key is the modulus n and base y with the block size of r.
Benaloh Decryption The message m is recovered by an exhaustive search for $i \in Z_r$, such that $(y^{-i}c)^{\varnothing/r}$, where the message m is returned as the value of i, i.e., m=i.
Paillier Cryptosystem In 1999, Paillier introduced another probabilistic encryption scheme based on composite residuosity problem. Composite residuosity problem is very similar to quadratic and higher residuosity problems that are used in GM and Benaloh cryptosystems. It questions whether there exists an integer x such that $x^n \equiv a\ (\mathrm{mod}\ n^2)$ for a given integer a.

---

Key Generation

Select two large random primes p and q, such that p ≠ q.
n = p * q.
Compute λ = lcm (p − 1, q − 1)
Choose g ∈ $Z_{n^2}^*$, such that n divides the order of g
Public key ← (g, n)
Private key ← (p, q)
Encryption M ∈ $Z_n$
c = $g^m$, $r^n$ (mod $n^2$), where r ∈ $Z_r^*$ is randomly chosen.
Decryption m = (L($c^2$(mod $n^2$)))(L($g^2$(mod $n^2$)))$^{-1}$ (mod n),
where L(u) = (u − 1)/n

---

Methods of Enhancing Modular Exponentiation Using Montgomery Multiplication

In conventional third-party methods of implementing cryptography, such as using the RSA scheme, each modular multiplication operation (associated with modular exponentiation) requires computationally expensive division operation. In embodiments of the present specification, the computationally expensive division operation is replaced with Montgomery multiplication that uses addition and bit shifting with a base to the power of two, which is optimized for majority hardware architectures.

FIG. 22A illustrates a plurality of programmatic instructions 2205 for computing or executing Montgomery multiplication, in accordance with an embodiment of the present specification. It should be noted that Montgomery multiplication requires a) conversion from radix form to Montgomery form at the beginning of computation, and b) another conversion back to radix form at the end of the computation. These two conversions are computationally expensive, but it is still beneficial to use Montgomery multiplication for modular exponentiation because most of the computations can be done in Montgomery form. It should be appreciated that, if the b is selected as a power of two, the modular reduction in step 2210 can be replaced by bitwise shifting, which is computationally very fast in most of the computer hardware.

FIG. 22B illustrates a plurality of programmatic instructions 2215 to implement a binary method for reducing the number of modular multiplication operations needed to compute a modular exponentiation, in accordance with an embodiment of the present specification. The instructions 2215 begin by scanning the exponent bits from right to left; if the bit is '0', only squaring is performed; if the bit is '1', an additional Montgomery multiplication is performed.

In the binary method, of FIG. 22B, for modular exponentiation, the speed performance is determined by the number of '1' bit in the exponent, as additional multiplication is required for every '1' bit. FIG. 22C illustrates a plurality of programmatic instructions 2220 to implement signed-digit recoding method for reducing the number of '1' bit in an exponent, in accordance with an embodiment of the present specification. The output of this recoding method 120 always has extra one digit than the binary representation. For example, decimal 31 is represented as [1, 1, 1, 1, 1] (5 digits) in binary, but represented as [1, 0, 0, 0, 0, −1] after signed digit recoding (6 digits). Thus, the number of zeroes is increased compared to the binary representation, but the number of ones is reduced.

FIG. 22D illustrates a plurality of programmatic instructions 2225 to implement a CMM-SDR method as an improvement to the signed-digit recoding method of FIG. 22C, in accordance with an embodiment of the present specification. In the method 2225, for each iteration, if the scanned bit is '1' or '−1', then it is a multiply and square, if '0', then it is only a squaring.

Thus, in accordance with some embodiments, the performance of RSA based cryptographic algorithms is improved by enhancing modular exponentiation operations using the methods of FIGS. 22A trough 22D.

Figures 23A, 23B:
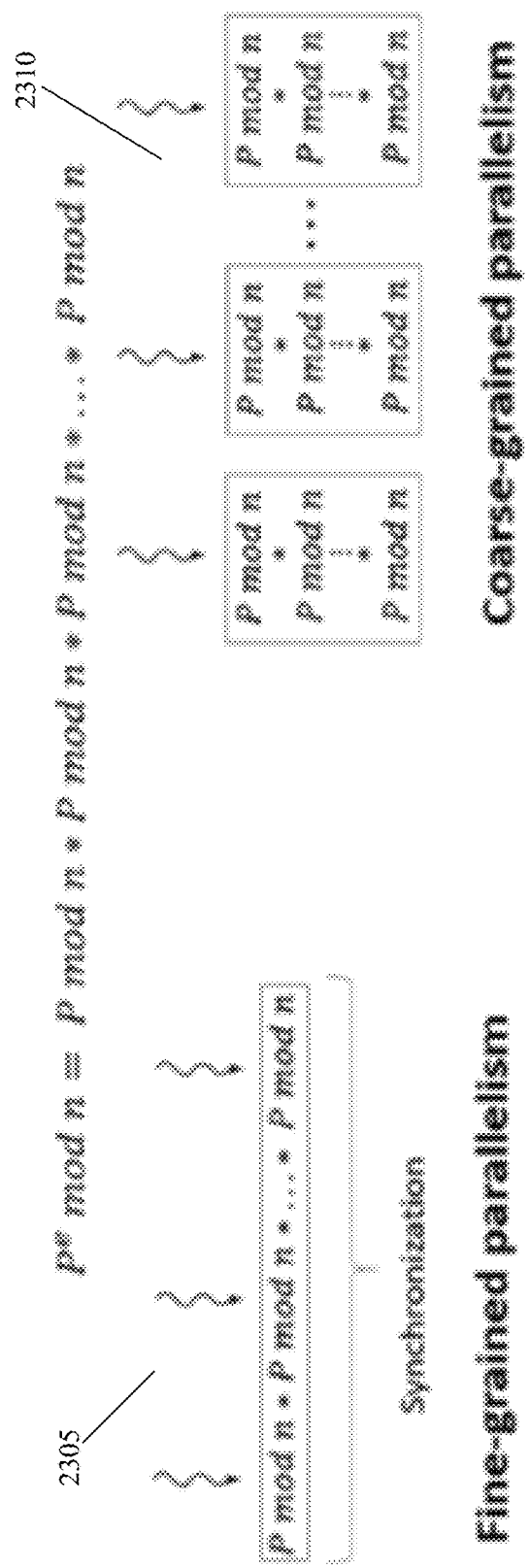
FIG. 23A illustrates a first type of granularity with reference to parallel computing, in accordance with an embodiment of the present specification.
FIG. 23B illustrates a second type of granularity with reference to parallel computing, in accordance with an embodiment of the present specification.

In accordance with some embodiments, the performance of RSA cryptography is improved by utilizing parallel computing architecture such as that of a GPU (Graphics Processing Unit). Graphics Processing Unit (GPU) is massively parallel processors capable of computing thousands of threads in parallel. GPU has been used in various applications to accelerate cryptographic algorithms.
GPU Implementation of Montgomery Multiplication GPU has deep memory architecture with various memory types—each of which has its own strength and limitation. FIGS. 23A and 23B respectively illustrate first and second forms 2305, 2310 of granularity with reference to parallel computing, in accordance with embodiments of the present specification. In embodiments, the first form of granularity 2305 depicts fine-grained parallelism while the second form of granularity depicts coarse-grained parallelism. In some embodiments, the CMM-SDR Montgomery multiplication is implemented based on coarse-grained parallelism 2310, where by each thread is assigned to compute one modular exponentiation. Since each thread is independent of each other, there is no intense communication between threads, so shared memory does not provide significant benefits to their implementation. At the same time, the computations within one thread are more intensive compared to fine-grained implementation 2305 of the CMM-SDR Montgomery multiplication. Thus, these computations do not limit the number of registers used per thread and let the compiler allocate as much as it could.

In embodiments, in a first step, the values of R, C, D and S, are pre-computed values and then these pre-computed values are copied, together with M' (required to compute Montgomery multiplication), where M' is modified M as defined above, M and $E_{SD}$ to global memory in GPU. It should be appreciated that all the values are represented in multi-limbs (32-bit each) and stored in the form of arrays, except M' which is stored in register. In a second step, 32000 threads are launched to perform 32000 modular exponentiations, wherein the threads are organized as 125 blocks per grid, and 256 threads per block. Each thread has to load the values of R, M, $E_{SD}$, C, D and S into local memory and M' into register. During the computations, C, D and S are used to store the intermediate values. The results of Montgomery exponentiation are stored in global memory and copied to the host memory after the computations are completed.

In accordance with an embodiment, Table 1 illustrates computational speed (in nano seconds) observed in the context of GPU (for example, NVIDIA Quadro P100) implementation of Montgomery modular arithmetic, while Table 2 illustrates computational speed (in nano seconds) observed in the context of Field-Programmable Gate Array (Xilinx Virtex-7 XC7V2000T FPGA) implementation of Montgomery modular arithmetic.

TABLE 1

| No | Operations | NVIDIA Quadro P100 (Nano Second) |
|---|---|---|
| 1 | Addition | <20 |
| 2 | Subtraction | <20 |
| 3 | Multiplication | <60 |
| 4 | Division | <60 |
| 5 | Comparison | <20 |
| 6 | Greater than | <30 |

TABLE 2

| No | Operations | Xilinx Virtex-7 XC7V2000T FPGA (Nano Second) |
|---|---|---|
| 1 | Addition | <6 |
| 2 | Subtraction | <6 |
| 3 | Multiplication | <40 |
| 4 | Division | <40 |
| 5 | Comparison | <10 |
| 6 | Greater than | <20 |

Fully Homomorphic Encryption (FHE) Scheme Using RSA Cryptosystem

In accordance with some embodiments, an SHE scheme such as, but not limited to, RSA cryptosystem is converted to FHE scheme of the present specification. As known to persons of ordinary skill in the art, fully homomorphic encryption is a form of encryption that allows computations to be carried out on cipher text, thus generating an encrypted result which, when decrypted, matches the result of operations performed on the plaintext.

RSA is a multiplicative only Homomorphic cryptosystem which is described as follows: If the RSA public key is (n, e) and message m then the encryption of a message m is given by $c=m^e$ mod n. The homomorphic property is that, given $c_1=x_1^e$ mod n and $c_2=x_2^e$ mod n, then $C_1*C_2=(x_1*x_2)^e$ mod n.

For example, let RSA public key be (n=3233, e=17) and RSA private key be (n=3233, d=2753). Take any two Messages $m_1=65$ and $m_2=5$ and compute $m_1*m_2=325$. Let $c_1=65^{17}$ mod 3233=2790 and $c_2=5^{17}$ mod 3233=3086. Now, consider the multiplicative homomorphic property of RSA which is as follows $c_1*c_2=461$ mod 3233. Hence $(c_1*C_2)^{2753}=325$ mod 3233. RSA is not additively homomorphic, or homomorphic with respect to other operations.

Before detailing a transformation of RSA encrypted data into a homomorphic format, it is important to provide some background on the prime additive and multiplicative structures of positive integers. In number theory, the fundamental theorem of arithmetic, also called the unique factorization theorem or the unique-prime-factorization theorem, states that every integer greater than 1 either is prime itself or is the product of prime numbers, and that this product is unique, up to the order of the factors.

Example: $1.200=2^4 \times 3^1 \times 5^2 = 3 \times 2 \times 2 \times 2 \times 2 \times 5 \times 5$ The theorem is stating two things: first, that 1200 can be represented as a product of primes, and second, no matter how this is done, there will always be four 2s, one 3, two 5s, and no other primes in the product. The requirement that the factors be prime is necessary: factorizations containing composite numbers may not be unique (e.g. $12=2\times6=3\times4$). This theorem is one of the main reasons why 1 is not considered a prime number: if 1 were prime, then factorization into primes would not be unique; for example, $2=2\times1=2\times1\times1$.

Suppose, further one has a positive integer n and wants to write n as a sum of distinct primes. According to Bertrand's postulate, there always exist a prime $$\frac{n}{2} < p \le n \text{ then } n - p < \frac{n}{2}.$$

Now, write n−p as a sum of distinct primes, say $n-p=p_1+p_2+\ldots+p_k$. So, $n=p+p_1+p_2+\ldots+p_k$. If we assume that p=1 is a prime number then $n=1+p_1+p_2+\ldots+p_k$. One adapts the following procedure to find the prime additive structure of any positive integer. As a test case, assume that one wants to find prime additive structure of 128 bit positive integer. First, one generates a database of each bit prime numbers. Then, one stores the prime numbers up to 16 bits. From 17 bits to 128 bits, one stores 20 prime numbers of each bit value. Assume that one has a 128 bit positive integer. First, one looks for a prime number less than the integer n. If $n-p$, =1 then, look for another prime number less than the integer n and compute $y=n-p_1$. Now, the new integer value is y. The same procedure is repeated to find the next prime $P_2$ and compute $z=y-p_2$. The above procedure is repeated until one reaches the smallest bit prime number.

For example, assume that one has a positive integer n=65. The prime number less than 65 is prime number 61. So, y=65−61=4. The prime number less than 4 is 3. So, z=4−3=1. One can write the number 65 as 65=61+3+1.

RSA encryption/decryption are multiplicative homomorphic. Taking the full advantage of multiplicative homomorphic property of RSA, one may perform RSA encryption/decryption using prime additives structure of any positive integer as follows: Assume that one has a positive integer n. One can write the positive integer n as a sum of prime additives $n=1+p, +P_2+\ldots+P_k$. First, one defines a unique prime number in place of integer 1. Assume that a prime number r=1. Then $n=r+p_1+p_2+\ldots+p_k$. Then, one applies RSA encryption on the multiples of the primes as $c=x^e$ mod $n=r^e*p_1^e*p_2^e*\ldots*p_k^e$. Since multiplication is homomorphic in RSA then we apply the RSA decryption as $x=x^{ed}$ mod $n=r^{ed}*p_1^{ed}*p_2^{ed}*\ldots*p_k^{ed}=r*P_1*P_2*\ldots*P_k$. Since, one has a database of the prime numbers $r, p_1, p_2, \ldots, p_k$ and division by respective prime numbers, one can recover the positive integer n.

If the RSA public key (n, e) and message m then the encryption of a message m is given by $c=m^e$ mod n. The homomorphic property is that, given $c_1=x_1^e$ mod n and $c_2=x_2^e$ mod n, then $c_1*c_2=(x_1*x_2)^e$ mod n. For example, take the same parameters of RSA cryptosystem as we discussed in the example above. Let RSA public key is (n=3233, e=17) and RSA private key is (n=3233, d=2753). Take any two Messages $m_1$=65 and $m_2$=5 and compute $m_1*m_2$=325. Let $c_1$=$65^{17}$ mod 3233=2790 and $c_2$=$5^{17}$ mod 3233=3086. Now, consider the multiplicative homomorphic property of RSA which is as follows $c_1*c_2$=461 mod 3233. Hence, $(C_1*c_2)^{2753}$=325 mod 3233.

One can define the multiplication operation (*) in our FHE as follows: As $c_1$=$m_1^e$ mod n and $c_2$=$m_2^e$ mod n. One can define $m_1(*)m_2 \approx c_1^{c_2}$ mod n. So, in fact, one can perform exponentiation of cipher texts instead of multiplication of cipher texts but name it as multiplication of cipher texts. The exponentiation of cipher texts is, however, not commutative. It turns out that the exponentiation of cipher texts not being commutative does not matter because of the additive primes based construction defined earlier. One can hence use the initial definition $m_1 (*) m_2 \approx c_1^{c_2}$ mod n without worrying about commutativity. Since, in this case, the commutative property of cipher texts is achieved because we are taking each plain text message as sum of additive prime and additive primes are commutative.

When one is performing multiple operations on cipher texts, one will not know the values of $c_1$ or $c_2$, so when one decrypts $c_1^{c_2}$ mod n, one will get $m_1 m_2^e$ mod n. How can one decrypt the exponent in the equation $m_1 m_2^e$ mod n to get exact value of $m_1$ and $m_2$? One can define the multiplication operation (*) in the following way: define $m_1*m_2$=$rc_1^{rc_2}$, where r=2. Multiply each cipher text by r and obtain $rc_1$ and $rc_2$. Observe that $c_{12}$=$(rc_1)^{(rc_2)}$. Since $(rc_1)^{(rc_2)}$, one can rewrite as $(2)^{(rc_2)}*(c_1)^{(rc_2)}$ which can be simplified by dividing it by $(C_1)^{(rc_2)}$. After division, one gets $(2)^{(rc_2)}$. Taking $\log_2$ of the remaining value results in $rc_2$. Dividing by r=2, results in $c_2$. It should be clear that above can be achieved by normal $\log_2$ operation and not a discrete log operation. So, if one knows that cipher text $c_2$, then one can recover the ciphertext $c_1$ since $$c_1 = \frac{(rc_1)^{(rc_2)(-rc_2)}}{r}.$$

One can define addition/subtraction operations multiplicative operations of RSA as follows: As $c_1$=$m_1^e$ mod n and $c_2$=$m_2^e$ mod n. Define $m_1(+)m_2 \approx c_1*c_2$. However, one needs to be able to decrypt after multiple additions and multiplications, so one needs to extend the definitions from above as $m_1(+)m_2 \approx rc_1*rc_2$. So, in fact, one is performing multiplication of cipher text instead of addition of cipher text but it is named as addition of cipher text. To keep the number of rs from expanding too much, one divides the result of each addition operation by r.

One can define the subtraction operation (−) as follows: As $c_1$=$m_1^e$ mod n and $c_2$=$m_2^e$ mod n. One can define $c_1/c_2$=$c_1*c_2^{(-1)}$ mod n. So, in fact, one is performing multiplication of one cipher text with modular inverse of other cipher. As discussed earlier in the multiplication operation, one can introduce a constant r=2. Since, in the division operation, the constant r is cancelled. So, in the result, multiply it with the constant r.

One can also define the division operation (/) as follows: As $c_1$=$m_1^e$ mod n and $c_2$=$m_2^e$ mod n. Define $m_1(/)m_2$ $r'c_1^{1/rc_2}$ mod n. After decryption, one can remove the effect of r from all the operations above.

Comparison Operation

In the FHE cryptosystem of the present specification, comparison operation (==) is defined as follows:

Assume that we have two cipher texts $C_1$=$m_1^e$ mod n and $C_2$=$m_2^e$ mod n. We want to check that whether the cipher text $C_1$ is equal to cipher text $C_2$ or not? We will perform the following operation:

$$C_1( == )C_2 = C_1(+)C_2^{-1} = C_1 * \frac{1}{C_2} = m_1^e * \frac{1}{m_2^e} = \left(\frac{m_1}{m_2}\right)^e \mod n$$

Upon decryption of $C_1(==)C_2$, if we have the value 1 then it means that message $m_1$ is equal to the message $m_2$, otherwise, message $m_1$ is not equal to message $m_2$.

For example, let RSA public key be (n=3233, e=17) and RSA private key be (n=3233, d=2753). Take any two Messages $m_1$=65 and $m_2$=5. Let $c_1$=$65^{17}$ mod 3233=2790 and $c_2$=$5^{17}$ mod 3233=3086. Now, consider the comparison operation:

$$C_1( == )C_2 =$$

$$C_1(+)C_2^{-1} = 2790 * \frac{1}{3086} \mod 3233 = 2790 * 3211 = 47 \mod 3233$$

Now, $(C_1( == )C_2 = 47)^{17} \mod 3233 = 501 \neq 1$ then the message $m_1 \neq m_2$.

Greater than Operation

In this operation, we want to compare two encrypted values X and Y under modulo n and try to find the greater value among X and Y under modulo n. The binary representation of X and Y are X=$x_{n-1}, \ldots, x_0$ and Y=$y_{n-1}, \ldots, y_0$. Comparing X and Y translates to bit comparison, from the msb to the lsb. Therefore, in an example consider two bit comparison, x and y. The binary expressions (computation is done in $Z_2$) corresponding to three of their possible relations which are the following:

$x>y \Leftrightarrow xy+x=1$ $x=y \Leftrightarrow x+y+1=1$ $x \leq y \Leftrightarrow xy+x+1=1$ This means that if we have the FHE of one bit values x and y, namely $C_x$ and $C_y$, we can evaluate=$C_x.C_y+C_x$. Upon decryption of C, one can know if x>y (i.e. Dec(C)=1) or x≤y (i.e. Dec(C)=0).

Let's consider the case of two integers X=$x_0 x_1$ and Y=$y_0 y_1$ represented on n=2 bits. The binary expression that could be used to evaluate the relation X>Y is the following:

$x_1 x_0 > y_1 y_0 \Leftrightarrow (x_1 > y_1) \vee (x_1 = y_1) \wedge (x_0 > y_0) =$ $1 \Leftrightarrow (x_1 y_1 + x_1) + (x_1 + y_1 + 1)(x_0 y_0 + x_0) =$ $1 \Leftrightarrow x_1 y_1 + x_1 + x_1 x_0 y_0 + x_1 x_0 + y_1 x_0 y_0 + y_1 x_0 + x_0 y_0 + x_0 = 1$ Therefore, a solution uses a divide-and-conquer approach which is two n-bits integers X and Y and taking l=[n/2], then we have the following decomposition $$\frac{msb(X)}{x_{n-1} \ldots x_l} \frac{lsb(X)}{x_{l-1} \ldots x_0} > \frac{msb(Y)}{y_{n-1} \ldots y_l} \frac{lsb(Y)}{y_{l-1} \ldots y_0} \Leftrightarrow$$

$(msb(X) > msb(Y)) \vee (msb(X) = msb(Y)) \wedge (lsb(X) > lsb(Y))$

This property suggests a method that would first split the bit strings X and Y in about equally long parts, compare these parts recursively, and then combine these to produce the final output.

Expressed explicitly in terms of the bits of X and Y, a full solution for X>Y and X≤Y is obtained by evaluating $t_{0,n}$ and $s_{0,n}$ respectively, using the following recurrences (Choosing each time l=⌈j/2⌉):

$$t_{i,j} = \begin{cases} x_i y_i + x_i, & j = 1 \\ t_{i+l,j-l} + z_{i+l,j-l} t_{i,l}, & j > 1 \end{cases}$$

$$z_{i,j} = \begin{cases} x_i + y_i + 1, & j = 1 \\ z_{i+l,j-l} z_{i,l}, & j > 1 \end{cases}$$

$$s_{i,j} = \begin{cases} x_i y_i + y_i + 1, & j = 1 \\ t_{i+l,j-l} + z_{i+l,j-l} s_{i,l}, & j > 1 \end{cases}$$

Correctness of the computation follows from the same decomposition principle as we discussed earlier.

Figure 24:
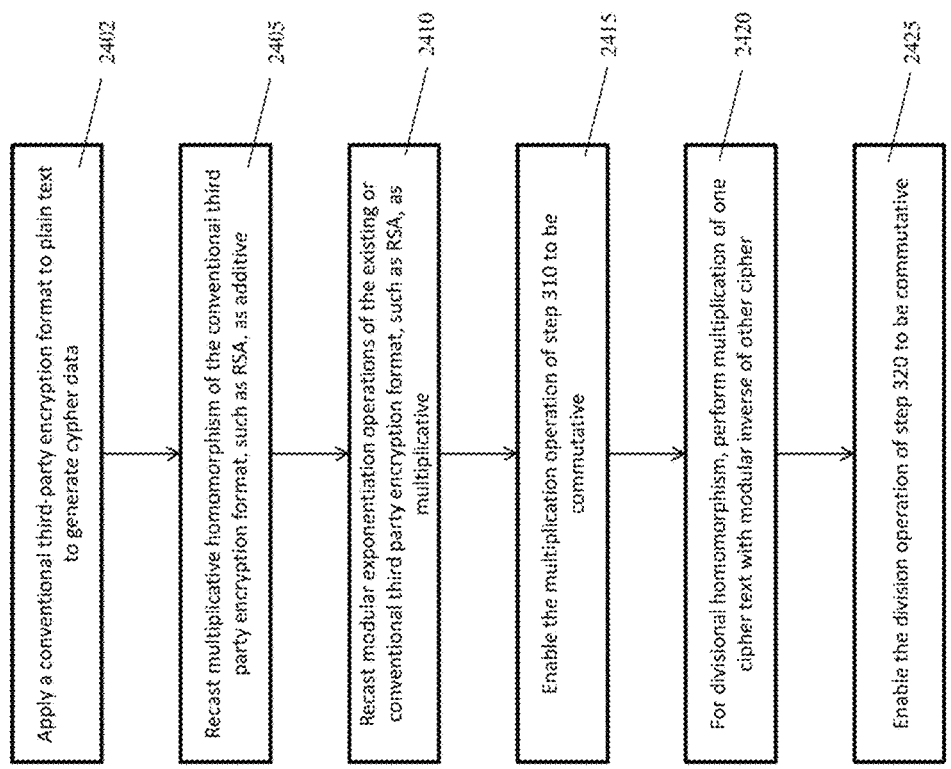
FIG. 24 is a flow chart illustrating a plurality of steps of implementing an FHE method, process or scheme, in accordance with an embodiment of the present specification.

FIG. 24 is a flow chart illustrating a plurality of steps of implementing an FHE method, process or scheme, in accordance with an embodiment of the present specification. At step 2402, cipher data is obtained by applying a conventional third-party encryption format to plain text. In some embodiments, the conventional third-party encryption format is the RSA cryptosystem. However, in alternate embodiments conventional encryption formats include schemes such as, Goldwasser-Micali, El-Gamal, Benaloh, and Paillier. At step 2405, for an FHE scheme to be homomorphic with respect to addition operation in cypher domain, multiplicative homomorphism of the conventional third party encryption format, such as RSA, is recast as additive. That is, multiplication/division of cipher text is performed instead of addition/subtraction of cipher texts for addition/subtraction in plaintext and exponentiation/exponentiation with inverse operations in ciphertext are performed to do multiplication and division in the plaintext as follows:

When one is performing multiple operations on cipher texts, one will not know the values of $c_1$ or $c_2$, so when one decrypts $c_1^{c_2}$ mod n, one will get $m_1 m_2^e$ mod n. How can one decrypt the exponent in the equation $m_1 m_2^e$ mod n to get exact value of $m_1$ and $m_2$? One can define the multiplication operation (*) in the following way: define $m_1 * m_2 = rc_1^{rc_2}$, where r=2. Multiply each cipher text by r and obtain $rc_1$ and $rc_2$. Observe that $c_1^{c_2} = (rc_1)^{(rc_2)}$. Since $(rc_1)^{(rc_2)}$, one can rewrite as $(2)^{(rc_2)} * (c_1)^{(rc_2)}$ which can be simplified by dividing it by $(c_1)^{(rc_2)}$. After division, one gets $(2)^{(rc_2)}$. Taking $\log_2$ of the remaining value results in $rc_2$. Dividing by r=2, results in $c_2$. It should be clear that above can be achieved by normal $\log_2$ operation and not a discrete log operation. So, if one knows that cipher text $c_2$, then one can recover the ciphertext $c_1$ since $$c_1 = \frac{(rc_1)^{(rc_2)(-rc_2)}}{r}.$$

One can define addition/subtraction operations multiplicative operations of RSA as follows: As $c_1 = m_1^e$ mod n and $c_2 = m_2^e$ mod n. Define $m_1(+)m_2 \approx c_1 * c_2$. However, one needs to be able to decrypt after multiple additions and multiplications, so one needs to extend the definitions from above as $m_1(+)m_2 \approx rc_1 * rc_2$. So, in fact, one is performing multiplication of cipher text instead of addition of cipher text but it is named as addition of cipher text. To keep the number of rs from expanding too much, one divides the result of each addition operation by r.

One can define the subtraction operation (−) as follows: As $c_1 = m_1^e$ mod n and $c_2 = m_2^e$ mod n. One can define $c_1/c_2 = 1 * c_2^{(-1)}$ mod n. So, in fact, one is performing multiplication of one cipher text with modular inverse of other cipher. As discussed earlier in the multiplication operation, one can introduce a constant r=2. Since, in the division operation, the constant r is cancelled. So, in the result, multiply it with the constant r.

One can also define the division operation (/) as follows: As $c_1 = m_1^e$ mod n and $c_2 = m_2^e$ mod n. Define $m_1(/)m_2 \approx r * c_1^{1/rc_2}$ mod n. After decryption, one can remove the effect of r from all the operations above.

It should be noted that the FHE cryptosystem of the present specification is based on conventional third-party encryption formats with customized arithmetic operations. The main operation in FHE scheme is modular exponentiation. In order to avoid the expensive division operation associated with the modular exponentiation, the FHE scheme uses Montgomery modular arithmetic. In various embodiments of the FHE scheme, the modular exponentiation operations are replaced with Montgomery Multiplication arithmetic (to improve computational efficiency of the FHE scheme) as described with reference to FIGS. 22A through 22D.

The FHE methodologies of the present specification are implemented as logical steps in one or more computer systems. The logical operations of the present specification are implemented as a sequence of processor-implemented steps executing in one or more computer systems and/or as interconnected machine or circuit engines within one or more computer systems. The implementation is a matter of choice, dependent on the performance requirements of the computer system implementing the invention.

Persons of ordinary skill in the art should appreciate that the FHE system or engine of the present specification may be implemented in connection with hardware or software or, where appropriate, with a combination of both. As used herein, the terms "algorithm," "scheme," "system", "engine" and the like are likewise intended to refer to a computer-related entity, either hardware, a combination of hardware and software, software, or software in execution.

In accordance with aspects, the present specification is directed to an encryption system that applies a Fully Homomorphic Encryption (FHE) format or data transformation to original data that, in various embodiments, is encrypted data. A FHE system, as disclosed herein, is defined as a system which can encrypt a first encrypted data $E_1$ (original data) to yield a second encrypted data $E_2$, apply a multiplication or addition function to $E_2$ to yield manipulated ciphertext data, and then decrypt manipulated ciphertext data to yield back the original data, that is $E_1$. Thus, in embodiments where the original data is encrypted data, such as $E_1$, the FHE system functions as a layer operating between two ends of a conventional encryption system (such as, but not limited to, RSA, Goldwasser-Micali, El-Gamal, Benaloh, Paillier). It should be appreciated that the first encrypted data $E_1$ may have been obtained by applying any conventional encryption method, known to persons of ordinary skill in the art, on corresponding plaintext. In embodiments, where the FHE system decrypts manipulated ciphertext data to yield back original data in the form of first encrypted data $E_1$, the first encrypted data $E_1$ can be further decrypted back to obtain the corresponding plaintext using the conventional decryption method associated with the conventional encryption method that was used to generate the first encrypted data $E_1$.

Cloud Based Implementation

As shown in FIG. 4, the cloud-based scenario 400 provides secure storage and computation services on data encrypted using the public key 408. In embodiments, the public key 408 and the private key 432 pair is associated with a conventional third-party encryption format such as, but not limited to, RSA. Using an implementation (at the cloud service system 410) of the FHE scheme of the present specification, the cloud service system 410 encrypts the third-party encrypted data 409 to generate homomorphically encrypted data and performs a plurality of computations/ operations on the homomorphically encrypted data without decrypting the third-party encrypted data 409 itself. The processed data is decrypted using the FHE scheme to obtain encrypted output 430 which is then communicated to the user 435 who decrypts the output 430 using his private key 432.

It should be appreciated that, in some embodiments, the conventional encryption system may be implemented on a client device while the homomorphic encryption system may be implemented on a server device. The client and server devices may be in wired or wireless data communication using a private or public network such as, but not limited to, the Internet. In some embodiments, the first ciphertext data may be pre-stored in a Cloud-based database. In such embodiments, the first ciphertext data may be processed using the homomorphic encryption system (implemented on a server device separate from the Cloud-based database service) and the finally output second ciphertext data is stored back to the Cloud-based database. A client device may access the second ciphertext data, thereafter, to decrypt and obtain plaintext data using the conventional encryption system implemented on the client device. Alternately, the conventional encryption system may be implemented by the Cloud-based service to output the final plaintext data for client consumption. Still, alternately, both the conventional encryption system and the homomorphic encryption system are implemented by the Cloud-based database service.

Public Key Infrastructure (PKI)

Figure 25:
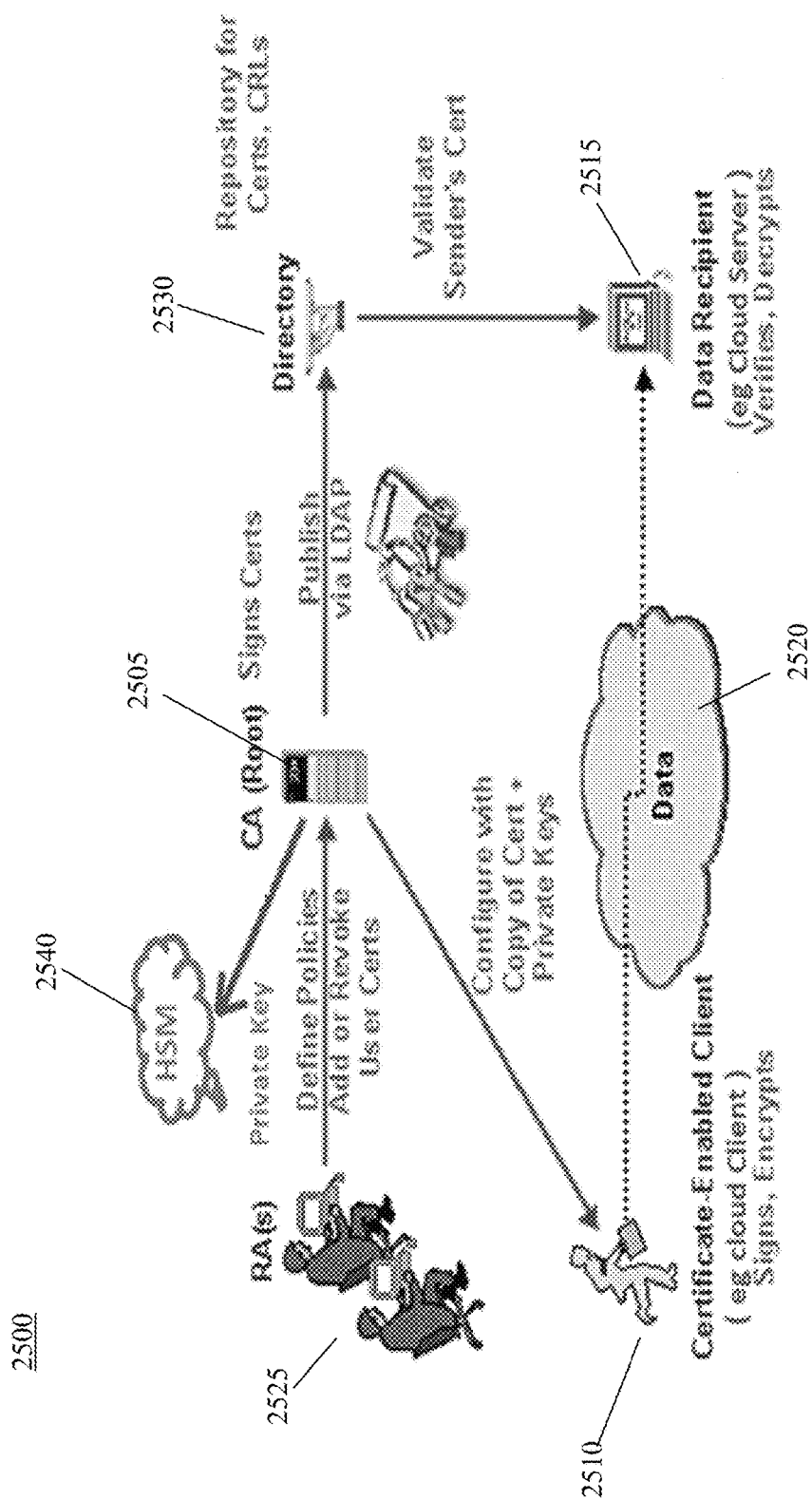
FIG. 25 shows components of a Public Key Infrastructure (PKI) for a cryptography scheme, in accordance with embodiments of the present specification.

FIG. 25 shows components of a Public Key Infrastructure (PKI) for a cryptography scheme, in accordance with embodiments of the present specification. The PKI 2500 implements a set of roles, policies, and procedures to create, manage, distribute, use, store, and revoke digital certificates and manage public-key encryption using a public/private asymmetric key pair based on a cryptography scheme that, in some embodiments, may be a conventional third-party such as, but not limited to RSA, Goldwasser-Micali, El-Gamal, Benaloh, and Paillier while in some embodiments may be the FHE crypto scheme of the present specification. In accordance with aspects of the present specification, cryptographic functions and workflows implementing the PKI 2500 processes are built using the OpenXPKI software so that the PKI 2500 is compatible with open standards.

Referring now to FIG. 25, the PKI 2500 comprises a first entity 2505, also referred to as a certification authority (CA), which is an organization that functions as a trusted third party or a root of trust responsible for validating an identity of a data sender, subject or client 2510 that may be a person, organization, software package or a device such as a computer, for example. In some embodiments, the sender 2510 is a cloud client consisting of computer hardware and/or software that relies on cloud computing for application delivery, or that is specifically designed for delivery of cloud services.

Once the identity of the sender 2510 has been verified, the first entity 2505 generates and issues a digital certificate containing a public key of the sender 2505. The digital certificate is then digitally signed with the first entity's 2505 private key. The digital certificate certifies the ownership of the public key of the sender 2510. In embodiments, a format of the digital certificate conforms to the X.509 specification that defines a standard for managing public keys through a PKI. This allows a recipient 2515 to rely upon signatures or on assertions made about a private key that corresponds to the certified public key of the sender 2510. The recipient 2515 may be a person, organization, software package or a device such as a computer, for example. In some embodiments, the recipient 2515 is a cloud server that is built, hosted and delivered through a cloud computing platform over the Internet.

Another component of the PKI 2500 is a second entity 2525, also referred to as a registration authority (RA), responsible for accepting requests, from the sender 2510, for digital certificates and verifying the sender 2510 making the request. Once the verification process is complete the second entity 2525 transmits the request to the first entity 2505 that generates the digital certificate, including the appropriate information (including the sender's public key), signs the digital certificate with the first entity's private key and sends the certificate to the sender 2510. In embodiments, the private key of the first entity 2505 is stored at a secure location, such as a Hardware Security Module (HSM) 2540.

Once certificates and corresponding public keys have been generated they are stored in a publicly accessible location referred to as a certificate repository 2530. In embodiments, the certificate repository 2530 is compatible with the Lightweight Directory Access Protocol (LDAP) making access to and searching of repository compatible with open standards.

The sender 2510 uses the digital certificate, issued by the first entity 2505, to sign and encrypt plaintext data using the sender's private key before uploading or communicating the encrypted data 2520 to the recipient 2515. The recipient 2515 of encrypted data 2520 verifies and validates the sender's certificate before decrypting the data 2520 using the sender's public key that, in embodiments, is accessed from the certificate repository 2530. The recipient 2515 verifies and validates the sender's certificate using a public key of the first entity 2505. Successful validation assures that the public key given in the certificate belongs to the sender 2510 whose details are given in the certificate.

In embodiments, the first entity 2505 performs functions such as, but not limited to, generating key pairs independently or jointly with the sender 2510, issuing digital certificates, publishing certificates, verifying certificates, and revocation of certificates. Accordingly, the first entity 2505 publishes a list of certificates that have been revoked, based on criteria for certificate revocation. These lists are known as certificate revocation lists (CRLs). In embodiments, the CRLs are made publicly available by storing them in the certificate repository 2530 so that the recipient 2515 can verify whether the certificate that was used to sign the encrypted data 2520 is valid. Thus, the recipient 2515 upon receiving the signed and encrypted data 2520 also verifies that the certificate of the sender 2510 has not been revoked. This ensures integrity of the signatures. In some embodiments, the recipient 2515 uses the Online Certificate Status Protocol (OCSP) for obtaining the revocation status of the certificate of the sender 2510.

Figure 26A:
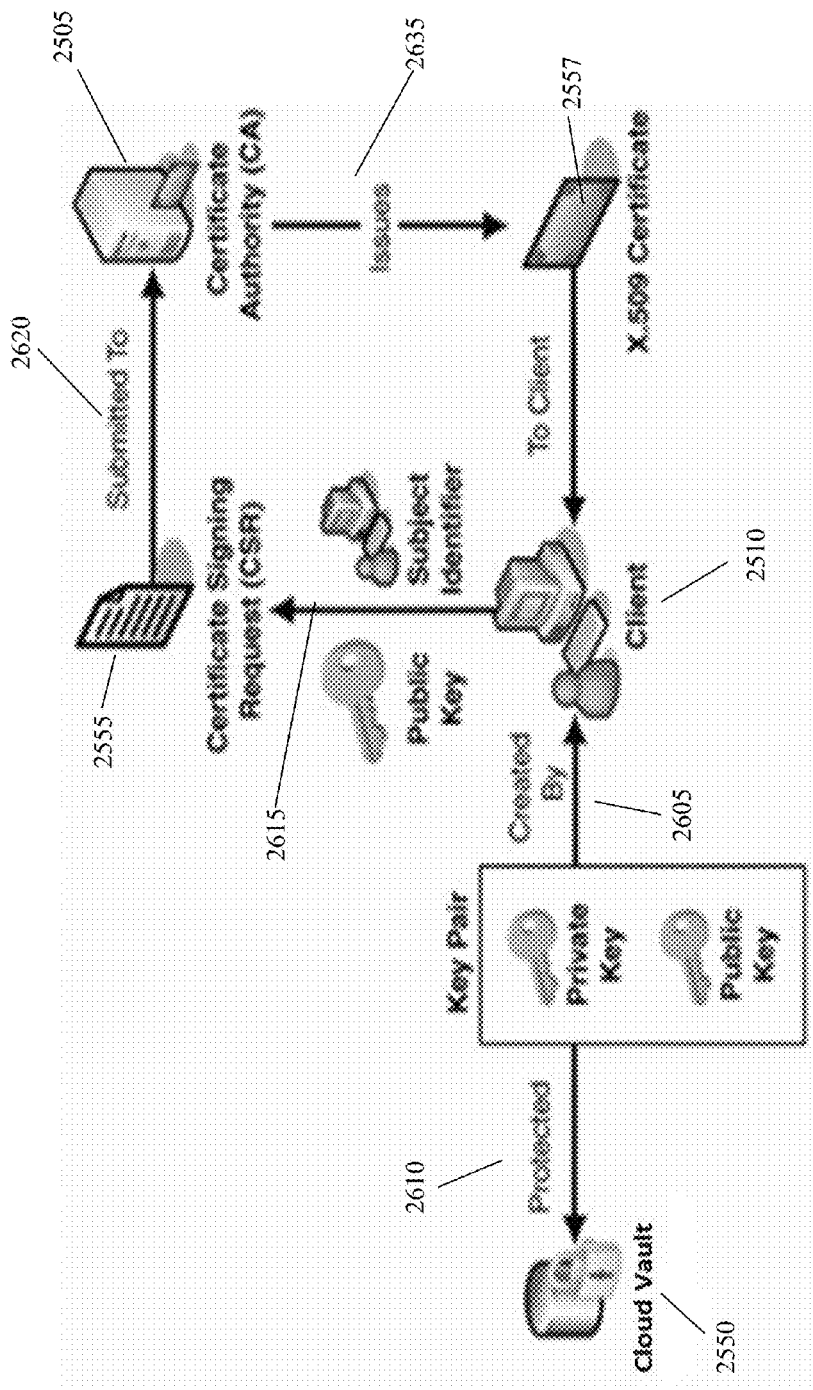
FIG. 26A is a workflow illustrating processes associated with obtaining a digital certificate and working of a certification authority, in accordance with an embodiment of the present specification.
Figure 26B:
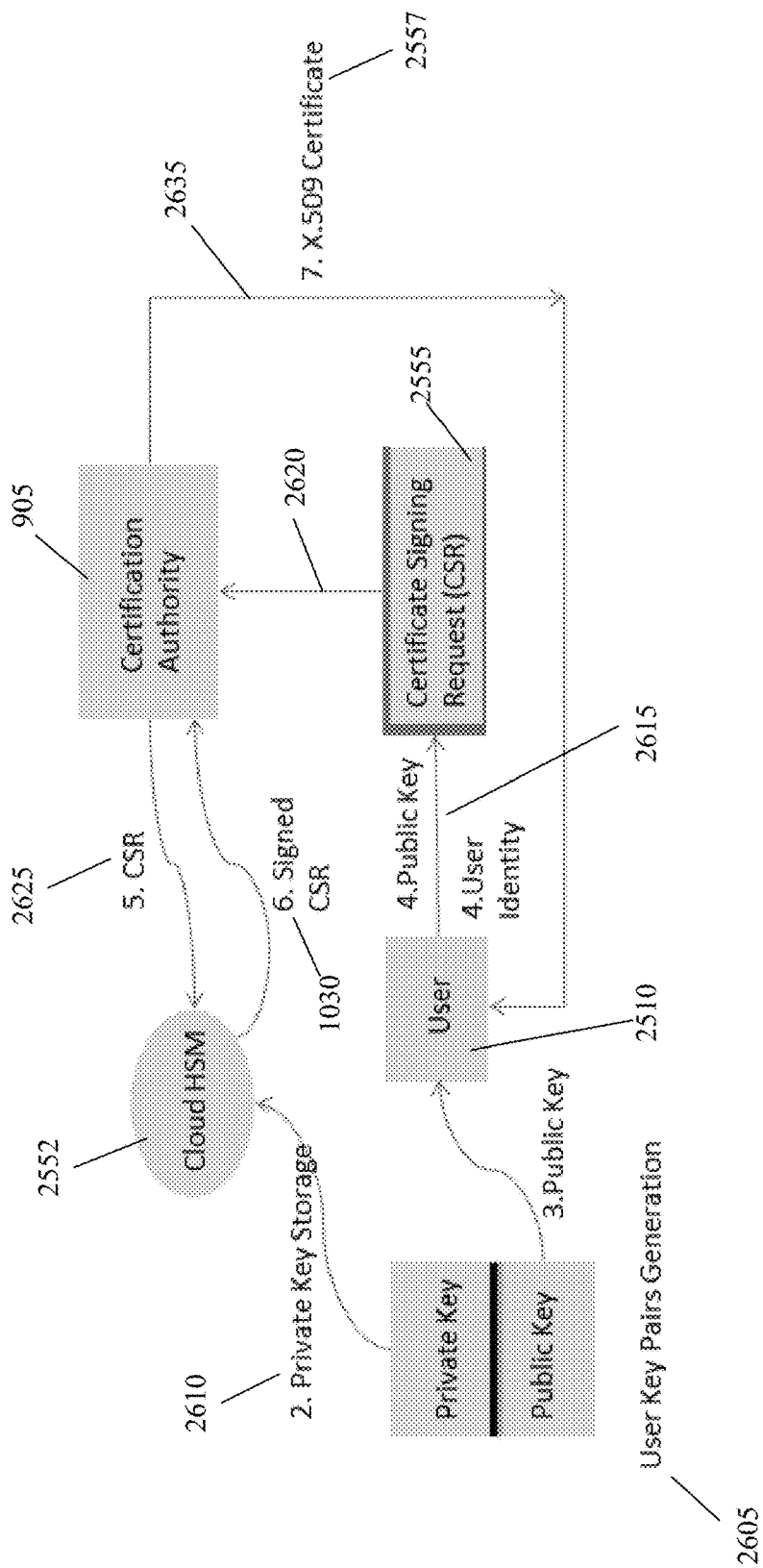
FIG. 26B is a workflow illustrating processes associated with obtaining a digital certificate and working of a certification authority, in accordance with another embodiment of the present specification.

FIGS. 26A and 26B are workflows illustrating a plurality of processes associated with obtaining a digital certificate and working of a certification authority, in accordance with embodiments of the present specification. Referring now to FIGS. 26A and 26B together, at step 2605 the sender 2510 generates public/private key pair based on third-party encryption scheme such as RSA, Goldwasser-Micali, El-Gamal, Benaloh, Paillier or based on the FHE scheme of the present specification. At step 2610 the sender's private key is stored in a secure place. In some embodiments, as shown in FIG. 26A, the secure place is a vault 2550 available through a cloud computing platform over the Internet. HashiCorp's vault is a tool that secures, stores, and tightly controls access to private keys and certificates and handles leasing, key revocation, key rolling, and auditing by presenting a unified API to access multiple back-ends such as, but not limited to, HSMs (Hardware Security Modules) and AWS IAM (Identity and Access Management), for example. In some embodiments, as shown in FIG. 26B, the secure place is a cloud based HSM 2552. An HSM is a crypto processor that protects the crypto key lifecycle by securely managing, processing, and storing cryptographic keys inside a hardened, tamper-resistant device.

At step 2615, the sender 2510 generates a certificate signing request (CSR) 2555 for submission to the certification authority 905. The CSR 2555 contains the sender's identity, public key and the FHE algorithm. The public key included in the CSR 2555 comes from the public/private key pair, which was generated at step 2605. At step 2620, the CSR 2555 is submitted to the certification authority 2505 for signing.

The digital certificate is digitally signed with a private key of the certification authority 2505. As shown specifically in FIG. 26B, in embodiments, at step 2625 the certification authority 2505 sends the CSR 2555 to the cloud based HSM 2552 where the certification authority's private key is securely stored. The HSM 2552 coveys a signed CSR (by the certification authority's private key) back to the certification authority 2505 at step 2630. Finally, as shown in FIGS. 26A, 26B at step 2635 the certification authority 2505 issues a digital certificate 2557 (conforming to the X.509 standard, for example) that is communicated to the sender 2510.

The management of a digital certificate and public/private key pairs, through a life-cycle of the digital certificate, is a necessary yet daunting task for a user. For example, if certificates are allowed to expire (since certificates have expiration dates) without replacing them, communication can be interrupted, impacting a system's availability. Private keys must never be exposed to untrusted entities and any loss of a private key can impact the confidentiality of communications. There is also increased complexity when creating certificates that support a diverse pool of browsers and devices. Further, a plurality of steps involved in a process of certificate procurement, as shown in FIGS. 26A and 26B, requires the user to move through various systems and interfaces, potentially copying and pasting sensitive key material from one system to another. Such information spread may lead to situations where the user might not correctly clean up the private key he has generated or accidently expose the information.

In accordance with aspects of the present specification, processes associated with generation and subsequent management of the digital certificate by the user is streamlined and simplified by implementing a user identity, certificate access and management solution such as Lemur. Lemur is an open source framework for management of certificates as well as user access to certificates and acts as a broker between a certification authority and the user. In embodiments, Lemur provides a centralized tool from which to manage and monitor all aspects of the certificate lifecycle.

Figure 27:
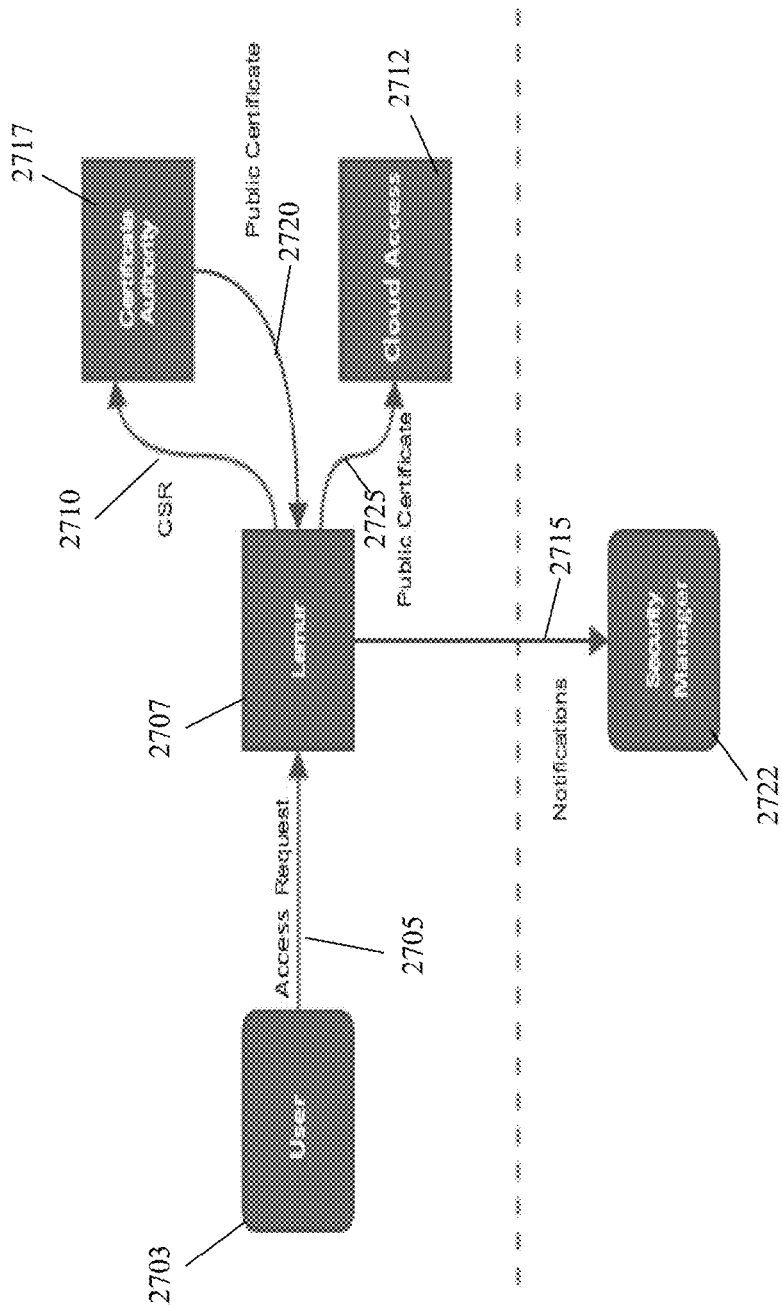
FIG. 27 is a workflow illustrating a certificate procurement process using Lemur, in accordance with aspects of the present specification.

FIG. 27 is a workflow illustrating a certificate procurement process using Lemur, in accordance with aspects of the present specification. At step 2705, a user 2703 may submit a request to Lemur 2707 for access to a secured cloud based service 2712 such as, but not limited to, a service to implement a financial transaction using the FHE scheme of the present specification or a shared data storage system such as "Dark Pool" which, in some embodiments, is available as a Cloud based service. On receiving user access request, at step 2710, Lemur 2707 generates a certificate signing request (CSR) on behalf of the user 2703. The CSR is a cryptographically signed request that has information such as state/province, location, organization name and other details about the user requesting the certificate and what the certificate is to be used for. In some embodiments, Lemur 2707 generates the user's public/private key pair and securely stores them. The generated public key of the user 2703 is contained in the CSR.

At step 2715, Lemur 2707 generates and sends a notification to a security manager 2722 with respect to the generated CSR. The security manager 2722 reviews that the CSR request is valid and error-free.

At step 2720, the CA 2717 issues a digital certificate binding the key pair to the user 2703. The digital certificate is communicated to Lemur 2707 that stores the digital certificate associated with the user 2703. At step 2725, Lemur 2707 uses the user's digital certificate to enable the user authenticated access to the cloud based service 2712.

It should be appreciated that some of the functions performed by Lemur 2707 comprise: creation of new users, creation of certificates for new users, import of existing user certificates, creation of new roles, assignment of roles to respective users, and access to cloud services based on user defined role.

HTTPS Communication Using FHE Based SSL

Figure 28:
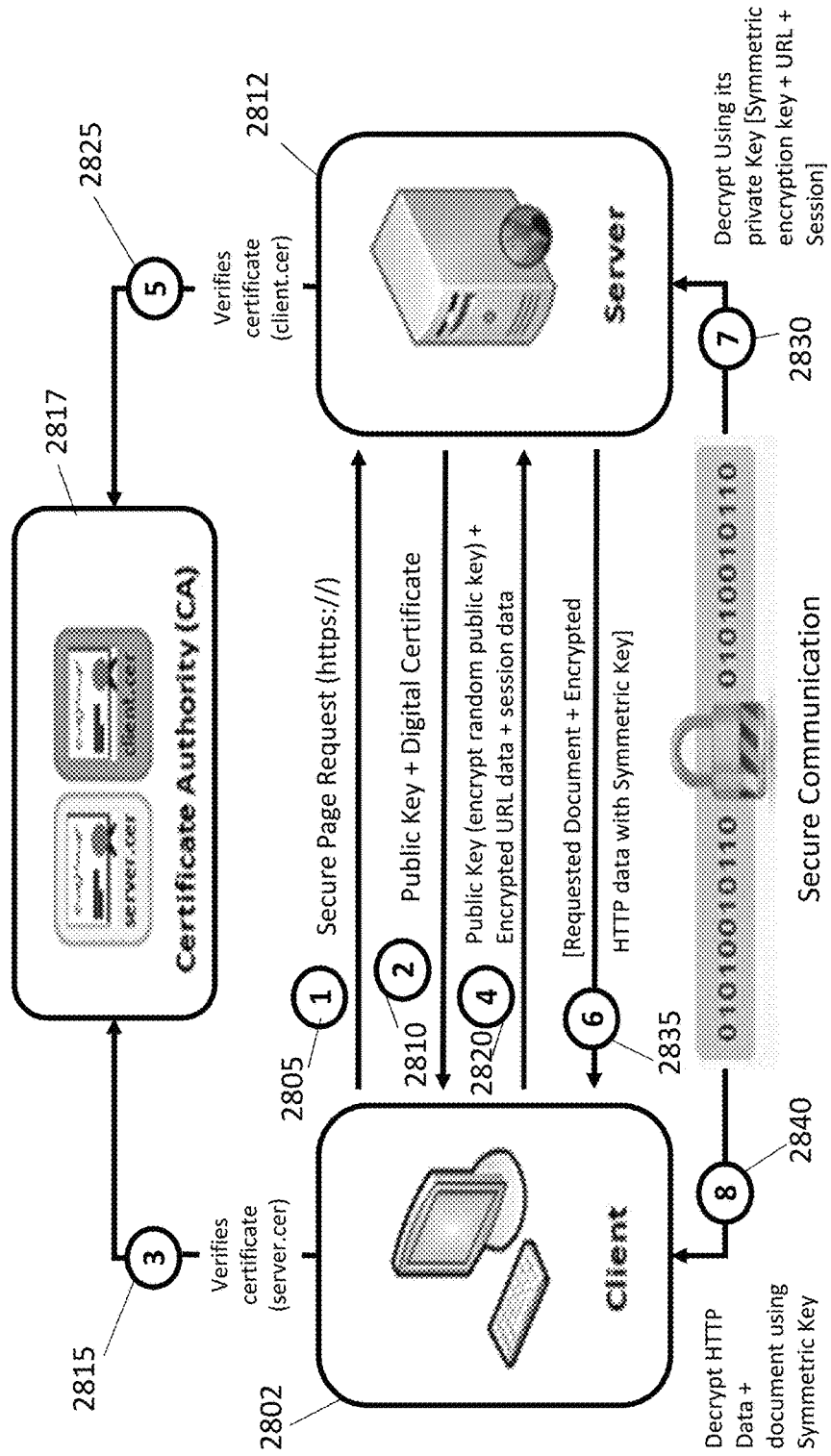
FIG. 28 is a workflow illustrating a plurality of steps for mutual authentication of first and second parties, such as a server and a client, to each other using secure socket layer, in accordance with embodiments of the present specification.

Secure Socket Layer (SSL) is a secure handshake protocol that supports digital certificates at the transport layer. It enables first and second parties to establish a secure session for communication between them, by providing mutual confidentiality and data integrity. FIG. 28 is a workflow illustrating a plurality of steps for mutual authentication of first and second parties, such as a server and a client, to each other using secure socket layer, in accordance with embodiments of the present specification. In embodiments, the SSL is built upon a third-party encryption scheme such as, but not limited to, RSA or is built upon the FHE based asymmetric crypto scheme (of the present specification) where a public key is freely distributed to encrypt a plaintext message, which can only be decrypted by a corresponding private key. The SSL employs a third party organization, such as a certification authority (CA), to identify one or both ends of a communication or transaction.

Referring now to FIG. 28, at step 2805, a first party 2802 sends a request to connect to a second party 2812 and asks for secure data such as a web page or a document, for example. In an embodiment, the first party 2802 is a client browser while the second party 2812 is a web server. Consequently, at step 2810, the second party 2812 sends its public key along with its signing digital certificate back to the first party 2802.

At step 2815, the first party 2802 verifies whether the digital certificate is valid and was issued by a CA 2817. The first party 2802 compares the information in the certificate with the information received from the CA 2817 and verifies the details. Upon successful verification of the digital certificate, at step 2820, the first party 2802 generates a random symmetric encryption key and then encrypts it using the public key of the second party 2812. Thereafter, the first party 2802 sends the encrypted symmetric key to the second party 2812, along with an encrypted URL and other encrypted HTTP data—such as session data (the URL and HTTP data being encrypted using the symmetric key). The first party 2802 also sends its digital certificate to the second party 2807 for authentication. At step 2825, the second party 2812 verifies validity and authenticity of the first party's certificate with the CA 2817.

Upon successful verification of the first party's certificate, at step 2830, the second party 2812 decrypts the incoming packet using its private key and uses the symmetric key to decrypt the URL and HTTP data that was generated randomly at the first party 2802. Thereafter, at step 2835, a packet including the data requested by the first party 2802 is encrypted with the symmetric key and sent back to the first party 2802 by the second party 2812. Finally, at step 2840, the first party 2802 decrypts the packet using the symmetric key thereby establishing a secure handshake.

RSA Using One Public Key and Multiple Unique Private Keys

As discussed in the section titled 'RSA Cryptosystem' earlier in this application, in the RSA algorithm the public key is (e, N) and private key is (d, N)—such that, the key pair is always unique for each user. This means that for each public key there always exists a unique private key and for every private key there exists a unique public key.

Conventionally, while each user has a unique key pair as discussed above—in accordance with an aspect of the present specification, there may be a case where a user has one public key and multiple unique private keys. In some embodiments, a need may exist to process only one entity's data using only a single key-pair using FHE. In such embodiments user data can be encrypted by the user even before it is sent to a cloud, for example, and the user can begin FHE processing on the data without knowing the public or private keys associated with the encryption of data. The only information that is required in such embodiments would be the modulus N.

Stated differently, in some embodiments a need may exist to privately compute on various different users' data where each user has a separate private key. However, in RSA, each public key is matched with just one unique private key. More specifically, in the RSA algorithm, the public key is (e, n) and private key is (d, n). The key pair is always unique for each user. It means that for each public key there always exist a unique private key and for every private key there exist a unique public key.

Theorem 1: The public key in RSA algorithm is always unique.

Proof: Assume that we have two public key exponent e1 and e2 corresponding to one private key exponent d. Then we have $$e_1 * d \equiv 1 \bmod \varphi(N)$$

$$e_2 * d \equiv 1 \bmod \varphi(N)$$

$$(e_1 - e_2) * d \equiv 0 \bmod \varphi(N).$$

But since d is relatively prime to $\varphi(N)$, by Euclid's lemma $\varphi(N)$ must divide $(e_1 - e_2)$ $$e_1 \equiv e_2 \bmod \varphi(N).$$

In other words, any two public RSA exponents that share a private exponent must differ by some multiple of $\varphi(N)$ which means that public key e in RSA algorithm is always unique.

Theorem 2: The private key in RSA algorithm is always unique.

Proof: Assume that we have two private key exponents $d_1$ and $d_2$ corresponding to one public key exponent e. Then we have $$e * d_1 \equiv 1 \bmod \varphi(N)$$

$$e * d_2 \equiv 1 \bmod \varphi(N)$$

$$(d_1 - d_2) * e \equiv 0 \bmod \varphi(N).$$

But since e is relatively prime to $\varphi(N)$, by Euclid's lemma $\varphi(N)$ must divide $(d_1 - d_2)$ $$d_1 \equiv d_2 \bmod \varphi(N).$$

In other words, any two private RSA exponents that share a public exponent must differ by some multiple of $\varphi(N)$ which means that private key d in RSA algorithm is always unique. For example, assume that p=11 and q=17, choose the public key e=7. As we know that $$e * d \equiv 1 \bmod \varphi(N)$$

$$7 * d \equiv 1 \bmod (10*16)$$

$$7 * d \equiv 1 \bmod (160)$$

There are many solutions for the above equation d=23, 183, 343, etc. In general, one can write the above equation as d=160k+23, for every k∈Z. For d=160k+23 and for every k∈Z, there exists a lot of such elements, which is not true since, one is working in the multiplicative group and can write the element d in different ways, but it is still the same element. So, d=23 is the unique private key for the public key e=7. Similarly, there is also a well-known theorem about uniqueness of the inverse of an element in the multiplicative group.

Theorem 3: The inverse of any element of the group G is always unique.

Proof: Let g∈G and let g' and g" be the inverse elements of g. Then $$g' = e * g' = (g * g'') * g' = (g * g') g'' = e * g'' = g''$$

Which shows that g'=g". So, the inverse of any element in the group G is unique. The above theorem also explains the fact that the private key in RSA cryptosystem is always unique. So, one cannot have multiple private keys with one public key.

As previously stated, each user has a unique key pair but there are applications in which one may want one public key and multiple unique private keys. In such cases, one may use an attribute-based encryption schemes. Attribute-based encryption is a type of public-key encryption in which the secret/private key of a user and the cipher text are dependent upon attributes such as, but not limited to, a country in which the user lives, a kind of subscription the user has and/or any other mathematical operation evident to persons of ordinary skill in the art. In such a scheme, decryption of the cipher text is possible only if the set of attributes of the secret/private key match the attributes associated with the cipher text. A crucial security aspect of attribute-based encryption is collusion-resistance that is an adversary that holds multiple keys should only be able to access data if at least one individual key grants access.

Figure 29:
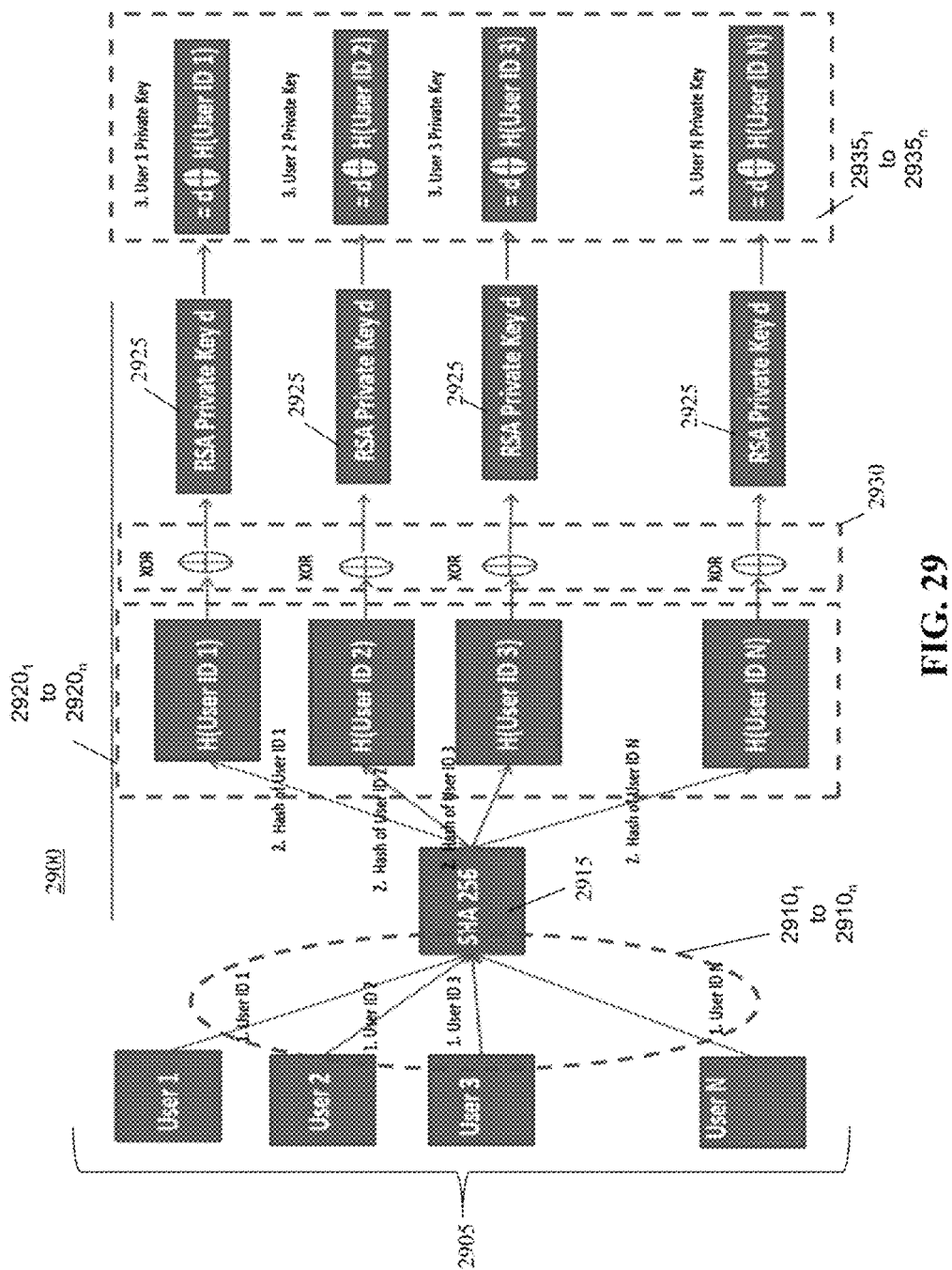
FIG. 29 illustrates a workflow for an attribute-based encryption scheme that uses an XOR masking operation to obtain unique private keys, in accordance with an embodiment of the present specification.

In various embodiments, the attribute-based encryption scheme uses a masking operation with a private key. This masking operation could be any operation like XOR operation, AND operation, or any other operation known to persons of ordinary skill in the art. FIG. 29 illustrates a workflow for an attribute-based encryption scheme that uses an XOR masking operation to obtain unique private keys, in accordance with an embodiment of the present specification. The attribute-based encryption scheme 2900, generates a unique RSA key pair where the private key 2925 is d. Assume that there are n users 2905 and each user has a unique user ID 2910$_1$ through 2910$_n$ corresponding to personal attributes of each user. These unique user IDs are passed through SHA256 2915 to obtain 256-bit unique values 2920$_1$ through 2920$_n$ (that is, hashes of each user ID). Next, a bit size of the private key d 2925 is checked. If the bit size of the private key 2925 is concurrent to 0 under mod 256 then we XOR it (XOR operation being referenced as 2930 in the figure) with a SHA256 bit value. If the bit size of the private key 2925 is not concurrent to 0 under mod 256 then we use suitable padding to make it concurrent to 0 under mod 256 and then XOR it with a SHA 256-bit value. As a result, we have unique private keys 2935$_1$ through 2935$_n$ of each user corresponding to a single public key.

FHE Using Lemur Encryption

Figure 30:
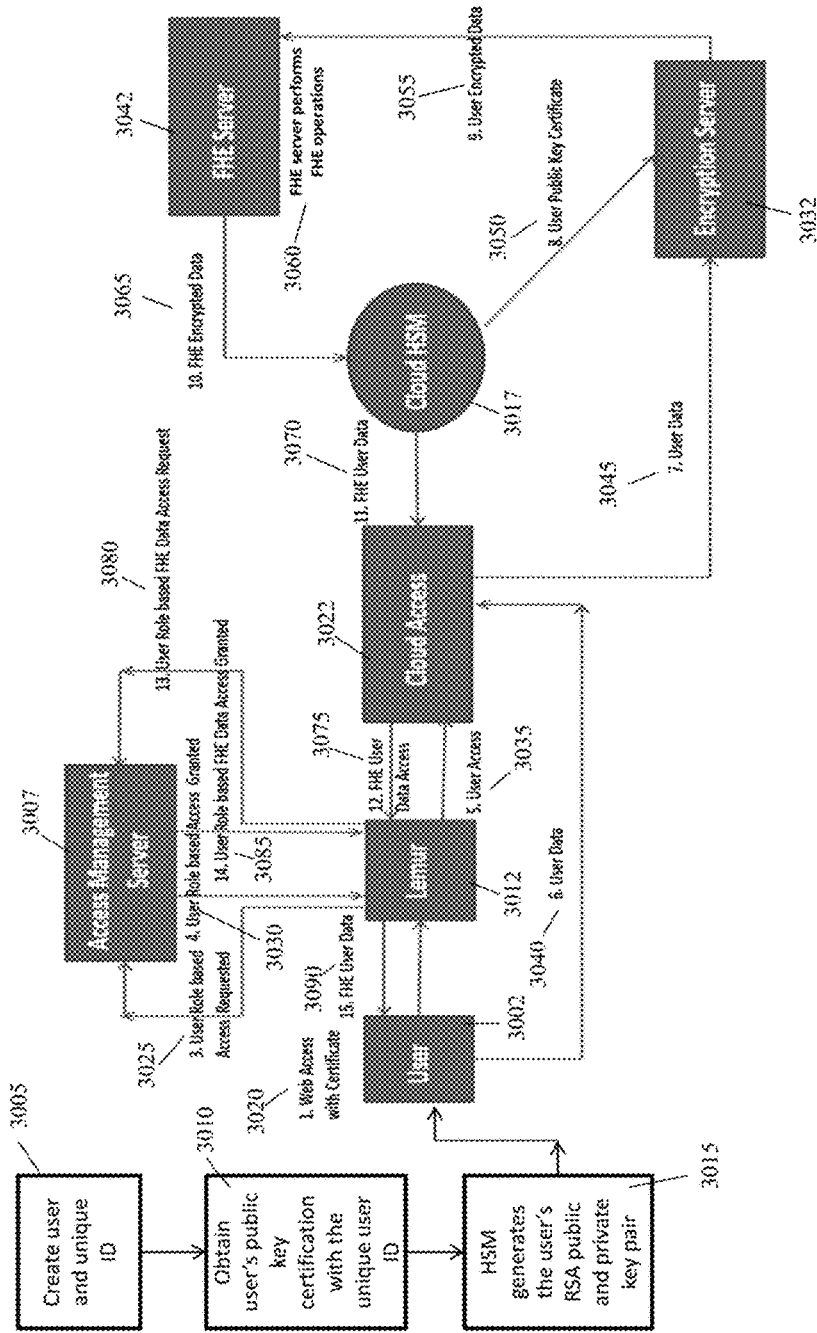
FIG. 30 is a workflow illustrating a plurality of processes associated with FHE based user access and key management using Lemur and attribute-based encryption, in accordance with embodiments of the present specification.

FIG. 30 is a workflow illustrating a plurality of processes associated with FHE based user access and key management using Lemur and attribute-based encryption, in accordance with embodiments of the present specification. In accordance with aspects of the present specification, the open source Lemur solution is used for user creation and user access management to a shared data storage system 3022 such as "Dark Pool" which, in some embodiments, is available as a Cloud based service.

In Lemur 3012, at step 3005, a new user 3002 is created with personalized user data to generate a corresponding unique user ID. The user with the associated unique ID is added to a user database hosted in Lemur 3012. At step 3010, the user's public key certification with the unique user ID is requested from a certification authority via Lemur. The received public key certificate of the user is stored in the user database in Lemur 3012. Thereafter, a role is assigned to the user based on the user's personalized data and the role is configured and stored in a user access database hosted at an access management server 3007 via Lemur 3012.

Figure 31:
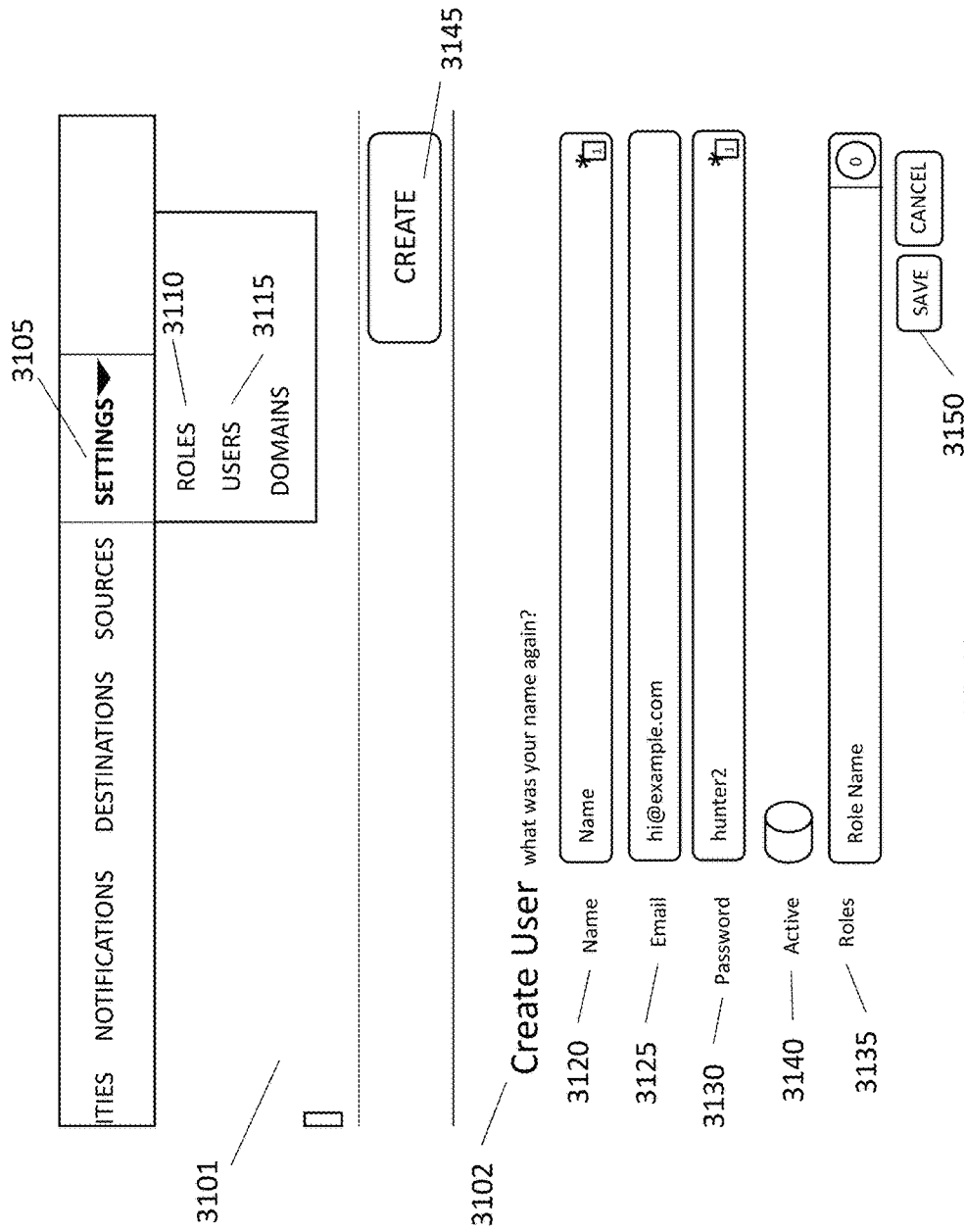
FIG. 31 shows a GUI in Lemur to create a new user, in accordance with embodiments of the present specification.

FIG. 31 shows a GUI 3101 in Lemur to create a new user. As shown in the figure, clicking a settings function 3105 presents a drop down box with various options such as roles 3110, users 3115 and domains. To create a new user, the users option 3115 is chosen and clicking the create button 3145 causes a 'create user' screen 3102 to be presented. The screen 3102 enables inputting information related to various user credentials such as, for example, name 3120, email 3125, password 3130 and existing roles 3135 that can be assigned to the user. A toggle button 3140 can be set to activate or deactivate the user account. The new user account is created and saved on clicking the 'save' button 3150.

Figure 32:
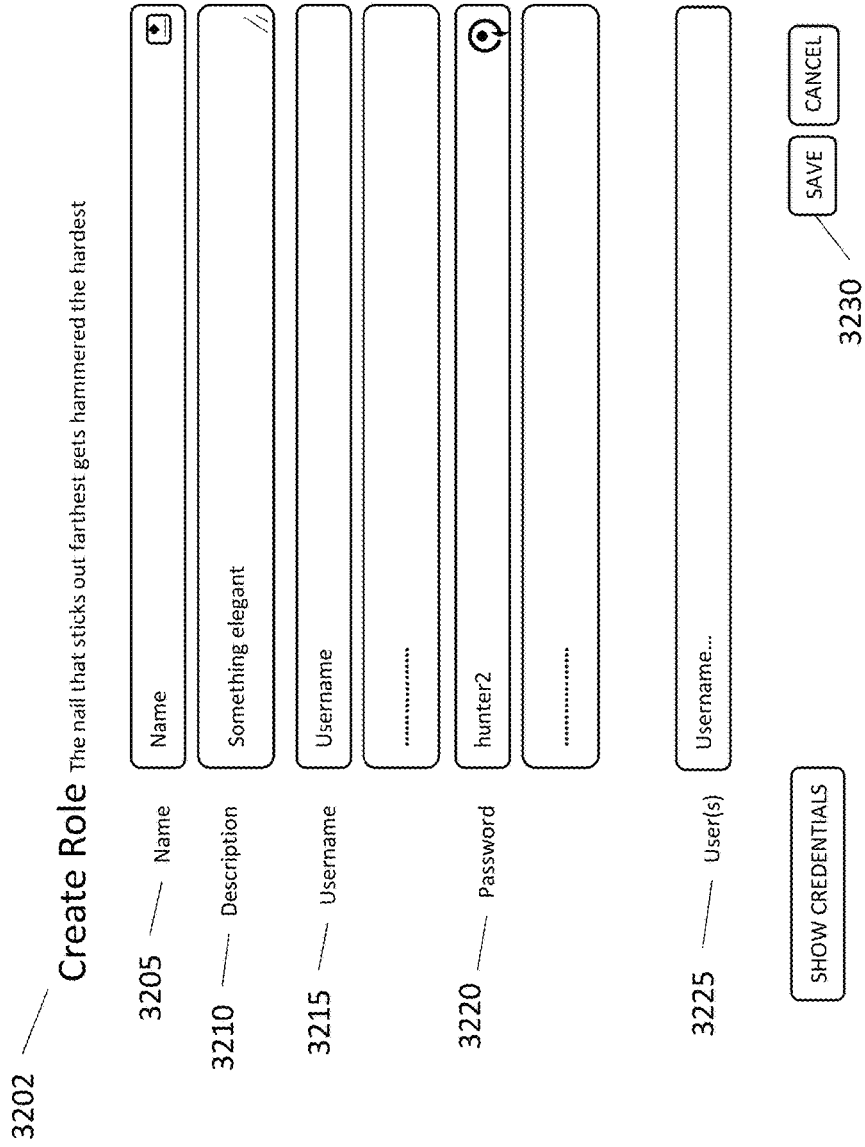
FIG. 32 shows a GUI in Lemur to create a new role, in accordance with embodiments of the present specification; and, FIG. 33 shows a flowchart depicting an exemplary process for transforming a partially homomorphic encryption system to a FHE system, in accordance with some embodiments of the present specification.

To create new roles, the roles option 3110 is chosen and clicking the create button 3145 causes a 'create role' screen 3202 to be presented, as shown in FIG. 32. The screen 3202 enables inputting information related to various role related credentials such as, for example, name of the role 3205, description of the role 3210, username 3215, password 3220, and users 3225 that would be assigned the role 3205. The role 3205 is created and saved on clicking the 'save' button 3230.

Referring back to FIG. 30, for an existing user a unique user ID is already stored in the user database. For the existing user, presence of an associated public key certificate is checked in the user database. If a certificate does not exist then, a public key certificate is created and stored in the user database. Thereafter, presence of a role (corresponding to the existing user) is also checked in the user access database. If no role is already assigned to the existing user then a role is assigned to the existing user based on his personalized data. The assigned role is configured and stored in the user access database hosted at the access management server 3007 via Lemur 3012.

At step 3015, during initialization, a cloud based HSM 3017 generates a unique RSA public and private key pair via Lemur 3012. Since the user 3002 has an associated unique user ID, Lemur 3012 sends the user's unique ID to HSM 3017. HSM 3017 performs the following operations: obtains the unique RSA public and private key pair generated in the initialization phase, masks (as discussed with reference to FIG. 29) the RSA private key with the user's unique ID to generate the user's unique private key and stores the user's unique private key.

At step 3020, the user 3002 opens a web interface to the cloud based shared data storage system 3022, logs in using his credentials such as user name and password and requests access, to the system 3022, with his public key certificate via Lemur 3012. At step 3025, Lemur 3012 sends the user's access request to the access management server 3007 for validation. Upon validation, the access management server 3007 grants role based access to the user via Lemur, at step 3030. As a result, at step 3035, the user 3002 is able to access the system 3022.

Now, the user 3002 uploads his data on to the cloud based system 3022 at step 3040. At step 3045, the system 3022 sends the uploaded data to an encryption server 3032. At step 3050, the encryption server 3032 accesses the user's public key certificate from the HSM 3017 and uses the public key to generate encrypted data. At step 3055, the server 3032 sends the encrypted data either back to the cloud based system 3022 for storage or to an FHE server 3042 for further computational operations. At step 3060, the FHE server 3042 performs FHE operations on the encrypted data either received from the encryption server 3032 or retrieved from the cloud based system 3022. Next, at step 3065, the FHE server 3042 sends FHE encrypted data to the HSM 3017. The HSM 3017 performs decryption operation (on the received FHE encrypted data) using the user's unique private key to generate decrypted FHE user data. The decrypted FHE user data is forwarded by the HSM 3017 to the cloud based system 3022, at step 3070.

At step 3075, the cloud based system 3022 forwards the decrypted FHE user data to Lemur 3012. At step 3080, Lemur 3012 sends decrypted FHE user data access request to the access management server 3007 for validation. Upon validation, the access management server 3007 grants role based access to the user to the decrypted FHE user data via Lemur, at step 3085. As a result, at step 3090, the user 3002 is able to access the decrypted FHE user data.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An encryption system comprising:
    a computing device, wherein said computing device comprises at least one processor coupled to a memory and wherein said memory comprises instructions executable by the at least one processor to:
    receive a first plaintext data;
    modify the first plaintext data to yield second plaintext data;
    encrypt the second plaintext data in a first encryption format to generate a first encrypted data;
    receive a request to perform an operation on the first encrypted data;
    transform the operation into a homomorphic operation based on the first encryption format, wherein said homomorphic operation is different from the operation;
    apply the homomorphic operation to the first encrypted data to generate a second encrypted data, wherein the homomorphic operation, as transformed from the operation, is configured such that, when applied to the first encrypted data to yield the second encrypted data, the second encrypted data does not occupy more than 4 times n log(n) of said memory and wherein n is equal to a number of bits defining the first encrypted data;
    decrypt the second encrypted data using a first decryption format corresponding to the first encryption format to yield a third plaintext data; and
    modify the third plaintext data to generate fourth plaintext data, wherein said fourth plaintext data is equivalent to plaintext data generated by applying said operation to the first plaintext data.

2. The encryption system of claim 1, wherein said first encryption format is at least one of RSA, Goldwasser-Micali, El-Gamal, Benaloh, and Paillier.

3. The encryption system of claim 1, wherein said operation is at least one of a multiplication operation, subtraction operation, division operation and addition operation.

4. The encryption system of claim 3, wherein transforming said operation to yield a homomorphic operation comprises redefining an addition operation as at least one multiplication operation.

5. The encryption system of claim 3, wherein said homomorphic operation is configured such that execution of the homomorphic operation by the processor requires no more than 10 times more processing cycles than an execution of the operation, by the processor, applied to the first plaintext data.

6. The encryption system of claim 3, wherein transforming said operation to yield a homomorphic operation comprises redefining a multiplication operation as at least one exponentiation operation.

7. The encryption system of claim 3, wherein transforming said operation to yield a homomorphic operation comprises redefining a subtraction operation as at least one division operation.

8. The encryption system of claim 3, wherein transforming said operation to yield a homomorphic operation comprises redefining a division operation as at least one root operation.

9. The encryption system of claim 1, wherein the first plaintext data is modified by applying a prime number generation process to yield a plurality of prime numbers, wherein the prime number generation process comprises identifying a prime number that is less than an integer representative of the first plaintext data and that is on a predefined list of prime numbers, subtracting the prime number from the integer to yield a remainder, and repeating the prime number generation process using the remainder in place of the integer in subsequent cycles to yield the plurality of prime numbers.

10. The encryption system of claim 9, wherein the second plaintext data is generated by multiplying said plurality of prime numbers together.

11. The encryption system of claim 1, wherein the third plaintext data is modified applying a prime number generation process to yield a plurality of prime numbers, wherein the prime number generation process comprises by identifying a prime number that is less than an integer representative of the third plaintext data and that is on a predefined list of prime numbers, dividing the integer using the prime number to yield a remainder, and repeating the prime number generation process using the remainder in place of the integer in subsequent cycles to yield the plurality of prime numbers.

12. The encryption system of claim 11, wherein the fourth plaintext data is generated by adding said plurality of prime numbers together.

13. A method of homomorphically manipulating encrypted data in a computer having at least one processor coupled to a memory, wherein said memory comprises instructions executable by the at least one processor, said method comprising:
    in said computer, receiving a first encrypted data, wherein said first encrypted data is generated by applying a first encryption format to a first plaintext data;
    in said computer, receiving a request for an operation to be performed on the first encrypted data;
    in said computer, transforming said operation into a homomorphic operation based on the first encryption format, wherein said homomorphic operation is different from the operation; and
    in said computer, applying the homomorphic operation to the first encrypted data to yield second encrypted data, wherein the homomorphic operation, as transformed from the operation, is configured such that, when applied to the first encrypted data to yield the second encrypted data, the second encrypted data does not occupy more than 4 times n log(n) of said memory and wherein n is equal to a number of bits defining the first encrypted data.

14. The method of claim 13, wherein said first encryption format is at least one of RSA, Goldwasser-Micali, El-Gamal, Benaloh, Paillier, and an encryption format which is not homomorphic for both multiplication and addition operations.

15. The method of claim 13, wherein transforming said operation to yield a homomorphic operation comprises redefining an addition operation as at least one multiplication operation.

16. The method of claim 13, wherein said homomorphic operation is configured such that an execution of the homomorphic operation by the processor requires no more than 10 times more processing cycles than an execution of the operation, by the processor, applied to the first plaintext data.

17. The method of claim 13, wherein transforming said operation to yield a homomorphic operation comprises redefining a multiplication operation as at least one exponentiation operation.

18. The method of claim 13, wherein transforming said operation to yield a homomorphic operation comprises redefining a subtraction operation as at least one division operation.

19. The method of claim 13, wherein transforming said operation to yield a homomorphic operation comprises redefining a division operation as at least one root operation.

20. The method of claim 13, further comprising receiving a plaintext data and generating first plaintext data from the plaintext data by applying a prime number generation process to yield a plurality of prime numbers, wherein the prime number generation process comprises identifying a prime number that is less than an integer representative of the plaintext data and that is on a predefined list of prime numbers, subtracting the prime number from the integer to yield a remainder, repeating the prime number generation process using the remainder in place of the integer in subsequent cycles to yield a plurality of prime numbers, and multiplying said plurality of prime numbers together.

21. The method of claim 20, further comprising decrypting the second encrypted data using a first decryption format corresponding to the first encryption format to yield a third plaintext data.

22. The method of claim 21, further comprising modifying the third plaintext data to generate fourth plaintext data, wherein said fourth plaintext data is equivalent to output plaintext data that would have been generated by directly applying said operation to the plaintext data.

23. The method of claim 22, further comprising modifying the third plaintext data to generate fourth plaintext data by applying a prime number generation process to yield a plurality of prime numbers, wherein the prime number generation process comprises identifying a prime number that is less than an integer representative of the third plaintext data and that is on a predefined list of prime numbers, dividing the integer using the prime number to yield a remainder, repeating the prime number generation process using the remainder in place of the integer in subsequent cycles to yield a plurality of prime numbers, and adding said plurality of prime numbers together.

24. An encryption method executed in a computing device, wherein said computing device comprises at least one processor coupled to a memory and wherein said memory comprises instructions executable by the at least one processor, said encryption method comprising:

receiving a first plaintext data;

modifying the first plaintext data to yield second plaintext data, wherein the first plaintext data is modified by applying a prime number generation process to yield a plurality of prime numbers, wherein the prime number generation process comprises identifying a prime number that is less than an integer representative of the first plaintext data and that is on a predefined list of prime numbers, subtracting the prime number from the integer to yield a remainder, repeating the prime number generation process using the remainder in place of the integer in subsequent cycles to yield a plurality of prime numbers, identifying an additional unused prime number not included within the plurality of prime numbers, and multiplying said plurality of prime numbers together;

encrypting the second plaintext data in a first encryption format to generate a first encrypted data;

receiving a request to perform an operation, wherein said operation is at least one of a multiplication operation, subtraction operation, division operation and addition operation;

transforming the operation into a homomorphic operation based on the first encryption format, wherein transforming said operation to yield a homomorphic operation comprises at least one of redefining an addition operation as at least one multiplication operation, redefining a multiplication operation as at least one exponentiation operation, redefining a subtraction operation as at least one division operation, or redefining a division operation as at least one root operation;

applying the homomorphic operation to the first encrypted data to generate a second encrypted data, wherein the homomorphic operation, as transformed from the operation, is configured such that, when applied to the first encrypted data to yield the second encrypted data, the second encrypted data does not occupy more than 4 times n log(n) of said memory and wherein n is equal to a number of bits defining the first encrypted data;

decrypting the second encrypted data using a first decryption format corresponding to the first encryption format to yield a third plaintext data; and modifying the third plaintext data to generate fourth plaintext data, wherein said fourth plaintext data is equivalent to plaintext data generated by applying said operation to the first plaintext data, wherein the third plaintext data is modified by applying a prime number generation process to yield a plurality of prime numbers, wherein the prime number generation process comprises identifying a prime number that is less than an integer representative of the third plaintext data and that is on a predefined list of prime numbers, dividing the integer using the prime number to yield a remainder, repeating the prime number generation process using the remainder in place of the integer in subsequent cycles to yield a plurality of prime numbers, and generating the fourth plaintext data by adding said plurality of prime numbers together.

25. The encryption method of claim 24, wherein the additional unused prime number not included within the plurality of prime numbers is used to decrypt second encrypted data, wherein said second encrypted data has been subject to an exponentiation operation.

* * * * *